(12) United States Patent
Hollander et al.

(10) Patent No.: US 11,526,530 B2
(45) Date of Patent: Dec. 13, 2022

(54) SYSTEMS AND METHODS FOR DATA VISUALIZATION, DASHBOARD CREATION AND MANAGEMENT

(71) Applicant: MongoDB, Inc., New York, NY (US)

(72) Inventors: Tom Hollander, Eastwood (AU); Eliot Horowitz, New York, NY (US); Thomas Rueckstiess, Surry Hills (AU)

(73) Assignee: MongoDB, Inc., New York, NY (US)

( * ) Notice: Subject to any disclaimer, the term of this patent is extended or adjusted under 35 U.S.C. 154(b) by 82 days.

(21) Appl. No.: 16/895,101

(22) Filed: Jun. 8, 2020

(65) Prior Publication Data

US 2020/0301939 A1 Sep. 24, 2020

Related U.S. Application Data

(63) Continuation-in-part of application No. 16/442,204, filed on Jun. 14, 2019, and a continuation-in-part of
(Continued)

(51) Int. Cl.
*G06F 16/248* (2019.01)
*G06F 16/25* (2019.01)
(Continued)

(52) U.S. Cl.
CPC ............ *G06F 16/258* (2019.01); *G06F 16/23* (2019.01); *G06F 16/2471* (2019.01);
(Continued)

(58) Field of Classification Search
CPC combination set(s) only.
See application file for complete search history.

(56) References Cited

U.S. PATENT DOCUMENTS

2002/0133721 A1* 9/2002 Adjaoute ............ H04L 63/0407
726/23
2008/0104529 A1* 5/2008 Cravens ................ G06F 16/248
715/764
(Continued)

OTHER PUBLICATIONS

U.S. Appl. No. 16/895,180, filed Jun. 8, 2020, Hollander et al.

*Primary Examiner* — Hien L Duong
(74) *Attorney, Agent, or Firm* — Wolf, Greenfield & Sacks, P.C.

(57) ABSTRACT

Provide is a visualization system that enables generation of a "dashboard" of individual visualizations. In further embodiments, the system enables users to quickly and easily generate these visualizations and integrate complex filters, queries, aggregations, etc., with simple UI input. The visualizations can be provided as a service that requests information from an underlying database. The database itself may also be hosted as a service, permitting granular and native database functions layered with the visualization architecture. The system can support additional functionality and access management to generate visualizations that can be shared with other users and/or integrated into websites, blogs, etc. The system can handle the complex logic, data interactions, dynamic data transformation, dynamic authorization, etc., needed to manage data rules (e.g., access rules layered over database permission based control, summarization/aggregation requirements, etc.) for any data being rendered in individual visualization and/or the dashboard of multiple visualizations.

20 Claims, 34 Drawing Sheets

Related U.S. Application Data application No. 16/013,720, filed on Jun. 20, 2018, now Pat. No. 10,872,095, which is a continuation-in-part of application No. 15/604,879, filed on May 25, 2017, which is a continuation-in-part of application No. 15/042,297, filed on Feb. 12, 2016, now Pat. No. 10,031,956, which is a continuation of application No. 13/951,987, filed on Jul. 26, 2013, now Pat. No. 9,262,462, which is a continuation-in-part of application No. 13/794,710, filed on Mar. 11, 2013, now Pat. No. 8,996,463, said application No. 15/604,879 is a continuation-in-part of application No. 14/672,901, filed on Mar. 30, 2015, now Pat. No. 9,792,322, which is a continuation of application No. 13/794,710, filed on Mar. 11, 2013, now Pat. No. 8,996,463, said application No. 16/013,720 is a continuation-in-part of application No. 15/605,391, filed on May 25, 2017, now Pat. No. 10,366,100, and a continuation-in-part of application No. 15/042,297, filed on Feb. 12, 2016, now Pat. No. 10,031,956, and a continuation-in-part of application No. 14/672,901, filed on Mar. 30, 2015, now Pat. No. 9,792,322, application No. 16/895,101, which is a continuation-in-part of application No. 16/010,034, filed on Jun. 15, 2018, now Pat. No. 10,754,625, application No. 16/895,101, which is a continuation-in-part of application No. 15/223,654, filed on Jul. 29, 2016, now Pat. No. 10,891,270.

(60) Provisional application No. 62/862,979, filed on Jun. 18, 2019, provisional application No. 62/690,853, filed on Jun. 27, 2018, provisional application No. 62/690,213, filed on Jun. 26, 2018, provisional application No. 62/687,611, filed on Jun. 20, 2018, provisional application No. 62/861,808, filed on Jun. 14, 2019, provisional application No. 62/522,540, filed on Jun. 20, 2017, provisional application No. 62/522,150, filed on Jun. 20, 2017, provisional application No. 62/341,511, filed on May 25, 2016, provisional application No. 62/341,490, filed on May 25, 2016, provisional application No. 61/676,188, filed on Jul. 26, 2012, provisional application No. 62/521,303, filed on Jun. 16, 2017, provisional application No. 62/355,470, filed on Jun. 28, 2016, provisional application No. 62/262,942, filed on Dec. 4, 2015.

(51) Int. Cl.
| | | |
|---|---|---|
| *G06F 16/23* | (2019.01) | |
| *G06F 16/28* | (2019.01) | |
| *G06F 16/2455* | (2019.01) | |
| *G06F 16/2458* | (2019.01) | |
| *G06F 16/958* | (2019.01) | |
| *G06F 16/27* | (2019.01) | |
| *G06F 16/951* | (2019.01) | |

(52) U.S. Cl.
CPC ...... *G06F 16/24556* (2019.01); *G06F 16/254* (2019.01); *G06F 16/284* (2019.01); *G06F 16/248* (2019.01); *G06F 16/27* (2019.01); *G06F 16/951* (2019.01); *G06F 16/958* (2019.01)

(56) References Cited

U.S. PATENT DOCUMENTS

| | | | |
|---|---|---|---|
| 2013/0339311 A1* | 12/2013 | Ferrari | G06Q 30/06 707/687 |
| 2014/0188845 A1* | 7/2014 | Ah-Soon | G06F 16/256 707/722 |
| 2015/0082219 A1* | 3/2015 | Beck | G06Q 10/06398 715/771 |
| 2020/0301940 A1 | 9/2020 | Hollander et al. | |

* cited by examiner

FIG. 15 (partial dashboard)

FIG. 23 exchange messages based on the actions they wish to perform. Examples are illustrated below:

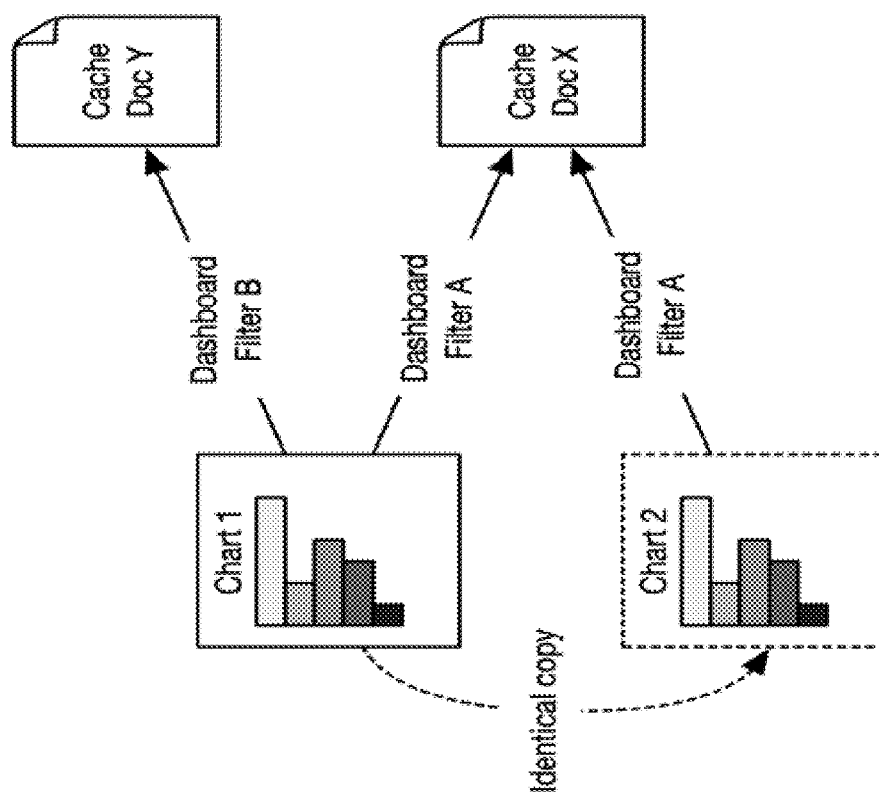

SYSTEMS AND METHODS FOR DATA VISUALIZATION, DASHBOARD CREATION AND MANAGEMENT

RELATED APPLICATIONS

This application claims priority under 35 U.S.C. § 119(e) to U.S. Provisional Application Ser. No. 62/861,808 filed on Jun. 14, 2019 and entitled "SYSTEMS AND METHODS FOR DATA VISUALIZATION, DASHBOARD CREATION AND MANAGEMENT." This application claims priority under 35 U.S.C. § 119(e) to U.S. Provisional Application Ser. No. 62/862,979, filed on Jun. 18, 2019 and entitled "SYSTEMS AND METHODS FOR MANAGING DISTRIBUTED DATABASES WITH DYNAMIC SCHEMA." This application is a continuation-in-part of U.S. patent application Ser. No. 16/010,034, filed on Jun. 15, 2018, entitled "SYSTEMS AND METHODS FOR MANAGING A DATABASE BACK END AS A SERVICE," which claims priority under 35 U.S.C. § 119(e) to U.S. Provisional Application No. 62/521,303, filed on Jun. 16, 2017 and entitled "SYSTEM AND METHOD FOR MANAGING A DATABASE BACK END AS A SERVICE." This application is a continuation-in-part of U.S. patent application Ser. No. 15/223,654, filed on Jul. 29, 2016, entitled "SYSTEMS AND METHODS FOR MODELLING VIRTUAL SCHEMAS IN NON-RELATIONAL DATABASES," which claims priority under 35 U.S.C. § 119(e) to U.S. Provisional Application Ser. No. 62/355,470, filed on Jun. 28, 2016, entitled "SYSTEMS AND METHODS FOR MODELLING VIRTUAL SCHEMAS IN NON-RELATIONAL DATABASES," and U.S. Provisional Application Ser. No. 62/262,942, filed on Dec. 4, 2015, entitled "SYSTEMS AND METHODS FOR MODELLING VIRTUAL SCHEMAS IN NON-RELATIONAL DATABASES." This application is a continuation-in-part of U.S. patent application Ser. No. 16/013,720, filed on Jun. 20, 2019 and entitled "AGGREGATION FRAMEWORK SYSTEM ARCHITECTURE AND METHOD," which claims priority under 35 U.S.C. § 119(e) to U.S. Provisional Application No. 62/522,540 entitled "SYSTEM, METHODS, AND INTERFACES FOR A NOSQL DATABASE SYSTEM," filed Jun. 20, 2017, and claims priority under 35 U.S.C. § 119(e) to U.S. Provisional Application No. 62/522,150 entitled "SYSTEMS AND METHODS FOR OPTIMIZING DISTRIBUTED DATABASE DEPLOYMENTS" and filed Jun. 20, 2017. Application Ser. No. 16/013,720 is a Continuation-in-part of U.S. application Ser. No. 15/605,391, filed May 25, 2017, entitled "AGGREGATION FRAMEWORK SYSTEM ARCHITECTURE AND METHOD", which is a Non-Provisional of Provisional (35 USC 119(e)) of U.S. Application Ser. No. 62/341,511, filed May 25, 2016, entitled "AGGREGATION FRAMEWORK SYSTEM ARCHITECTURE AND METHOD". Application Ser. No. 15/605,391 is a Non-Provisional of Provisional (35 USC 119(e)) of U.S. Application Ser. No. 62/341,490, filed May 25, 2016, entitled "AGGREGATION FRAMEWORK SYSTEM ARCHITECTURE AND METHOD". Application Ser. No. 15/605,391 is a Continuation-in-part of U.S. application Ser. No. 15/042,297, filed Feb. 12, 2016, entitled "AGGREGATION FRAMEWORK SYSTEM ARCHITECTURE AND METHOD", which is a Continuation of U.S. application Ser. No. 13/951,987, filed Jul. 26, 2013, entitled "AGGREGATION FRAMEWORK SYSTEM ARCHITECTURE AND METHOD", which is a Continuation-in-part of U.S. application Ser. No. 13/794,710, filed Mar. 11, 2013, entitled "AGGREGATION FRAMEWORK SYSTEM ARCHITECTURE AND METHOD", which is a Non-Provisional of Provisional (35 USC 119(e)) of U.S. Application Ser. No. 61/676,188, filed Jul. 26, 2012, entitled "AGGREGATION FRAMEWORK SYSTEM ARCHITECTURE AND METHOD". Application Ser. No. 15/605,391 is a Continuation-in-part of U.S. application Ser. No. 14/672,901, filed Mar. 30, 2015, and entitled "AGGREGATION FRAMEWORK SYSTEM ARCHITECTURE AND METHOD", which is a Continuation of U.S. application Ser. No. 13/794,710, filed Mar. 11, 2013, and entitled "AGGREGATION FRAMEWORK SYSTEM ARCHITECTURE AND METHOD". Application Ser. No. 16/013,720 is a continuation-in-part of U.S. application Ser. No. 15/604,879, filed on May 25, 2017 and entitled "AGGREGATION FRAMEWORK SYSTEM ARCHITECTURE AND METHOD". Application Ser. No. 15/604,879 claims priority under 35 U.S.C. § 119(e) to U.S. Provisional Application Ser. No. 62/341,511, entitled "AGGREGATION FRAMEWORK SYSTEM ARCHITECTURE AND METHOD" filed on May 25, 2016. Application Ser. No. 15/604,879 claims priority under 35 U.S.C. § 119(e) to U.S. Provisional Application Ser. No. 62/341,490, entitled "AGGREGATION FRAMEWORK SYSTEM ARCHITECTURE AND METHOD" filed on May 25, 2016. Application Ser. No. 15/604,879 is a continuation-in-part and claims the benefit under 35 U.S.C. § 120 to U.S. application Ser. No. 15/042,297, entitled "AGGREGATION FRAMEWORK SYSTEM ARCHITECTURE AND METHOD" filed on Feb. 12, 2016. Application Ser. No. 15/042,297 is a continuation of and claims the benefit under 35 U.S.C. § 120 of U.S. application Ser. No. 13/951,987, entitled "AGGREGATION FRAMEWORK SYSTEM ARCHITECTURE AND METHOD" filed on Jul. 26, 2013. Application Ser. No. 13/951,987 is a continuation-in-part of and claims the benefit under 35 U.S.C. § 120 to U.S. application Ser. No. 13/794,710, entitled "AGGREGATION FRAMEWORK SYSTEM ARCHITECTURE AND METHOD" filed on Mar. 11, 2013. Application Ser. No. 13/794,710 claims priority under 35 U.S.C. § 119(e) to U.S. Provisional Application Ser. No. 61/676,188, entitled "AGGREGATION FRAMEWORK SYSTEM ARCHITECTURE AND METHOD" filed on Jul. 26, 2012. Application Ser. No. 15/604,879 is a continuation-in-part of and claims the benefit under 35 U.S.C. § 120 to U.S. application Ser. No. 14/672,901, entitled "AGGREGATION FRAMEWORK SYSTEM ARCHITECTURE AND METHOD" filed on Mar. 30, 2015, which is a continuation of and claims the benefit under 35 U.S.C. § 120 to U.S. application Ser. No. 13/794,710, entitled "AGGREGATION FRAMEWORK SYSTEM ARCHITECTURE AND METHOD" filed on Mar. 11, 2013. This application is a continuation-in-part of U.S. patent application Ser. No. 16/442,204, filed Jun. 14, 2019, entitled "SYSTEMS AND METHODS FOR MANAGING TRANSACTIONAL OPERATION," which claims priority under 35 U.S.C. § 119(e) to U.S. Provisional Application Ser. No. 62/687,611, filed on Jun. 20, 2018, entitled "SYSTEMS AND METHODS FOR MANAGING TRANSACTIONAL OPERATION," and U.S. Provisional Application Ser. No. 62/690,213, filed on Jun. 26, 2018, entitled "SYSTEMS AND METHODS FOR MANAGING TRANSACTIONAL OPERATION WITH DYNAMIC SCHEMA," and U.S. Provisional Application Ser. No. 62/690,853, filed on Jun. 27, 2018 entitled "SYSTEMS AND METHODS FOR MANAGING TRANSACTIONAL OPERATION WITH DYNAMIC SCHEMA," each of which applications are incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various database platform and services are available both as on premises (e.g., physically resident computer resources) and through virtual compute resources, and may also include hybrids of the same. Various distributed databases provide significant capability in terms of data storage, retrieval, redundancy, security, and scalability among other options. These implementations and database as a service models can provide various database architectures tailored to client needs.

SUMMARY

The inventors have realized that one area of little development in these conventional database offerings is with respect to visualization of stored or hosted data. In essence, many of these conventional platforms require that database administrators and/or users create their own visualization of their data. These conventional approaches often require significant programing effort, and may require integration of third party services to develop meaningful visualization of the data within their database or warehouse.

Accordingly various aspects and embodiments are directed to new architecture that can be seamlessly integrated into existing database platforms and/or offerings, that enable visualization functions while preserving data access control, and even in some examples dynamic definition of data access control.

According to one embodiment, privileged services can be invoked by a visualization system through use of tokens associated with private and public functions. The private functions are made available but limited in how they can be invoked by the visualization system. The token based management provide implementation for managing access to needed privileged functions without enabling direct access to administrative privileges. In one example, the private functions allow end users to identify data sources to access (and visualize), define roles for other users to access the visualizations and/or modify them, and persist the visualizations for other users, applications, web-sites etc. In further embodiments, the visualization system can include a metadata store for retaining created visualizations, and re-generating a visualization service when called.

According to various embodiments, a visualization system can provide for generation of a visualization "dashboard" via construction of individual visualizations in the user interface and concurrent display in the dashboard. In further embodiments, the system enables users to quickly and easily generate visualizations that can form visualization dashboards. In some examples, the visualizations and resulting dashboard can be accessed as a service when requesting information from an underlying database. In further embodiments, the database itself may also be hosted as a service, permitting granular and native database controlled functions that are layered with visualization architecture supporting additional functionality and access management through the visualization interfaces implemented as a service.

In yet other examples, the dashboard can be shared with other users and/or integrated into websites, blogs, etc., with simple selections in an administrative user interface. In various embodiments, the service calls and returns can be integrated into various applications and/or website, and the administrative user interface enables selectable functionality to accomplish the same. In further aspects, the system handles the complex logic, data interactions, dynamic data transformation, etc., needed to manage data rules (e.g., access rules layered over database permission based control, summarization/aggregation requirements, etc.) for any data being visualization in individual visualization and/or the dashboard of multiple visualizations.

According to some embodiments, the visualization system is configured to provide at least one or more and any combination of the following features: link a single dashboard filter card with multiple data sources, to provide a simple and consistent filtering experience on dashboards built from multiple collections, an Embedding SDK and integration with existing authentication sessions, whereby a user token generated by the site can be sent to validate the session before the chart can be rendered; a mechanism for users to inject server-side filters to embedded charts that can be based on fields in the user token, enforcing authorization rules on embedded charts (i.e. different users can see different data depending on their roles); ability to integrate embedded charts with data access services (e.g., Stitch) roles to support more complex authorization rules; server-side caching of chart data that is based on a hash of the query, ensuring the caching behavior is correct even when dynamic filters are used, among other options.

In still further aspects, data visualization can be especially challenging in certain databases and/or data architectures. For example, dynamic schema database systems do not provide the same consistency in data architecture that may be available in relational data systems. In some examples, the underlying data structures (e.g., arrays within documents, nested documents, etc.) in dynamic schema systems create significant hurdles for consistent visualization. Some conventional visualization system deal with these data structures by flattening the data within these structures, losing information contained in the architecture itself among other issues. Various embodiments of the visualization system enables users to leverage the document data storage unit and the structural information that is part of such organization without loss of data fidelity, improving over such conventional approaches.

According to one aspect, a visualization system is provided. The system comprises at least one processor operatively connected to a memory, the at least one processor configured to instantiate a visualization application as an on demand service configured to integrate with a dynamic schema database and generate user interface displays for the visualization application. The system additionally comprises a first display configured to accept specification of a database and/or database collection to access (e.g., add a new data source), manage user access roles for visualization of the data within the database and/or collection based on defined public and private access functions (e.g., private access functions require privileged access in order to execute). The system additionally comprises a second display for visualization of a dashboard builder interface, the second display including a visualization of data fields within the database and/or database collection, wherein the at least one processor is configured to accept drag and drop operations in the user interface associated with the data fields to generate visualizations of the database and/or database collection data, and wherein the at least one processor is configured to dynamically select visualization operations responsive to data selected via the drag and drop operations.

According to one embodiment, the at least one processor is further configured to sample the database and/or database collection; identify nested database data (e.g., document with document data structure, nested arrays, etc.); and include functions associated with nested database data for selection in the user interface. According to one embodiment, the at least one processor is further configured to identify database fields has different data types and select a representative data type and associated functions for visualization. According to one embodiment, the at least one processor is configured to select the representative data type based on a most commonly occurring data type in the sample. According to one embodiment, the at least one processor is configured to display a set of missed fields, wherein the missed fields are in the database collection and not within the sample of the database collection. According to one embodiment, the at least one processor is configured to display inputs for definition of calculated fields and associate the calculated field with a data source and data visualization.

According to one embodiment, the at least one processor is configured to maintain a global identifier for the calculated filed and enable user selection of the calculated field based on determining valid permission to access the visualization. According to one embodiment, the management of the user access roles includes defining public and private access functions, wherein private access functions require privileged access in order to execute. According to one embodiment, the at least one processor is configured to limit end user access to private functions through access tokens and association between private functions and individual databases and/or database collections. According to one embodiment, the at least one processor is configured to permit access to public functions to any authorized user, and control access to the visualization system based on first set of authorization information. According to one embodiment, the at least one processor is configured to validate proper access to the private function using a second set of authorization information (e.g., private access token).

According to one aspect, a computer implemented method for generating visualizations is provided. The method comprises instantiating, by at least one processor, a visualization application as an on demand service configured to integrate with a dynamic schema database; generating, by the at least one processor, user interface displays for the visualization application; accepting by a first display specification of a database and/or database collection to access (e.g., add a new data source); managing, by the at least one processor, user access roles for visualization of the data within the database and/or collection based on defined public and private access functions (e.g., private access functions require privileged access in order to execute); displaying a second display including a dashboard builder interface and a visualization of data fields within the database and/or database collection; accepting, by the at least one processor, drag and drop operations in the user interface associated with the data fields, and responsive to the drag and drop operation, generating visualizations of the database and/or database collection data; and selecting, dynamically, by the at least one processor, visualization operations responsive to analyzing data selected via the drag and drop operations.

According to one embodiment, the method comprises sampling the database and/or database collection; identifying nested database data (e.g., document with document data structure, nested arrays, etc.); and including functions associated with nested database data for selection in the user interface. According to one embodiment, the method comprises identifying database fields having different data types; and selecting a representative data type and associated functions for visualization. According to one embodiment, the method further comprises selecting the representative data type based on a most commonly occurring data type in the sample for a respective database field. According to one embodiment, the method further comprises displaying a set of missed fields, wherein the missed data fields are in a selected database collection and not within the sample of the database collection, wherein for each sample from the database collection all respective database fields are captured. According to one embodiment, the method further comprises displaying inputs for definition of calculated fields and associating the calculated field with a data source and data visualization. According to one embodiment, the method further comprises maintaining a global identifier for the calculated filed and enabling user selection of the calculated field based on determining valid permission to access the visualization.

According to one embodiment, the managing of the user access roles includes defining public and private access functions, wherein private access functions require privileged access in order to execute. According to one embodiment, the method further comprises limiting end user access to private functions through access tokens and association between private functions and individual databases and/or database collections. According to one embodiment, the method further comprises permitting access to public functions to any authorized user, and controlling access to the visualization system based on first set of authorization information. According to one embodiment, the method further comprises validating proper access to the private function using a second set of authorization information (e.g., private access token).

According to one aspect, a visualization system configured to create interactive visualization of database data including dynamic schema databases is provided. The system comprises at least one processor operatively connected to a memory; a visualization service layer, executed by the at least one processor, wherein the visualization layer includes definition of user access roles and associated users, wherein the user access roles include at least; a first role establishing permission to view a visualization; a second role establishing permission to create a visualization based on linking to a data source; and a third role establishing administrative privileges to the visualization; (e.g., delete data source); a data access service layer, executed by the at least one processor, configured to control access and enforce data access permissions to database data contained in the dynamic schema database wherein the at least one processor is configured to manage communication between the visualization service layer and the data access service layer; enable creation of a data source from a collection in the dynamic schema database by users having an authorized user role; link the data source to a first visualization of data in the collection; render the visualization to users having an authorized user role; and dynamically define access rights to the visualization based on assignment of at least one of the first, second, or third role or a public access permission.

According to one aspect, a visualization system configured to integrate with dynamic schema databases and associated data access services for the dynamic schema database is provided. The system comprises at least one processor operatively connected to a memory; a visualization layer, executed by the at least one processor, wherein the visualization layer includes functions for dynamic definition of authorized users based on user access roles; a data access layer, executed by the at least one processor, configured to manage data access to the dynamic schema database based on pre-defined user permissions within the data access layer; manage the dynamic definition of authorized users for rendering or editing a visualization responsive to definition in a user interface; generate the visualization responsive to associating a data source containing dynamic schema database data to the visualization and selection of a least one visualization type; and render the visualization to end users responsive to resolving user access roles in the visualization layer and the pre-defined user permissions for data layer access.

According to one embodiment, the at least one processor is configured to generate an embedding visualization. According to one embodiment, the at least one processor is configured to generate the embedding visualization and define access rights in the visualization layer and validate pre-defined user permissions within the data access layer and enable rendering of the embedding visualization when requested by an application or website external to the visualization system. According to one embodiment, the at least one processor is further configured to generate the embedding visualization for rendering in an external application or website responsive, based on generating embedding code configured to render the visualization responsive to execution by the external application or website. According to one embodiment, the at least one processor is further configured to enable definition of the embedding visualization based on selection between public access and private access. According to one embodiment, the at least one processor is further configured incorporate signed private access configured to limit rendering of the visualization object or underlying data to authorized users.

According to one embodiment, the at least one processor is configured to group respective visualizations in a dashboard display. According to one embodiment, the at least one processor is configured to link executable operations to the dashboard display, and execute the linked executable operations responsive to subsequent rendering. According to one embodiment, the at least one processor is configured to define a unique identifier for a respective dashboard display and link respective users to the unique identifier to preserve customizations of the dashboard display. According to one embodiment, the at least one processor is configured to define executable operations on the data source as part of defining the visualization. According to one embodiment, the at least one processor is configured to generate a dedicated cache for storing the output of the executable operations on the data source; reference the dedicated cache in response to a request to render the visualization; and return data for rendering in the visualization responsive to a cache match.

According to one aspect, a computer implemented method for generating visualizations associated with a dynamic schema database is provided. The method comprises executing, by at least one processor, a visualization layer, wherein the visualization layer includes functions for dynamic definition of authorized users based on user access roles; executing by the at least one processor, a data access layer configured to manage data access to the dynamic schema database based on pre-defined user permissions within the data access layer; managing by the at least one processor the dynamic definition of authorized users for rendering or editing a visualization responsive to definition in a user interface; generating the visualization responsive to associating a data source containing dynamic schema database data to the visualization and selection of a least one visualization type; and rendering the visualization to end users responsive to resolving user access roles in the visualization layer and the pre-defined user permissions for data layer access.

According to one embodiment, the method further comprises generating an embedding visualization. According to one embodiment, the method further comprises generating the embedding visualization; defining access rights in the visualization layer; validating pre-defined user permissions within the data access layer; and enabling rendering of the embedding visualization when requested by an application or website external to the visualization system. According to one embodiment, the method further comprises generating the embedding visualization for rendering in an external application or website, based on generating embedding code configured to render the visualization responsive to execution by the external application or website. According to one embodiment, the method further comprises enabling definition of the embedding visualization based on selection between public access and private access.

According to one embodiment, the method further comprises incorporate signed private access control configured to limit rendering of the visualization object or underlying data to authorized users. According to one embodiment, the method further comprises grouping respective visualizations in a dashboard display. According to one embodiment, the method further comprises linking executable operations to the dashboard display, and executing the linked executable operations responsive to subsequent rendering. According to one embodiment, the method further comprises defining a unique identifier for a respective dashboard display and linking respective users to the unique identifier to preserve customizations of the dashboard display. According to one embodiment, the method further comprises defining executable operations on the data source as part of defining the visualization. According to one embodiment, the method further comprises generating a dedicated cache for storing the output of the executable operations on the data source; referencing the dedicated cache in response to a request to render the visualization; and returning data for rendering in the visualization responsive to a cache match.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 21 is an example screen capture of a user interface, according to one embodiment;

FIG. 22 is an example screen capture of a user interface, according to one embodiment;

FIG. 23 is an example screen capture of a user interface, according to one embodiment;

FIG. 31 illustrates an example relationship model between charts and cache documents and further caching of data, according to one embodiment;

DETAILED DESCRIPTION

According to various aspects a data visualization system is provided to enable intuitive generation of data visualization in environments with complex and/or dynamic data structure.

According to various embodiments, the visualization system integrated into the known MONGODB dynamic schema database. The visualization system is configured to resolve issues associated with visualizing data in such environments. According to one example, the visualization system enables clients or end users to visualize their data without customized code or integration of third party applications. Additionally, various embodiments resolve issues associated with having to move data into a different repository for visualization (e.g., eliminating the requirements for extract, transform, and load of various "ETL" systems). Further, the visualization system preserves the native format of the underlying data and captures the structural information for visualization unlike many conventional approaches that lose data fidelity in order to facilitate visualization.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

According to some embodiments, data visualizations can be constructed from data sources—reference to a database collection which contains the data to visualize (e.g., MongoDB database collection), to yield a chart, which is a visualization mapped to a single data source, and charts can be grouped in a display to create a dashboard.

Figure 1:
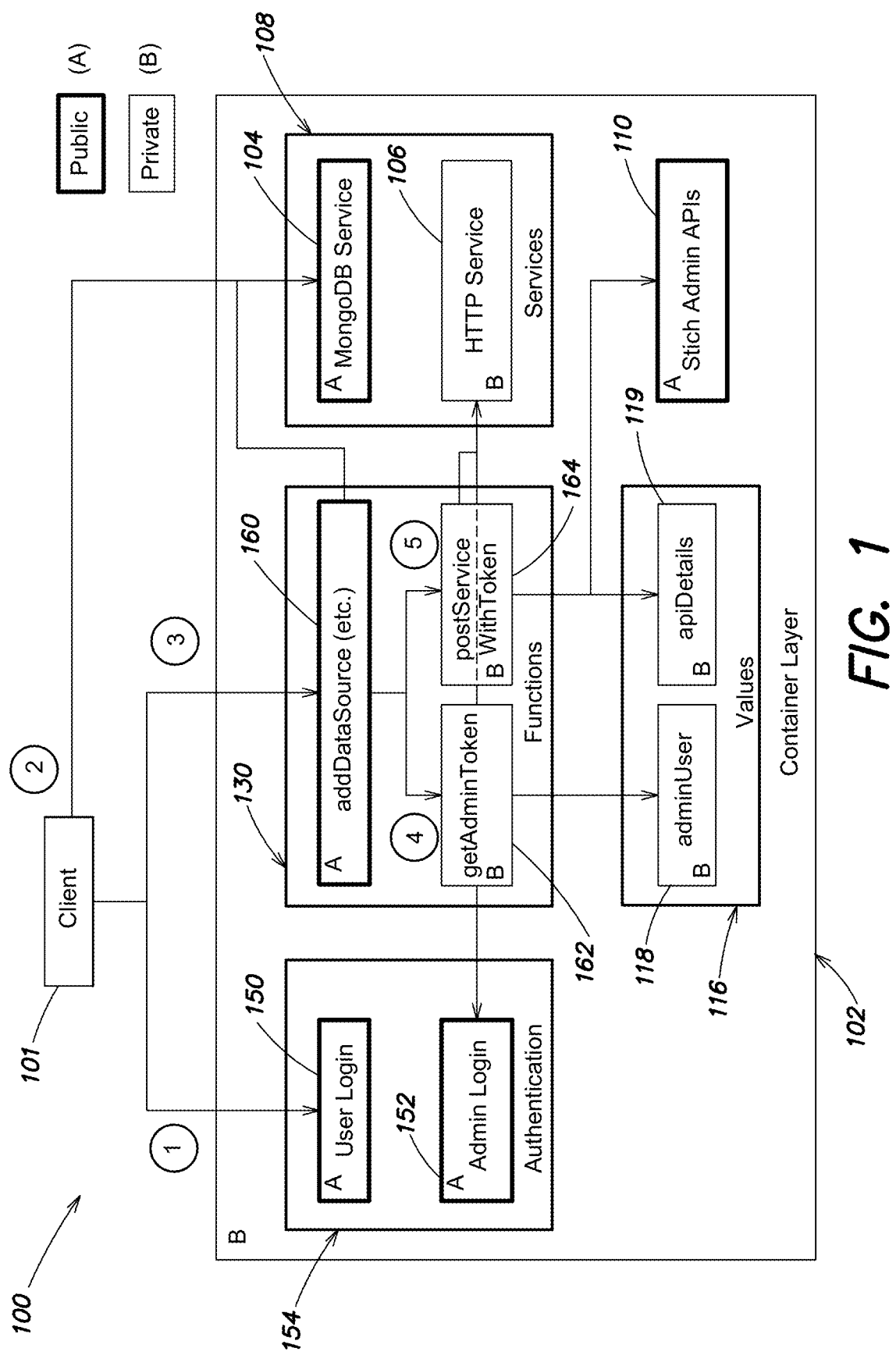
FIG. 1 is block diagram of an example system, according to one embodiment.

FIG. 1 is a block diagram of an example visualization system 100. In various embodiments, system 100 can be configured to provide visualization functions as an on-premises or locally hosted service as well as a cloud hosted and/or cloud managed solution. FIG. 1 illustrates execution steps according to one embodiment associated with the example architecture and an example functions (e.g., add-DataSource) managed by a container layer 102 (also referred to as Stitch). According to various embodiments, the visualization system enables access to underlying client data in the form of data visualizations while preserving authorization checks using public private function calls to database services. Various embodiments and functions are described in greater detail that can be used to permit access to visualization data while limiting access to operations on the underlying data.

According to further examples, the architecture and flow shown in FIG. 1 enables clients/users to be able to perform tasks that are exposed as operations in a container layer's Admin API. The functions that are managed by the visualization system include: creating, modifying or deleting container layer services (e.g., where they have appropriate roles on the corresponding Charts Data Sources); changing their own password; creating or deleting users (e.g., limited to users/clients with the User Admin role); resetting any user's password (e.g., limited to users/clients with the User Admin role), etc.

Steps 1-5 illustrated in FIG. 1 describe example flow within the architecture, and describe example implementation configured to expose privileged functions for use without compromising or providing unrestricted access to privileged operation. For example at 1, a client 101 and/or end-user authenticates to the programming container (e.g., within layer 102) and/or API that manages access to the database service/environment (and, for example, integrates visualization functionality for the data therein). In further example, a client 101 and/or end-user authenticates using their own (e.g., non-privileged) credentials, and in response an access token is returned on valid authentication. At 2, the client 101 can use this access token to call any service (e.g., 108) that the user has access to (for example, to read data from a MongoDB collection (e.g., MongoDB service 104)). At 3, when the user needs to complete a task that has a dependency on or needs a privileged API, the client triggers such a function through a user interface, which triggers the system to call the respective function (e.g., addDataSource 160). In various embodiments, the function contains custom logic configured to determine if (e.g., authorized or not) and how (e.g., what rights are available) the privileged operations can be called by the given requestor.

Upon determining the action requested is valid (e.g., authorized) at 4, the requested function (with the help of an HTTP Service 106), calls the getAdminToken private function (e.g., 162) to authenticate to the admin login endpoint (e.g., 152) using the credentials of an administrative user (which can be stored in a Value repository (e.g., 116 housing admin user information (e.g., 118) and API details (e.g., 119). At 5, once the function (e.g., 160) has the required access token, it calls the postServiceWithToken private function (e.g., 164) to call the required admin APIs (e.g. 110) (e.g., with the help of an HTTP Service 106).

The operations discussed with respect to FIG. 1 are described so that various examples services/functions called by the visualization system can be understood and implemented in a similar manner. According to various embodiments, the system manages access to capabilities that are only exposed in the container layer Admin API, and are not made available via the user API. In some settings, access to the Admin API is "all or nothing", and provides full access to all aspects of the container layer functionality/application. Within this architecture, regular user/clients are given the ability to call but not directly use such access. For example, end users/clients are given the ability to only delete Services which the user has the Data Source Admin role.

As discussed, various embodiment isolate the container layer Admin API (e.g., 110) calls into a function which executes under the context of a container layer Admin user (e.g., that can be specified at 118 and 119). In various embodiments, the function will not be exposed directly to users, but will be callable from within other functions which are exposed to the users, and which implement appropriate authorization logic before invoking the required admin calls. More detailed description of example architecture, data permission model, and example functions according to various embodiments are discussed in greater detail below.

Other operations can be managed in a similar fashion within this architecture. For example, queries on an underlying database can be executed similarly, provide access to data for visualization but not still not exposing any privileged access to the same data. In further embodiments, access roles executed in the container layer 102 can be configured to only allow detailed visualization of data to specific users, and further transform detailed visualizations into aggregation of information responsive to more limited user roles. In one example, detailed user information can be transformed into information displays on user groups so that no information visualized can be connected with any one user, but the visualization still provides aggregate user based information to the users having a more limited access role (and in further example, denies access to a visualization where even more limited access roles are defined).

In various embodiments, the visualization system enables any user to create new data sources, which result in the creation of a visualization service for that user/connection. For each service, the user is able to specify which users are able to access data from the service by assigning them to the data source reader role.

Without further architecture, the instantiated service accessing the underlying container layer, which would potentially expose privilege operation directly to the client. According to various embodiments, the visualization system is configured to protected privileged operation within the container layer to prevent users from gaining access to data in the services by programming directly against the API.

Figure 2:
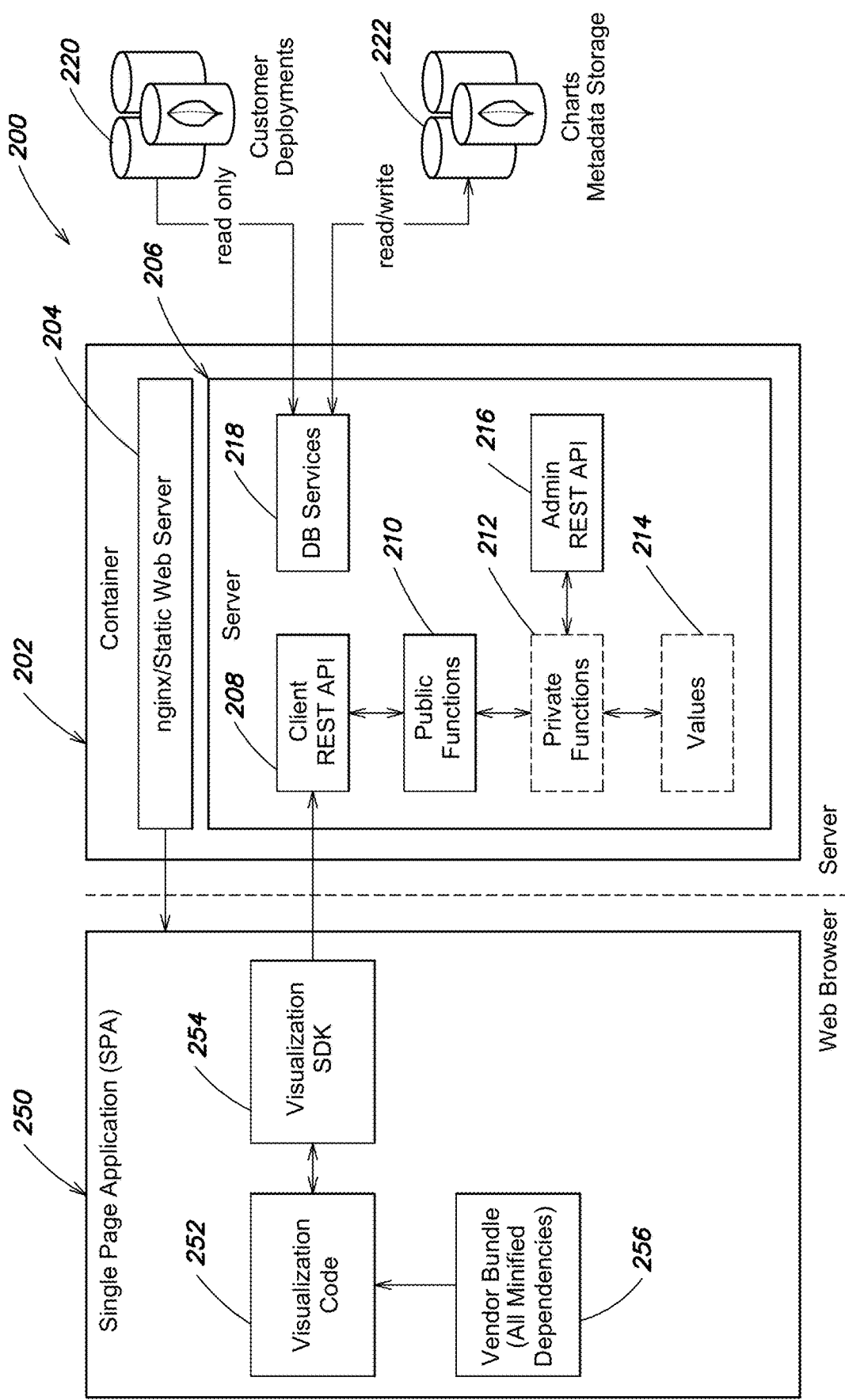
FIG. 2 is block diagram of an example system, according to one embodiment.

FIG. 2 illustrates an on-premises embodiment of the visualization system 200. According to one embodiment, in the on-premises environment the visualization functionality is encompassed in application container (e.g., docker container 202) that manages data roles and accessibility for the data being visualized. According to further embodiments, the on-premises version of the visualization system is delivered as a single docker image, which executes a container layer server on local systems (e.g., the container layer binary (e.g., server binary (and dependencies)), a web server 204 (e.g., NGIX webserver or other webserver), which enables the visualization system to execute as a single page application (SPA e.g., 206) on port 80 (configurable to other ports in other embodiments). In yet other embodiments, the single page application is further configured for reverse-proxying of all requests to the container layer API to the container layer server (e.g., listening on port 8080, among other options). Other loopback implementation can be used to manage server based architecture on local resources.

As illustrated the separation of functionality enables visualization access to locally executing database instances while also ensuring permission based control to the underlying data. According to one embodiment, a container 202 includes a webserver 204, and a data service control service 206. The control server 206 can include an API 208 (e.g., client representational state transfer ("REST") API) configured to manage calls to visualization services by the SPA 250 which can include premise executable code visualization executables (e.g., 252—which in a MongoDB implementation includes the MongoDB visualization code), visualization software development kit (SDK) 254, and any needed vendor bundlers (e.g., 256). The API 208 can control access to public functions 210, private functions 212 and any associated values 214 used. Additionally, API 208 can manage execution of requests that need to invoke administrative API 216 (e.g., an administrative REST API) for operation on data, modifying data sources, etc. Server 206 is configured to manage execution of services calls (e.g. by 218) that access customer deployments 220 and metadata storage 222, which can define access permission and which users have which user roles.

Figure 3:
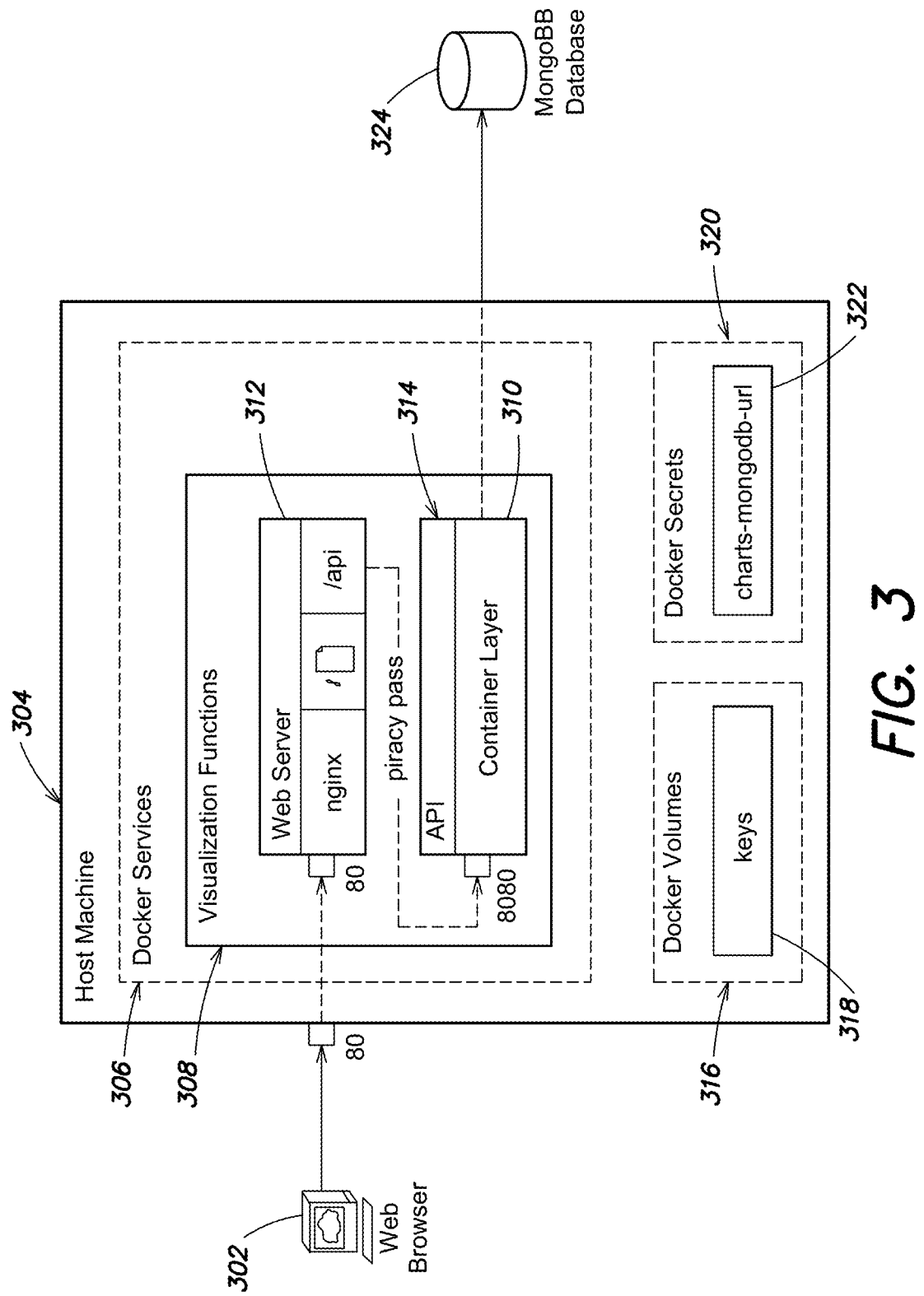
FIG. 3 is block diagram of an example system, according to one embodiment.

FIG. 3 is a block diagram showing an embodiment of the on-premises visualization system. According to some embodiments, a web browser 302 can access a host machine 304 for data requests. In one embodiment, the host machine 304 provides docker services 306 to control data visualization functionality.

In an on-premises environment the visualization functionality can be encompassed in an application container or as docker services 306 that manages data roles and accessibility for the data being visualized (e.g., via visualization functions 308). According to further embodiments, the on-premises version of the visualization system can be delivered as a single docker image, which executes a container layer 310 and can include (e.g., the container layer binary (e.g., server binary (and dependencies)), a web server 312 (e.g., NGIX webserver or other webserver), which may enable the visualization functionality to execute as a single page application on port 80 (configurable to other ports in other embodiments) in order to access database data (e.g., a mongodb database 324). In yet other embodiments, the single page application is further configured for reverse-proxying of all requests to the container layer API 314 to the container layer server (e.g., listening on port 8080, among other options). Other loopback implementation can be used to manage server based architecture on local resources. Keys used in implementing the visualization functions can be stored in docker volumes 316, e.g., "keys" 318, and any docker secret information in docker secrets 320, e.g., "charts-mongodb-uri" 322.

Figure 4:
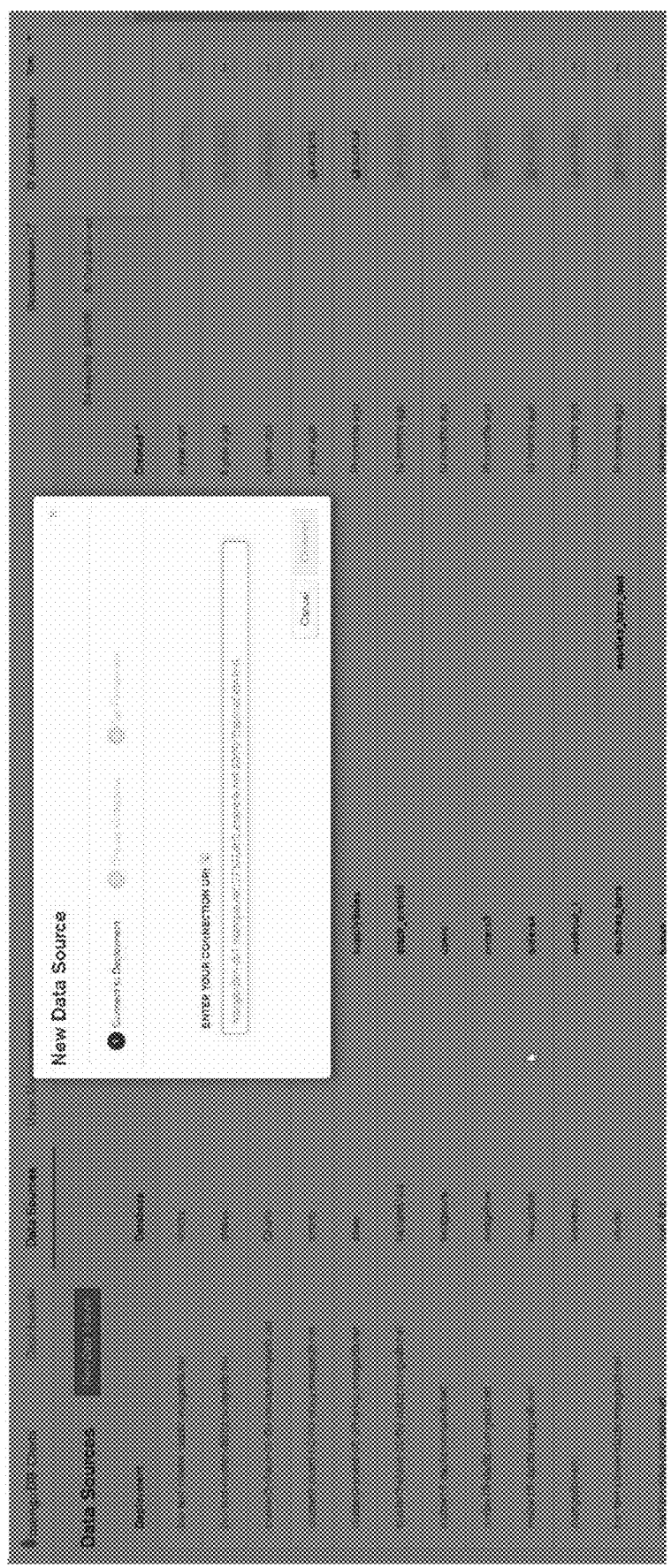
FIGS. 4-18 illustrate example user interface screens according to some embodiments.
Figure 5:
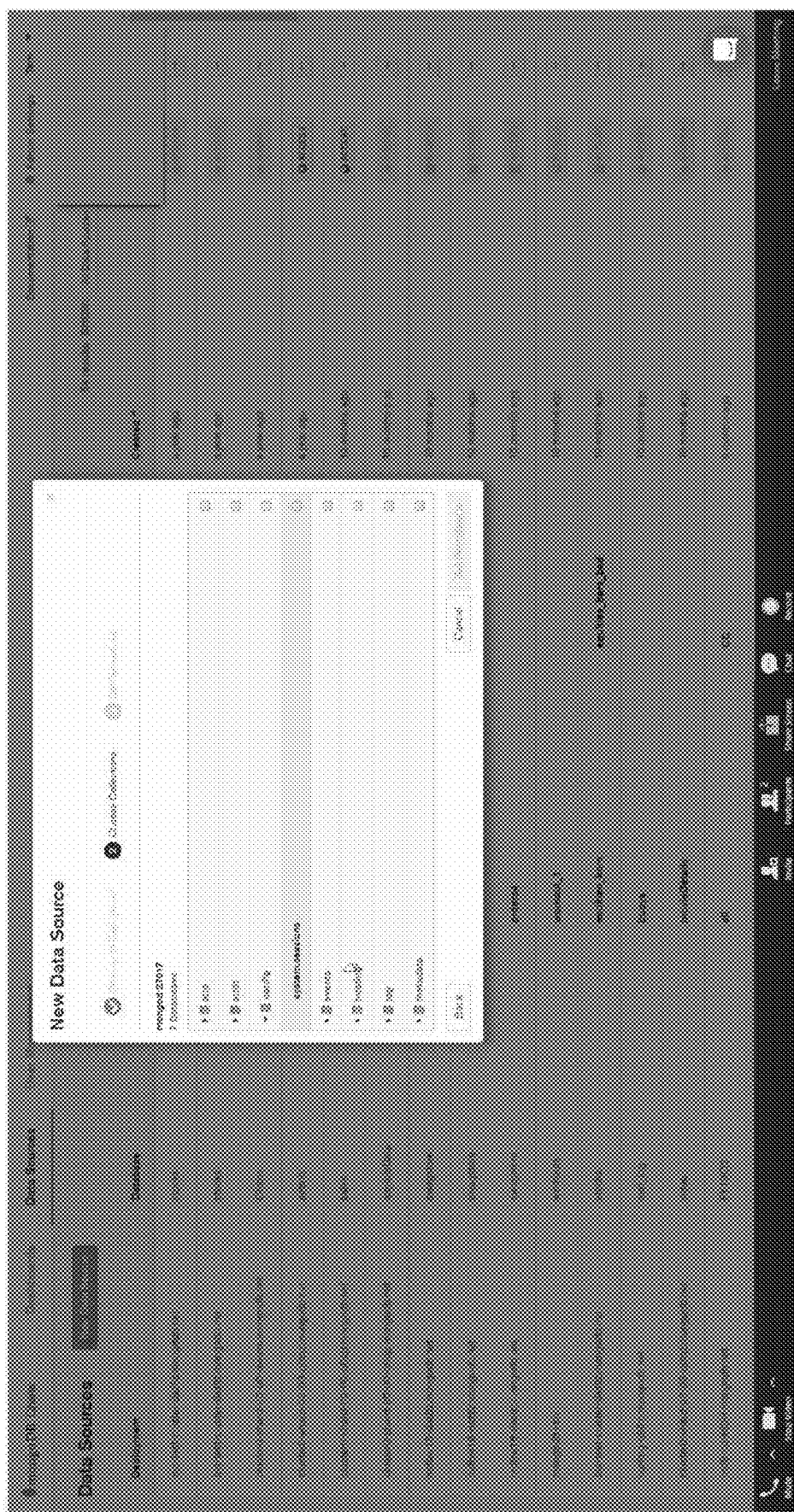
Figure 6:
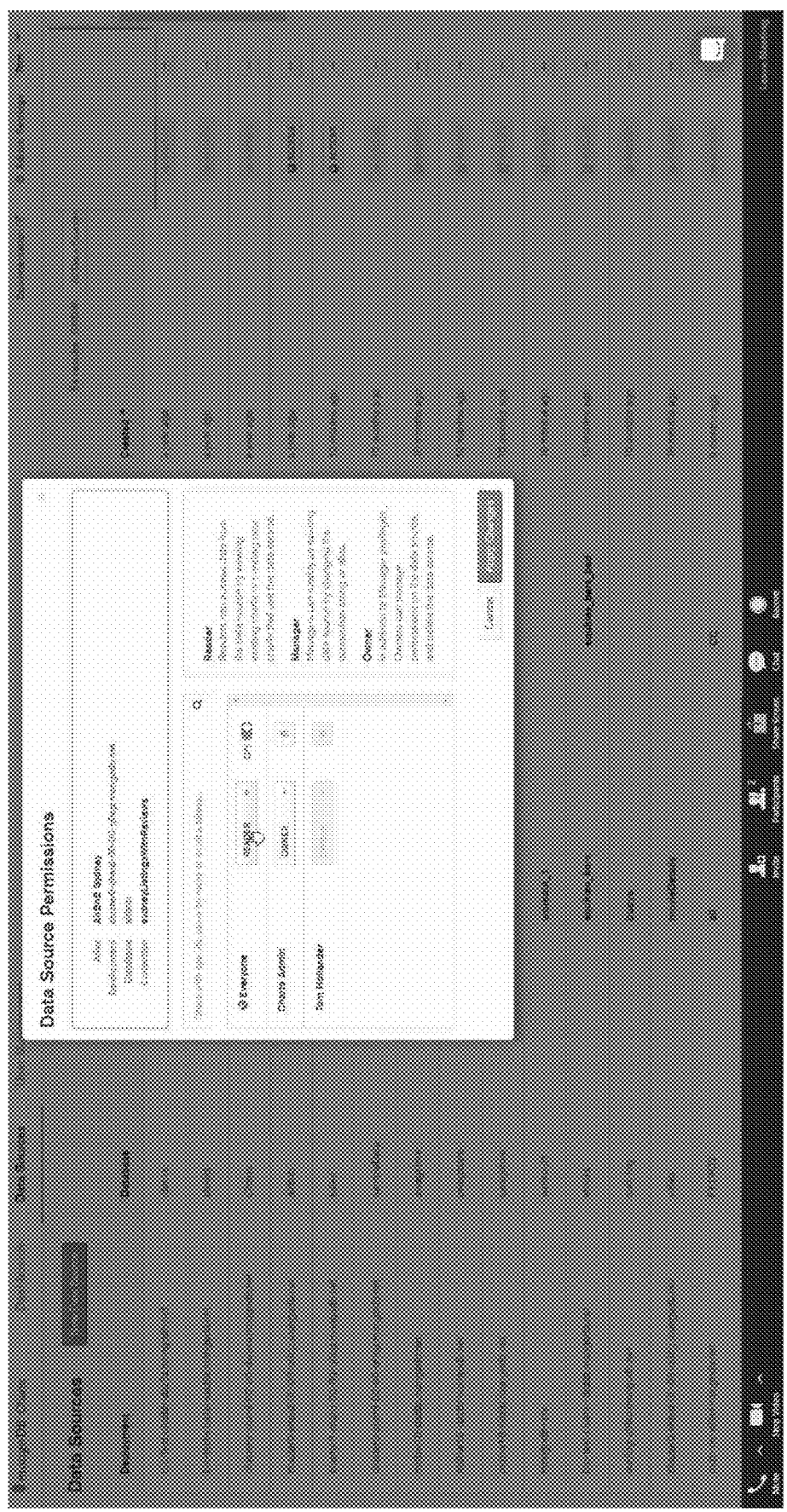
Figure 7:
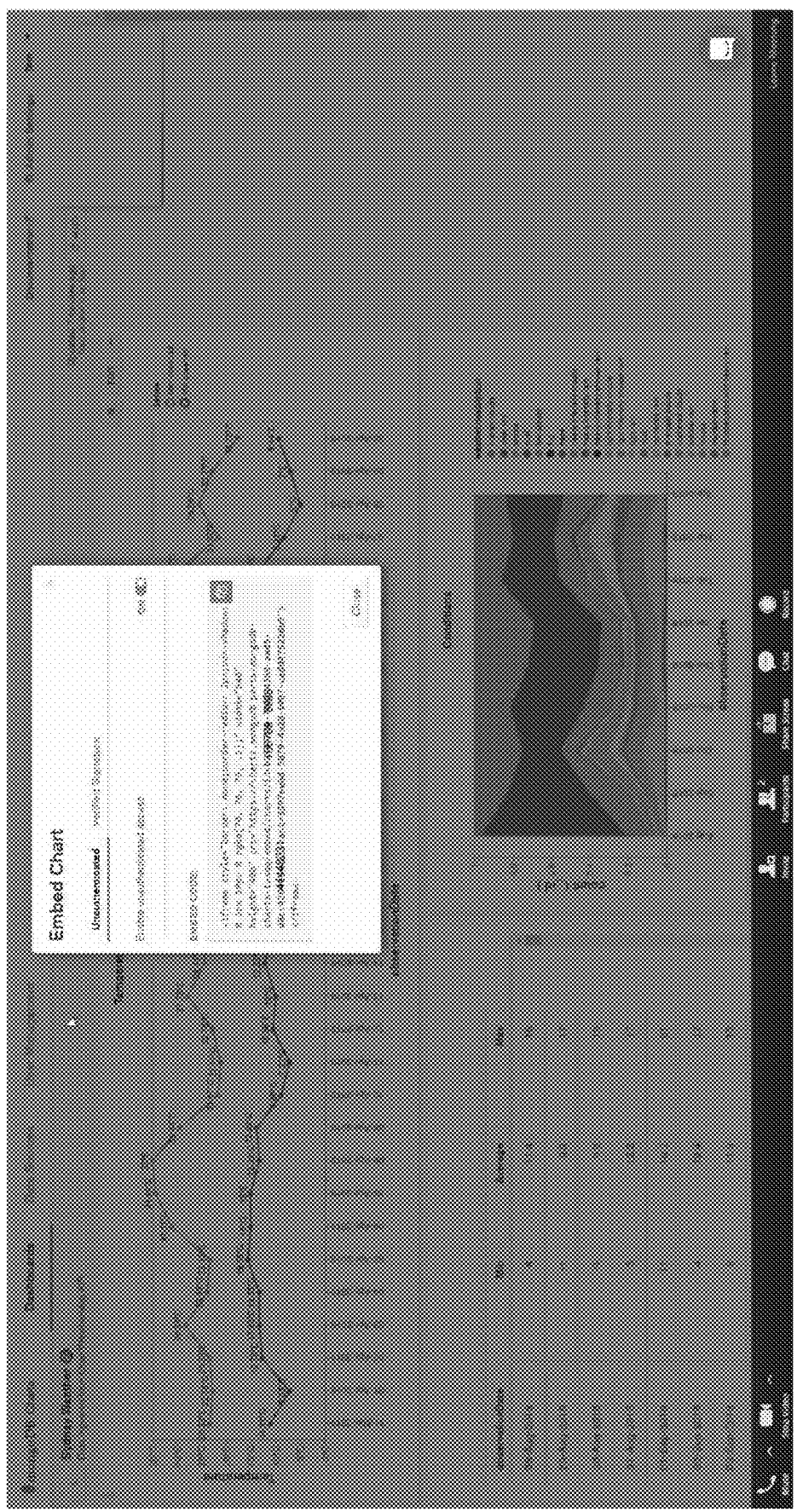
Figure 8:
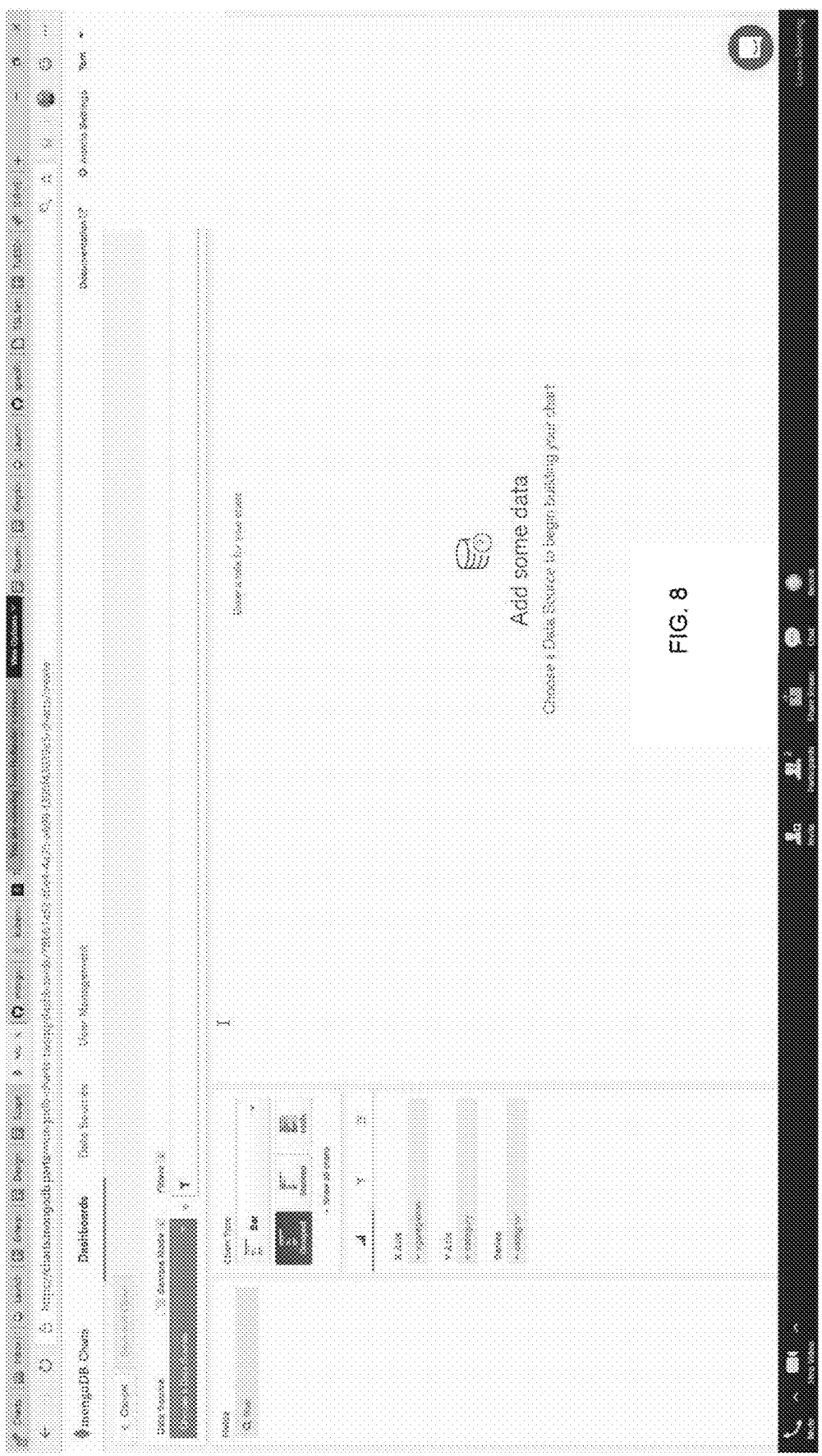
Figure 14:
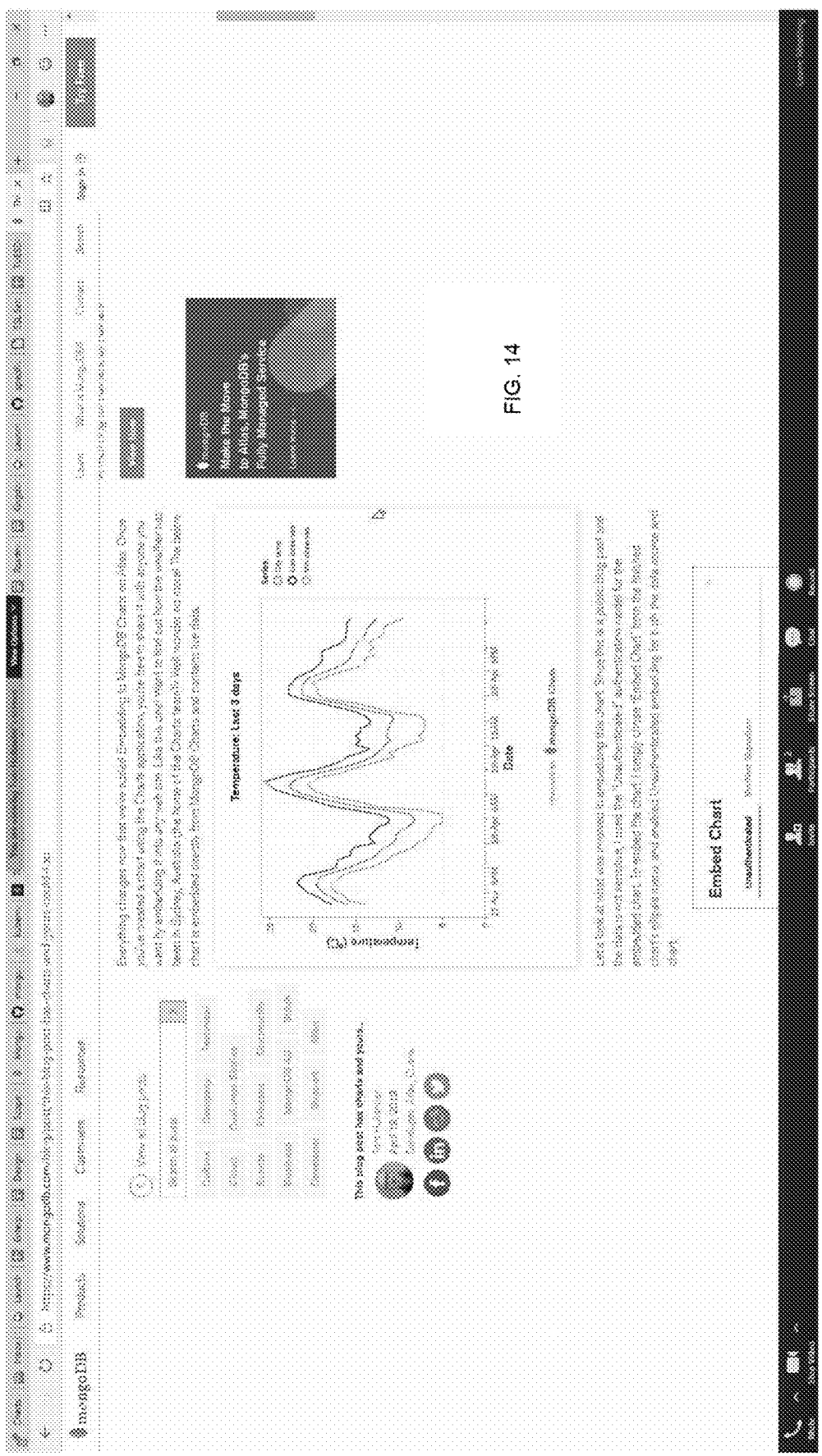

Both implementations shown in FIGS. 2-3 can be adapted to cloud based implementation. Regardless of the implementation (e.g., cloud based, managed service, on-premises, etc.), the user interface of the visualization system provides similar functionality. Shown in FIG. 4 is an example UI, configured to accept connection information to a database deployment. Once specified (and authorized), FIG. 5 shows an example interface for specifying a new data source to access and generate visualizations. FIG. 6. Shows an example interface for assigning access rights (e.g., user role) with the creation of new visualization. As shown, the interface permits sharing with "everyone" (e.g., any authorized user) and the ability to allow other users to see the visualization being created. In further embodiments, the visualization interfaces are configured to enable embedding of any created visualizations into other web-pages, blogs, etc. (See FIG. 7—including toggle functionality for controlling unauthenticated access to the embedded visualization). FIG. 14 illustrates an example of an embedded chart.

Co-pending U.S. patent application Ser. No. 16/010,034, filed on Jun. 15, 2018 and titled SYSTEMS AND METHODS FOR MANAGING A DATABASE BACK END AS A SERVICE, describes various functions and operations that can be implemented as part or integral with a container layer (e.g., "Stitch" service layer) configured to provide database backend access/functionality. The various functions described can be used in conjunction with a visualization system and support the access to database data and data retrieval. The architecture and functions described in U.S. patent application Ser. No. 16/010,034 can be executed as part of the visualization systems and various ones or combinations of the disclosed functions can be incorporated into the embodiments described herein.

FIGS. 8-18 illustrate further example screens and functions enabled through the visualization system. According to various embodiments, the system is configured to access information on an underlying database to facilitate user selection of visualization options. In one example, the visualization system is configured to identify an underlying data target contains array format information or other formats unique to documents and/or dynamic schema architecture. The visualization system can provide a filtered set of drop down options for user selection responsive to the data, collection, data architecture, and/or data target identified in the user interface. In some examples, visualization functions presented to the user are specifically tailored for use with document based data (e.g., JSON, BSON, etc.) and further configured to manage arrays, nested arrays, and/or nested documents. In further embodiments, the visualization system can be configured to associate data options selected in the user interface with query skeletons, facilitating creation of aggregation operations within a dynamic schema database.

Figure 9:
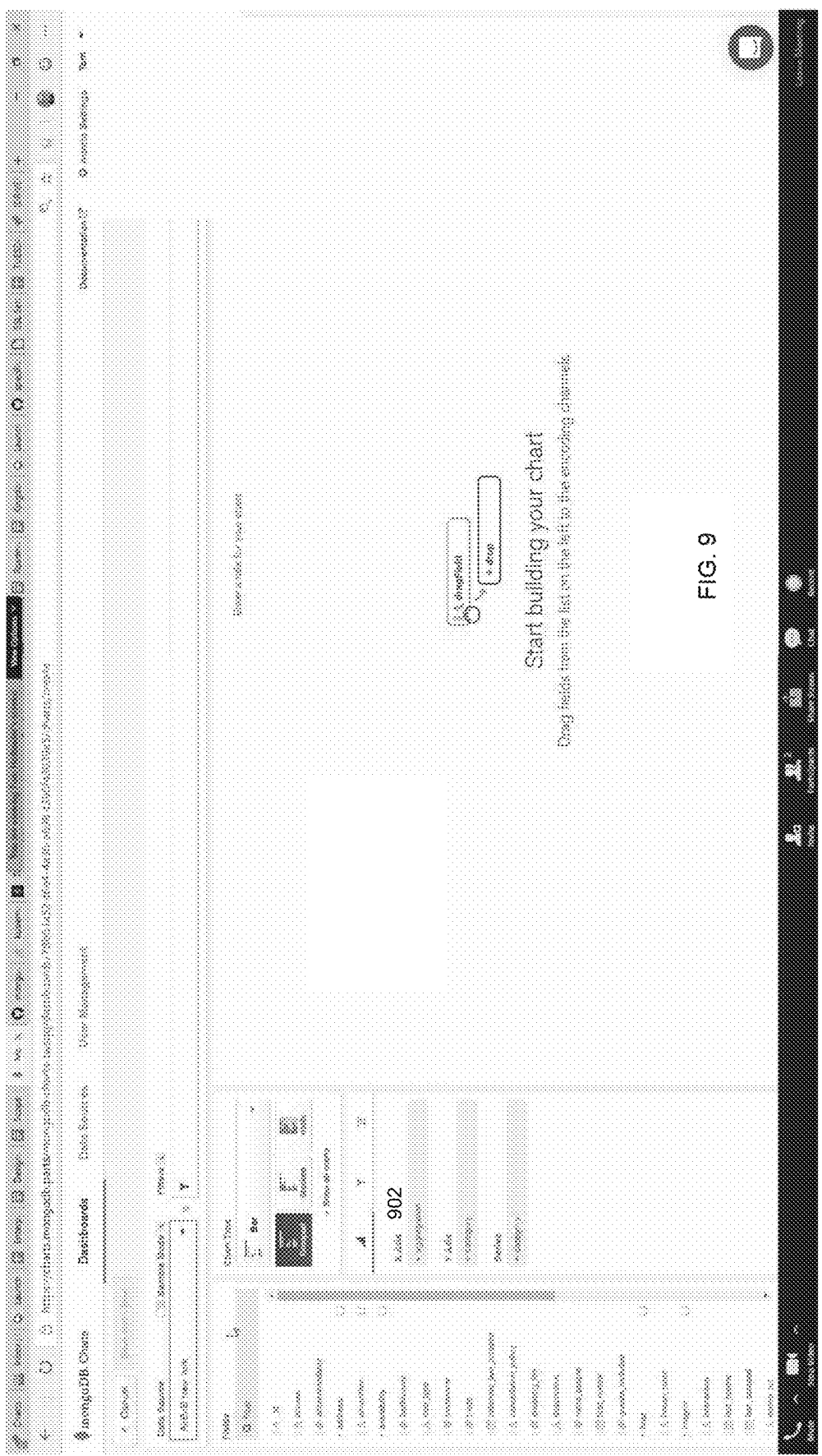

For example, FIG. 9 provides a user interface selection 902 configured to build aggregation operations and/or filters on data from a data source linked to a visualization being created—part of the x axis. As discussed, various embodiments are configured to link a data source to a chart visualization to limit the operations required to build a useful visualization. The underlying permission operations are handled based on simple selections in the user interface, which can include selection of one of at least three roles. In other examples, a user can create a public visualization (e.g., assigns a reader role to all users).

Figure 10:
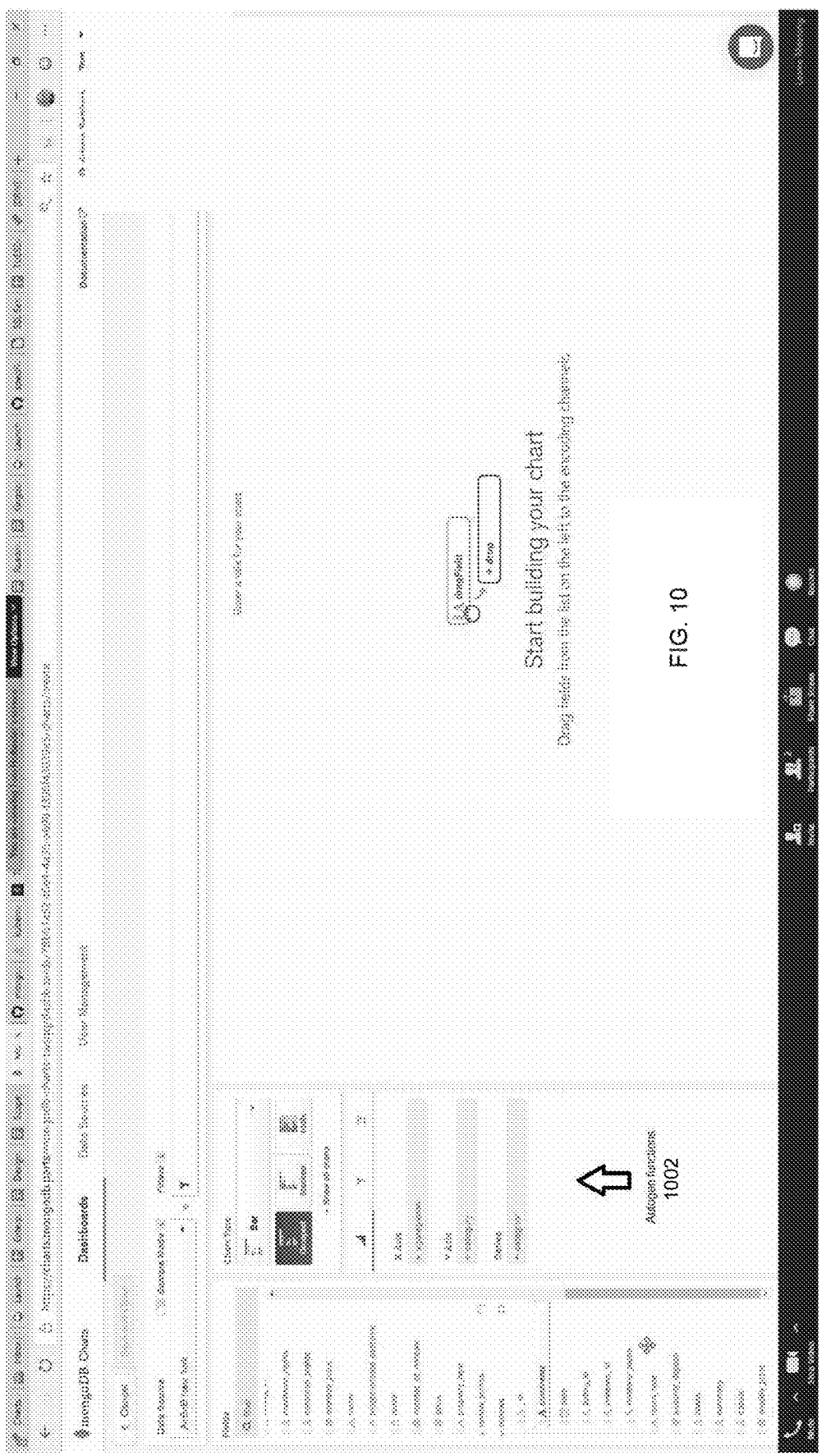

Shown in FIG. 10 are automatically generated functions (e.g., at 1002) displayed based on the data source associated with the visualization or chart under construction. According to one embodiment, the system is configured to identify data sources having nested data types (e.g., nested documents, nested array, etc.). Responsive to identifying nested data objects with a dynamic schema database, the visualization system is configured to display operations to aggregate, flatten, or manage the complex data types and preserve the relationships in the nested data for visualization.

Figure 11:

Shown in FIG. 11 are additional examples of operations that the system can present in the UI responsive to identifying a data source having nested data objects. For example, in display column 1102, the system can present data field operations that include aggregation functions to manage complex data structures, including nested data object types. For example, and id field (e.g., 1104) can trigger presentation of a series of aggregation operations that may be used to preserve information associated with the data field. The operations can include a count operations among other options.

Figure 12:
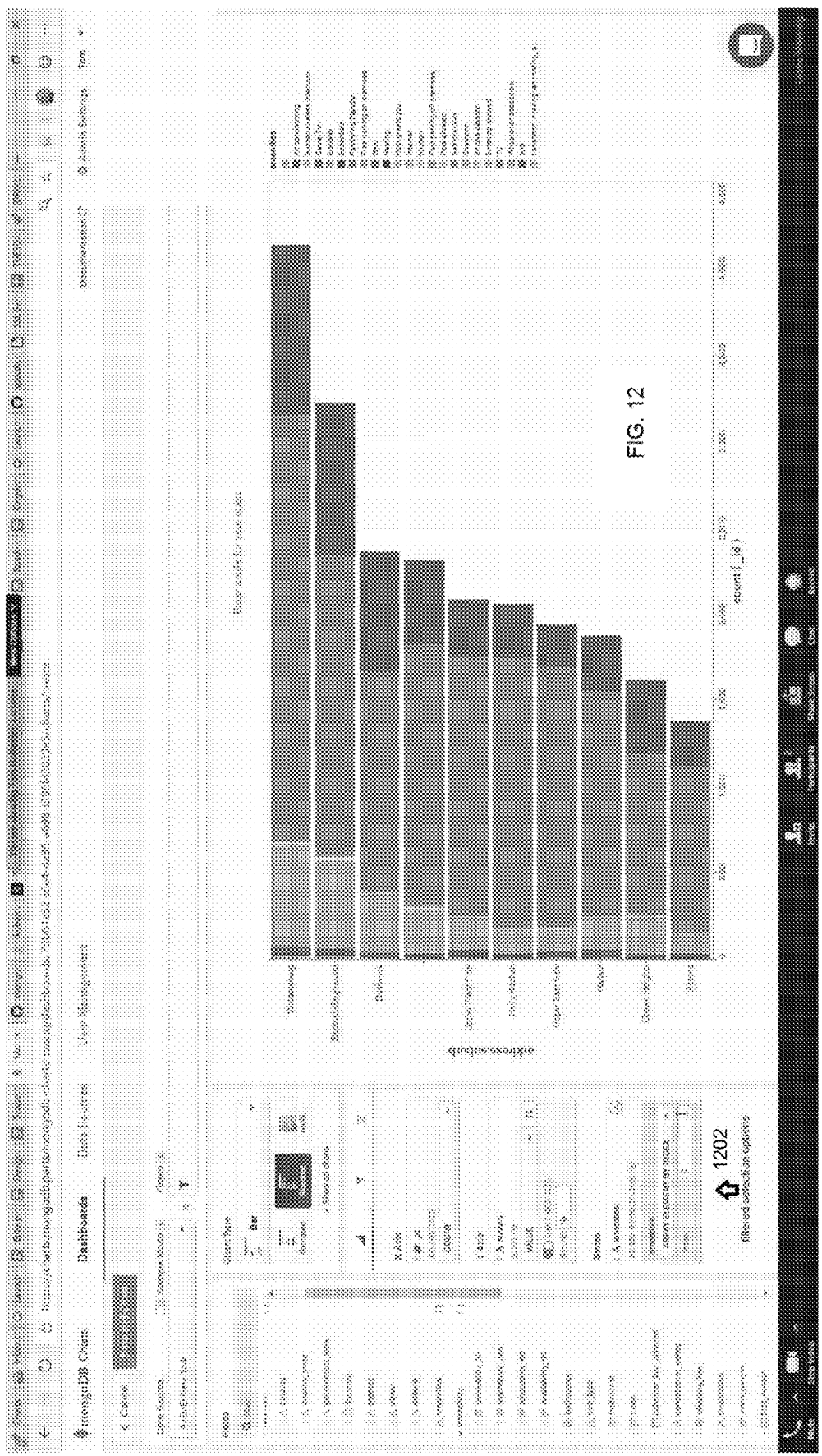
Figure 13:
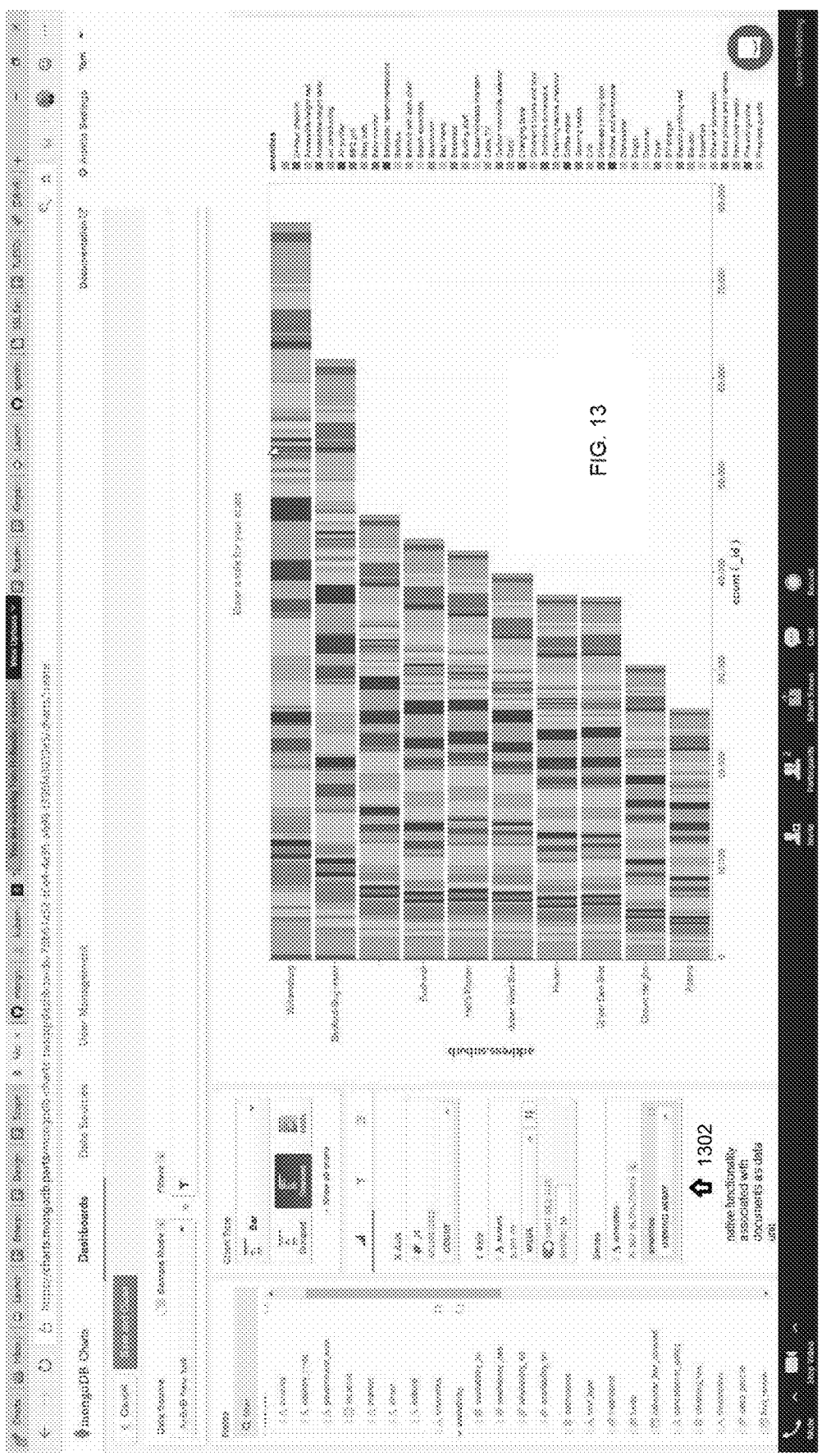

In further example, each data type (e.g., Y axis "suburb" is a string data type) can include a set of operations that are presented in the UI (e.g., 1106) for selection by the user. FIG. 12 show additional functionality presented in the UI, according to various embodiments. To facilitate interaction with array based data and/or other nested data types, the system can present options for selection array reduction operations. For example, at 1202, FIG. 12, the system is configured to select and display a series of array reduction functions that a user can select without having to code. In one example, the UI can provide the options of filtering selection options in array element by a defined index or index value. Another options native to documents as a data type which can include arrays, nested arrays, documents, nested documents, etc., includes functions for selection that unwind an array data object (e.g., 1302, FIG. 13). According to one embodiment, the unwind operation flattens the data object to ensure all internal values/data cases are considered when visualization and/or interpreting visual representations are displayed which need to account for all values in an array object (or other nested object).

Figure 15:
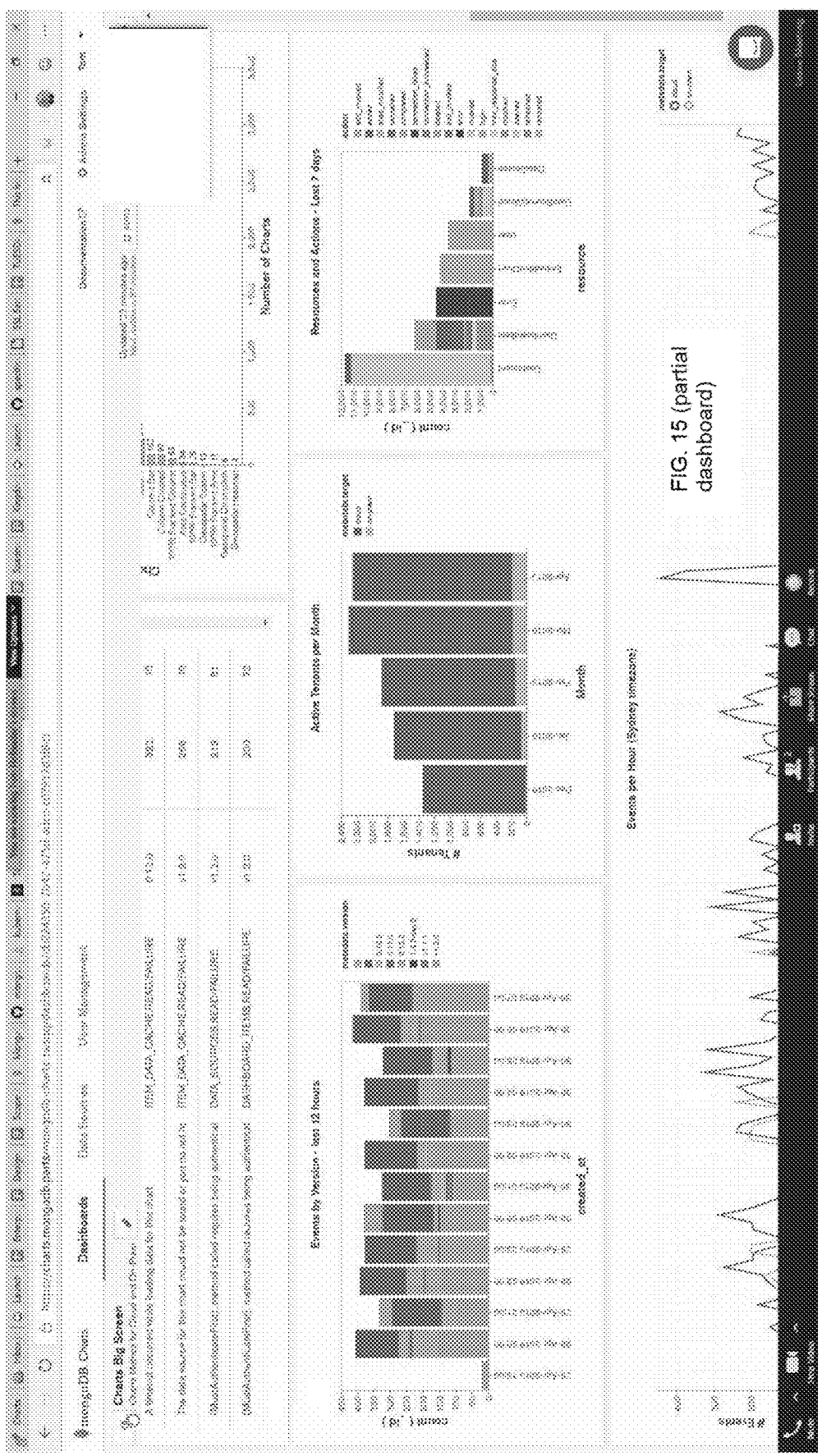
Figure 16:
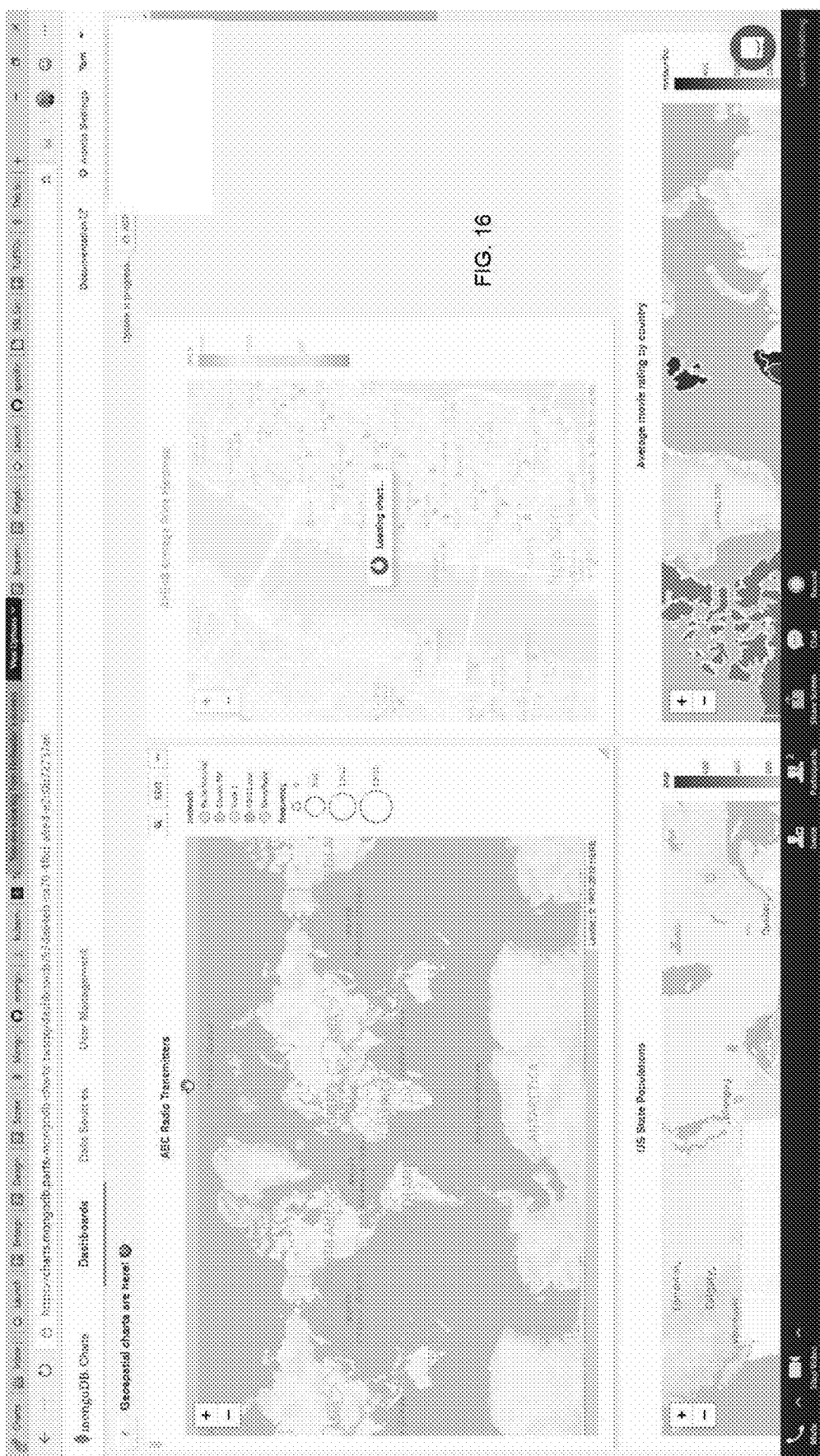
Figure 17:
Figure 18:
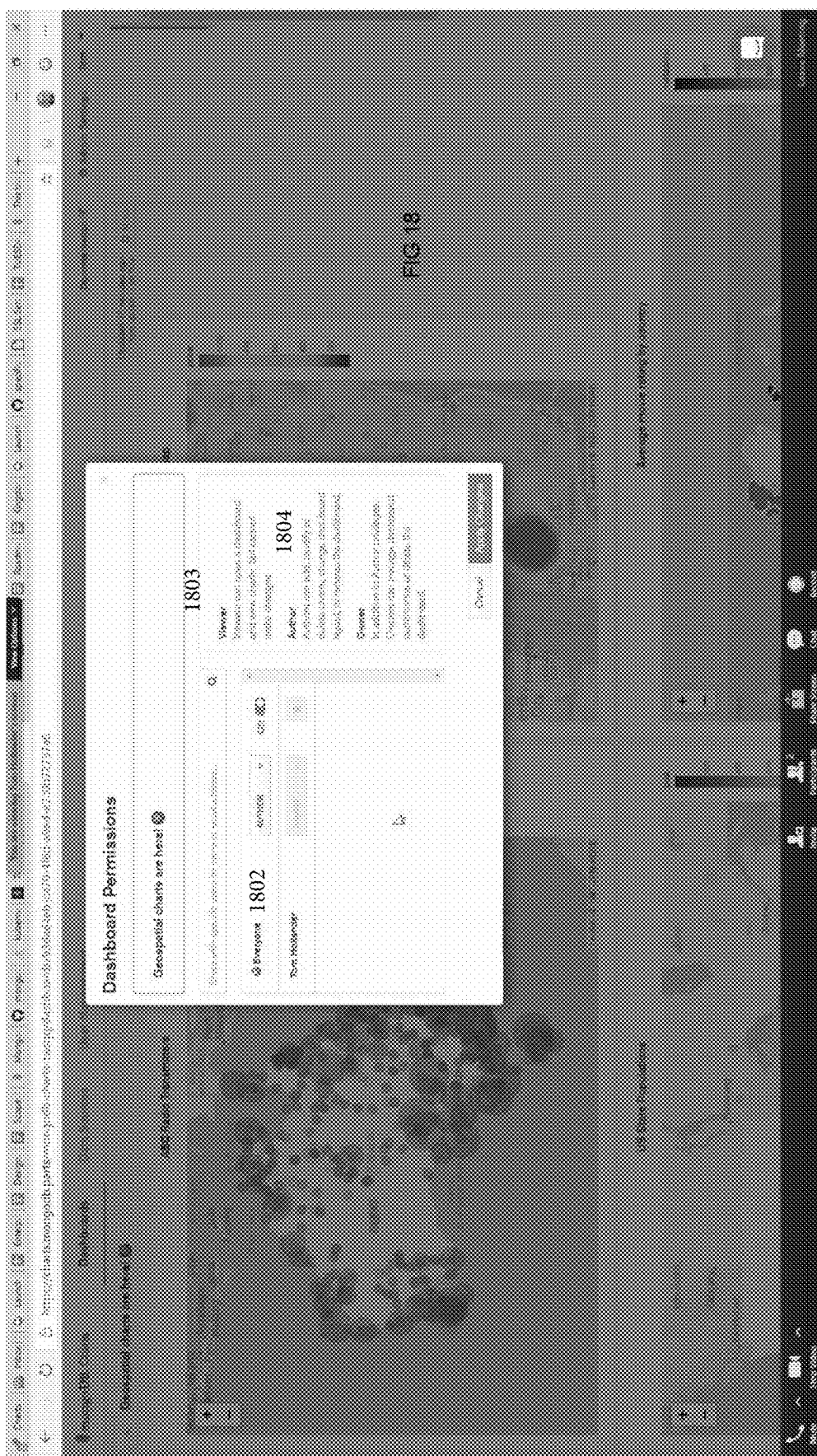

FIG. 15 illustrates an example screen capture of a partial Dashboard displaying multiple charts. FIGS. 16 and 17 are example screen captures showing geospatial chart which integrate geospatial information, and filter options, into visualizations for the end user. FIG. 18 is an example screen capture of a configuration view of the geospatial chart. As shown the user interface enables a chart owner to set permissions on the chart visualization. In this example, the user can define an Everyone group of users—that includes all users—and associated access role. In the screen capture, the user can specify "Author" for the Everyone group, giving permission to the public to edit the embedded chart. Box 1803 specifies the privileges associated with the roles that can be assigned for the user or group specified at 1802, including for example "Author" 1804. Responsive to selection in the UI, the system updates chart metadata and access to respective functions and their tokens to enable the role for subsequent access.

According to various embodiments, the visualization system enables collaboration within customer organizations by enabling users to build and view dashboards in a web browser. Stated broadly various embodiment of the visualization system can be conceptually thought of as a content management system (CMS) that manages data sources (which map to collections in a dynamic schema (e.g., MongoDB) deployment), charts and composed dashboards of the same. According to some embodiments, the visualization system is specially configured to manage and leverage the rich document model of dynamic schema databases (e.g., MongoDB) and natively support handling of sub-documents and arrays for any level of nesting within such data.

In various embodiments, users can connect dynamic schema database instantiations and specific database sources within the databases (e.g., MongoDB collections) as data sources and use an intuitive drag & drop interface to encode fields in the collection to channels of a Chart. In some embodiments, channels differ per chart type and variant, and allow the user to aggregate, bin, sort and limit data to create meaningful visualizations of data. Multiple charts can be arranged on dashboards, and subsequently shared with other users through a built-in sharing dialog in the user interface. Permissions are enforced using configurations in the container layer (e.g., access token and public/private functional calls) to securely access data from a dynamic schema database (e.g., MongoDB), enable user management, authentication, authorization, application-level metadata (e.g., dashboard definitions, etc.), and more.

According to other embodiments, the visualization system is configured with self-checking properties to validate selected data fields are compatible with the visualization being created and/or each other. In further example, query skeletons can be accessed based on data fields being selected in the user interface, where the query skeletons can be used to automatically create aggregation pipelines for end users. Multiple query skeletons can be matched to data sources, data fields, etc., and each match can be presented as part of a drop down list. In further examples, some options can be excluded based on the data selected, and the UI modified to add and/or eliminate drop down options dynamically.

Co-pending U.S. patent application Ser. No. 16/013,720, filed on Jun. 20, 2019 and titled AGGREGATION FRAMEWORK SYSTEM ARCHITECTURE AND METHOD, describes various functions and operations that can be implemented as part or integral with a visualization system, query execution, query assembly, query validation, etc., and is incorporated herein in its entirety. The various functions described can be used in conjunction with a visualization system and support the access to database data and data retrieval. The architecture and functions described in U.S. patent application Ser. No. 16/013,720 can be executed as part of the visualization systems and various ones or combinations of the disclosed functions can be incorporated into the embodiments described herein. In various embodiments, the visualization system and displayed users interfaces bridge aggregation functionality, for example, into drop down selections in the user interface during creation of chart visualization, and/or responsive to editing the same.

The following examples and embodiments describe additional functions and functionality implemented by various embodiments of the visualization system, and include options for custom authorization rules and architecture to access privilege function without exposing privileged operation to the user. For example, aggregation operations can be defined and called as functions the permit execution but limit direct data access as described herein. The various examples described herein are intended to be used together in various examples, and can support stand-alone implementation.

Example Functionality of Various Embodiments, Including Examples for Restricting access to Data Source Services According to some embodiments, the visualization system allows any authorized user to create new data sources, which results in the creation of a data access service (e.g., Stitch Service) that controls access to the underlying data. For example, the user is able to specify on the system which users are able to access data from the created service by assigning them to the Data Source Reader role.

It is realized that even if the visualization system (e.g., and an associated "Charts" application) implements logic to limit which users can use which data sources, the underlying data access services (e.g., Stitch services) can still be exposed directly to the client. The result can be a security vulnerability, unless these services are protected within the services architecture (e.g., Stitch), and a user could gain access to data in the services by programming directly against any API designed to interact with the underlying data (e.g., the Stitch API).

Solution Examples

Embodiments of the system can use functions to apply custom authorization rules to the database services (e.g., MongoDB Services). In further example, the system is architected to define an access function which is created to correspond to each data source.

In some embodiments, the system includes a collection datasources within that is stored in a metadata database (e.g., a Charts metadata database). In one example, the collection contains documents with the following structure:

```
{
    "_id":"somunique-vlaues-46a6-93f4-1xxxxxxxxxx",
    "stitchServiceName":"7999999-fcf9-4d996-b999-709999999999",
    "Deployment":"datawhprod-cmss-shard-00-00-99999.mongodb.net",
    "Database":"metrics",
    "Collection":"events",
    "alias":"Dog",
    "readers":
    [
        "5a693ae5cfb7379526bd9dca",
        "5a693af88f25b9e8a53ae623",
        "5a6e95ceb8b9989fc97594c3"
    ],
    "writers":
    [
        "5a693ae5cfb7379526bd9dca",
        "5a6e95ceb8b9989fc97594c3"
    ],
    "owners": [
        "5a693ae5cfb7379526bd9dca"
    ],
    "lastModified":"2018-01-18T04:26:35.530Z",
    "schemaVersion":0
}
```

According to one embodiment, the "readers", "writers" and "owners" fields which specify which users (represented as service based user IDs (e.g., Stitch User IDs)) have defined roles for a data source. In some embodiments, the "readers" field is used to grant access to the data in the service itself (e.g., MongoDB service), and not just the metadata.

According to some embodiments, to enforce the required authorization, the system executes a function checkData-SourceAuth which is configured to check if a user is in the "readers" role for a particular data source on execution. In some environments and/or production implementation, the system is configured to support the case where "everyone" is assigned reader permissions.

Example code for a source authentication function is described below, although in other embodiments, other coding can be used and different calls used to determine authorization.

```
checkDataSourceAuth (private function)
exports = function(serviceName, database, collection) {
    var mongodb = context.services.get("metadata");
    var coll = mongodb.db("authDemo").collection("datasources");
    var doc = coll.findOne({ "stitchServiceName": serviceName,
        "database": database,
"collection" : collection });
    if (doc === undefined)
    {
    return false;
    }
    return doc.readers.indexOf(context.user.id) >= 0;
};
```

According to another example, the system is configured to create a read rule on each namespace (e.g., collection of database documents) when the data service is created. The read rule is configured to call an authorization function (e.g., a checkDataSourceAuth function). Example code showing some implementation details based on a MongoDB implementation follows:

```
Read Document Rule on MongoDB Service Namespace
{
  "%%true": {
    "%function": {
      "name": "checkDataSourceAuth",
      "arguments": [
        "<<Stitch Service Name set programmatically when rule
          created>>"
        "<<Database Name set programmatically when rule created>>",
        "<<Collection Name set programmatically when rule created>>"
      ]
```

```
    }
  }
}
```

In various embodiments, execution of the read rule triggers the system to check the readers list stored in the document metadata, and confirm the current user is a reader on an attempt to read. In various examples, the system can be configured to check the reader role on every attempt to read.

Furthermore, since data sources can be configured to not be writable by any user, the system can implement a simple rule to block all writes as part of implementing the data access and visualization functionality.

Example code showing some implementation details based on a MongoDB implementation follows:

```
Write Document Rule on MongoDB Service Namespace
{ "%%true": false }
```

Example Functionality of Various Embodiments, Including Example Authorization for Dashboards and Data Source Metadata According to some embodiments, the system includes a user access model that includes definitions for at least three role levels which dictate what access a user has to a particular dashboard or data source metadata:

Reader—can read data but cannot make changes

Writer (aka "Author" for dashboards or "Admin" for Data Sources)—can write data but cannot change permissions Owner—can change permissions (add/remove users from any of the 3 roles).

In various embodiments, the user access model can be implemented within the database services layer (e.g., a container layer (e.g., Stitch)), and the resulting architecture can be configured so that users cannot view or modify data that they are not authorized for, even if they program directly against any API in the services layer.

Example Functionality of Various Embodiments

In various embodiments, the system can enable access control functionality by augmenting built-in authorization capabilities. As with the example discussed above, assume that both dashboards and data sources have arrays specifying which users have which permissions. A code based example showing some implementation options follows:

```
{
    "_id":"somunique-vlaues-46a6-93f4-1xxxxxxxxxx ",
    "stitchServiceName":"770fc8b4-fcf9-4d16-b8e3-709227a38e09",
    "Deployment":"datawhprod-cmss-shard-00-00-xxxxxxxxxxxxxxxxx.mongodb.net",
    "Database":"metrics",
    "Collection":"events",
    "alias":"Dog",
    "readers":
    [
        "uniqueidentifierxx6677788",
        "5uniqueidentifierxx6677788",
        "5 uniqueidentifierxx67594c3"
    ],
    "writers":
    [
        ""uniqueidentifierxx6677788",
        "5uniqueidentifierxx6677788"
    ],
```

```
    "owners": [
        "uniqueidentifierxx6677788",
    ],
    "lastModified":"2018-01-18T04:26:35.530Z",
    "schemaVersion":0
}
```

In various embodiments, the UI is configured to resolve these permissions as cumulative (an owner is automatically a writer, and a writer is automatically a reader), for simplicity this example treats each permission as distinct. The actual implementation could either follow this model and remove duplicates in the UI, or implement more complex rules to support the cumulative roles directly in the authorization checks.

In further embodiments, and unlike other scenarios described herein, implementing these authorization rules only requires a check of the permissions within each document being read or written to. For example, to support the "readers" role, the system provides a document-level Read Rule for each of the metadata collections (e.g., datasources and dashboards). Various implementation is configured to handle the use case where "everyone" is assigned reader permissions.

An example of a read document rule on an example MongoDB service metadata namespaces follows. Example implementation can include code similar to the following:

```
{
    "readers": "%%user.id"
}
```

In further example, the system can include a document-level validation for each of the metadata collections (e.g., datasources and dashboards) to support the "writers" role that specifies the user must be in the writers array when updating an existing document, but that any user can create. Similar to reader roles, the system is configured to support implementations where "everyone" is assigned writer permissions.

Valid Document Rule on MongoDB Service metadata Namespaces Example
```
{
    "%or": [
        {
            "%%prevRoot.writers": "%%user.id"
        },
        {
            "%%prev": {
                "%exists": false
            }
        }
    ]
}
```

According to some embodiments, to prevent writers from modifying the sensitive fields (readers, writers, owners) the system implements a blank write rule at the document level, meaning writing of individual fields is blocked by default.

Figure 21:
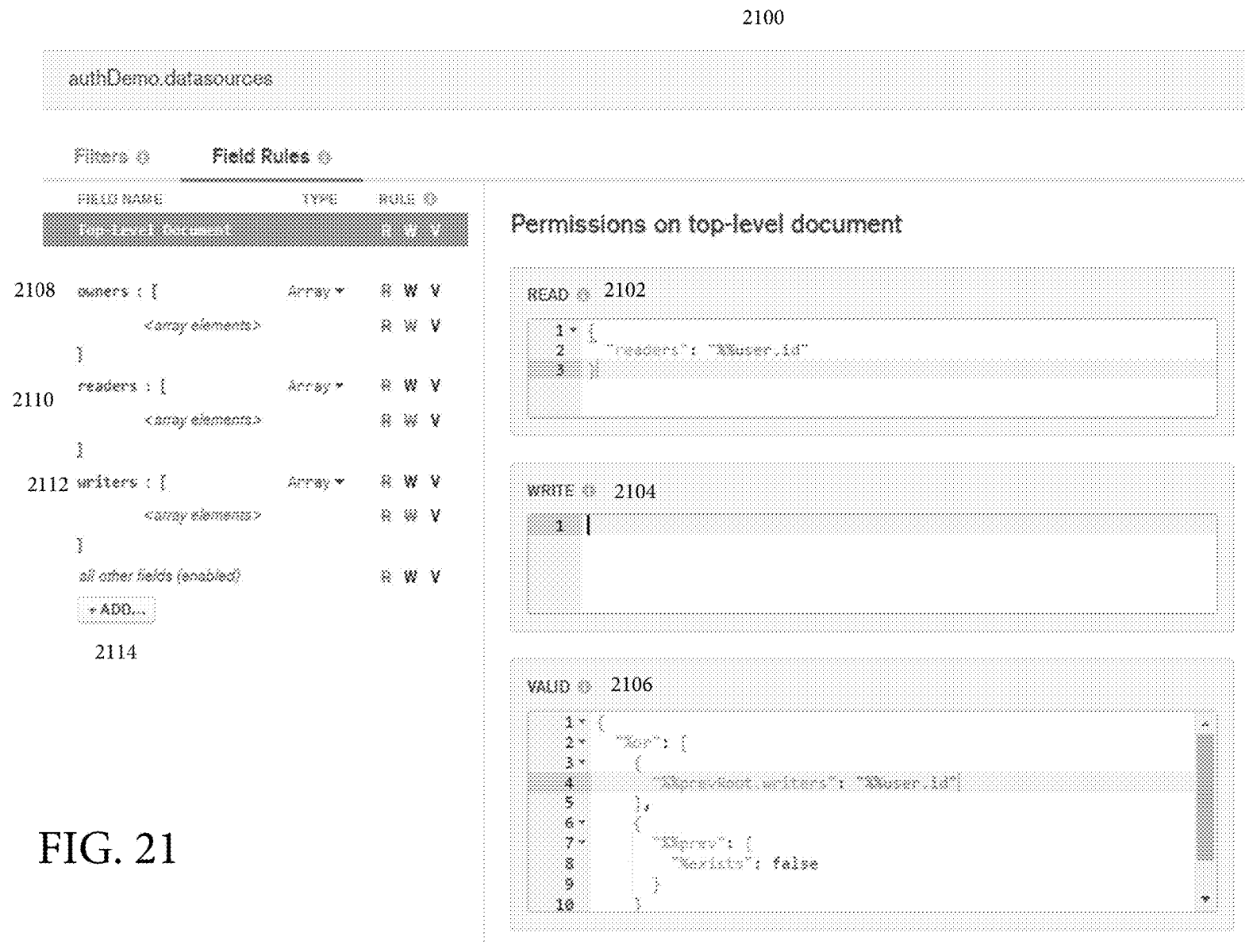
Figure 23:
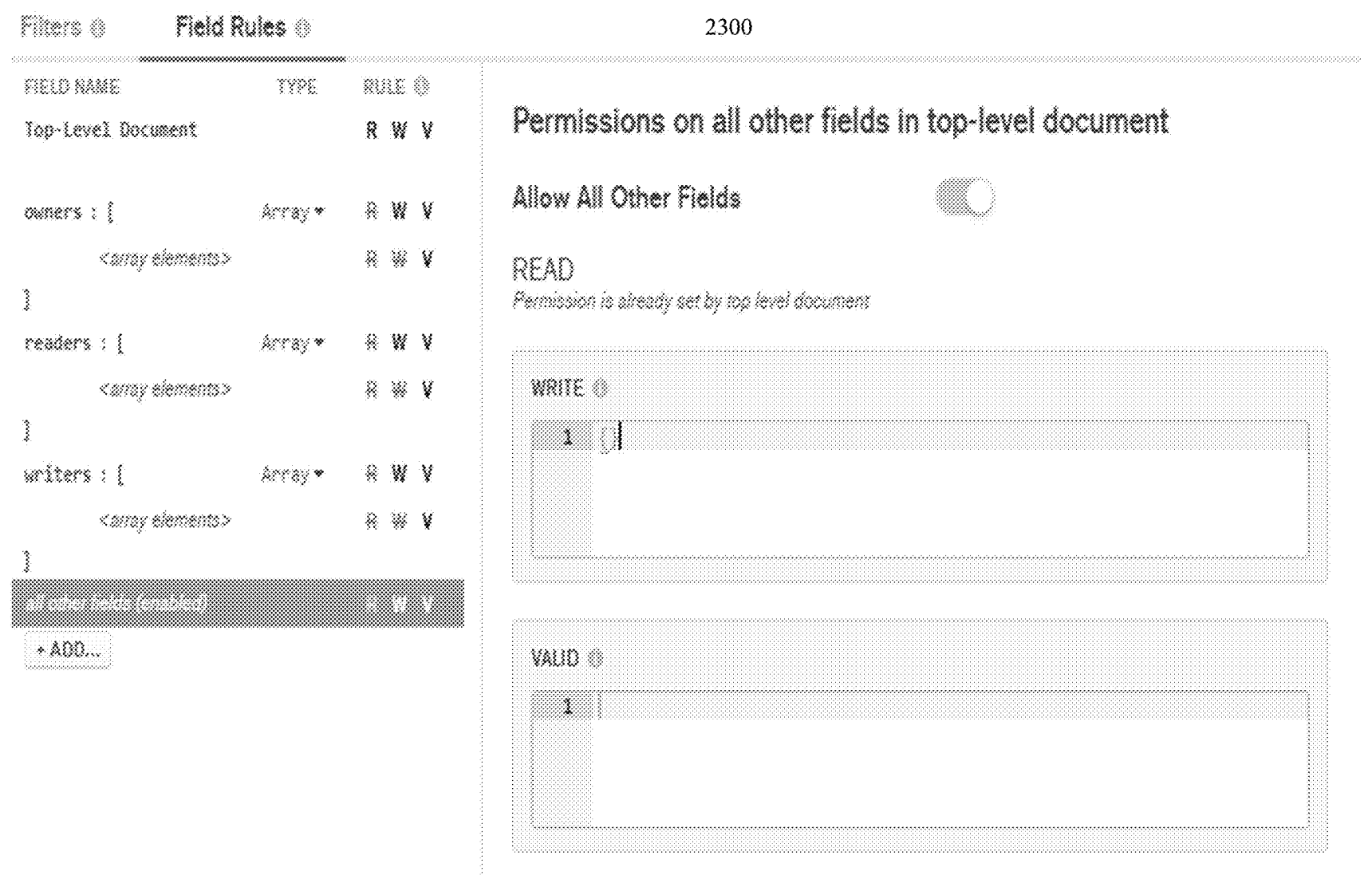

Various user interface examples are shown in FIGS. 21-23. FIG. 21 shows an example screen capture of user interface 2100 according to one embodiment. The user interface 2100 provides displays specifying users with the reader role, users with the right role 2104, and validation check at 2106 that can be executed responsive to respective data access operation. On the left side of the user interface 2100 shown are a set of three default rules 2108-2112. The system can be configured to add custom roles when creating a data source or editing its permissions. For example at 2114 the user interface displays a visual icon for adding and defining a new role type and rule. According to some embodiments, to support the "owners" role, the system is configured to enable per-field rules for each of the readers, writers and owners fields (i.e. the fields to protect). Since these are arrays, the system sets the data type to array and then permits a user to specify a write rule on the array field (in this example not the array elements—although other examples can include this option). According to one example, a write rule can state that the user must be an owner to modify an existing document, but any user can create a new document. The system can also be configured to support the case where "everyone" is assigned owner permissions. FIG. 22 shows an example screen capture of the user interface 2200 according to one embodiment. The user interface 2200 expands on the functionality shown in user interface 2100 and illustrates additional detail on defining a right rule based on the permissions on field owners. Example code implementation of a write field rule on readers/writers/owners array fields on MongoDB Service metadata Namespaces follows:

```
{
    "%or": [
        {
            "%%prevRoot.owners": "%%user.id"
        },
        {
            "%%prev": {
                "%exists": false
            }
        }
    ]
}
```

In further embodiments the system is configured to allow non-owners to write to the non-sensitive fields, based on implementing a blank document write rule—for example via a "all other fields" setting. FIG. 23 shows an example screen capture of a user interface 2300 according to one embodiment. The user interface 2300 expands on functionality shown in the user interfaces 2100 and 2200. For example, FIG. 23 illustrates additional functionality associated with the all others field which can be enabled or disabled in the user interface. Source code Appendix A shows an example code implementation of a full container/app definition.

FIGS. 24A-D illustrates user interface flows within various embodiments of the visualization system. At 2402 shown are administrative UIs including, for example, reset password 2404, registration screen 2406, and login at 2408. According to one embodiment, once users are registered and logged into their block to their dashboard display 2410, the user interface is configured to build new dashboards and/or charts from the My Dashboard display 2410. Users can also delete or favorite the dashboard in the display. Favorite dashboards are given order in display preference and if a user selects Delete Dashboard they're taken to a confirmation screen 2412.

If the user selects New Dashboard the user is taken to the dashboard detail screen 2510 (FIG. 24B) via 2414. According to one embodiment, the user is presented with the option to edit dashboard details 2512 that allows users to design individual charts and connect them to data sources using a dashboard builder display 2514, and group a series of charts into a dashboard display. For example, users may access chart builder UIs 2516. Each chart may be built and designed via a series of drop-down selections, assisted query generation, and other functions discussed herein. Once the user saves a chart or any changes 2518 they can be returned to the dashboard builder display 2514.

According to one embodiment, the dashboard builder display 2514 includes options to delete a chart at 2520, refresh dashboard at 2522, and can access share dashboard features at 2524. Responsive to sharing dashboard, various users can be identified or given an accessible that allows them to view the created dashboard (e.g. and prevents them from accessing the underlying data that creates the visualization).

Figure 24A:
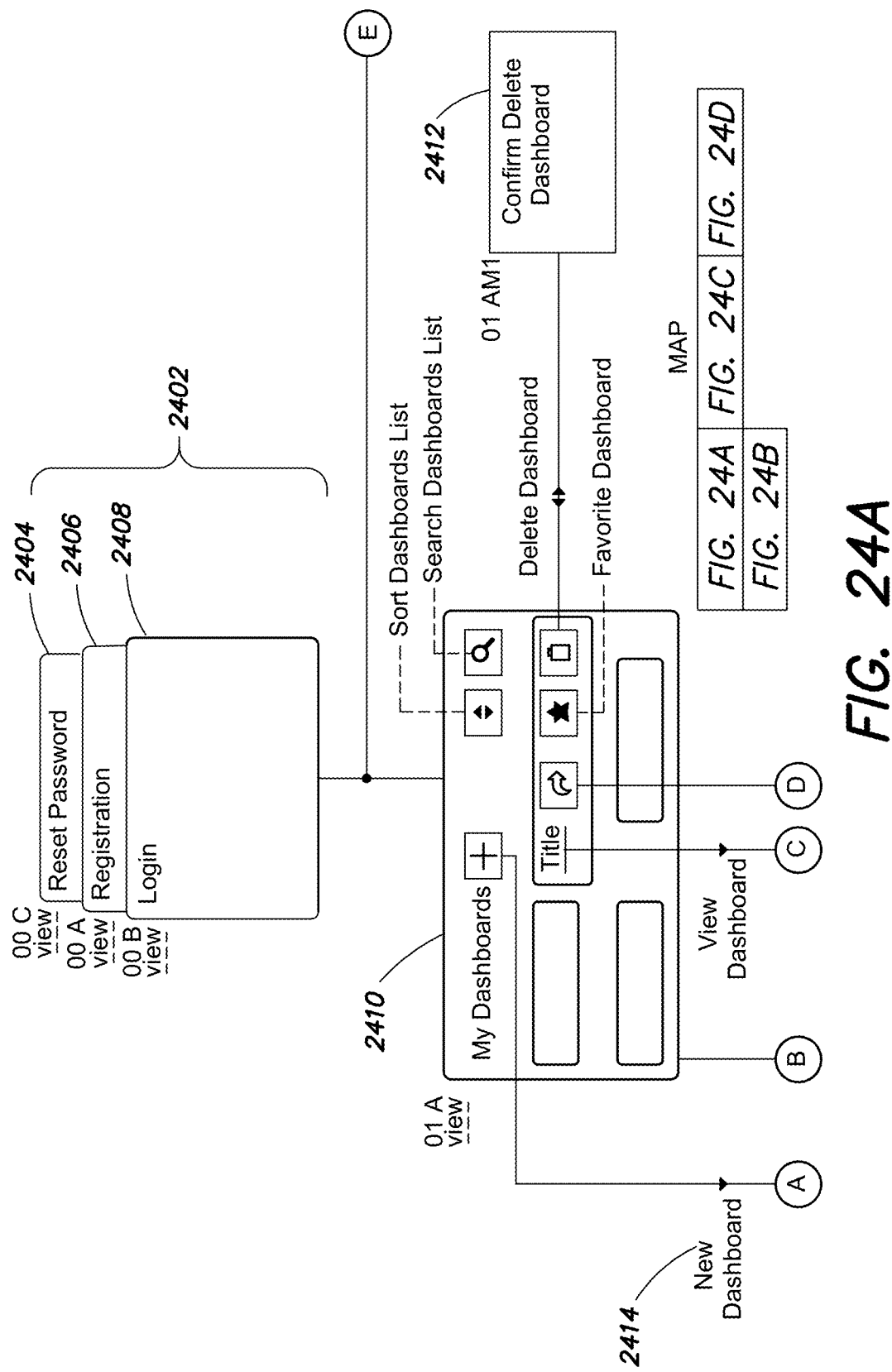
FIGS. 24A-D illustrates user interface flows within various embodiments of the visualization system.
Figure 24B:
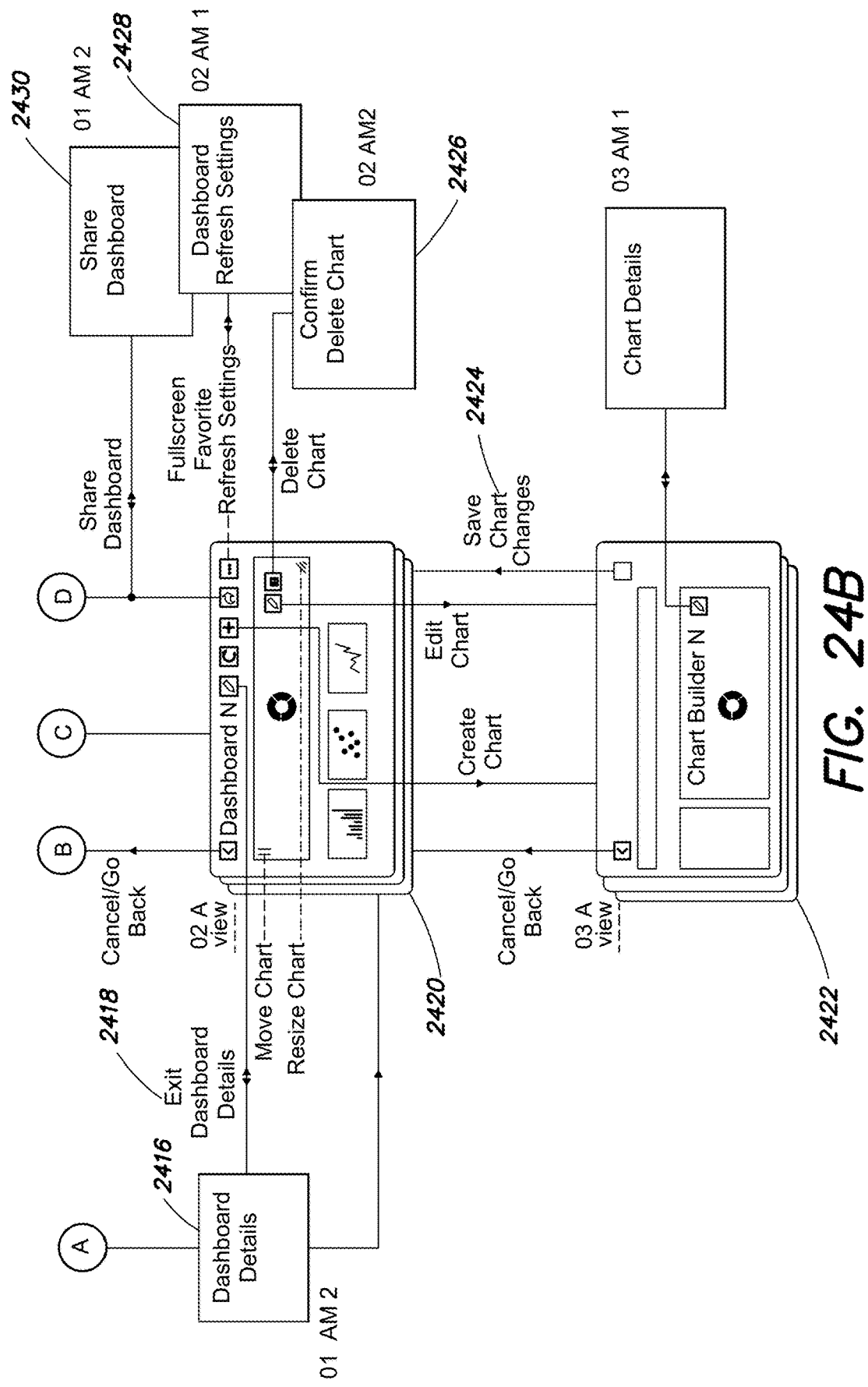
Figure 24C:
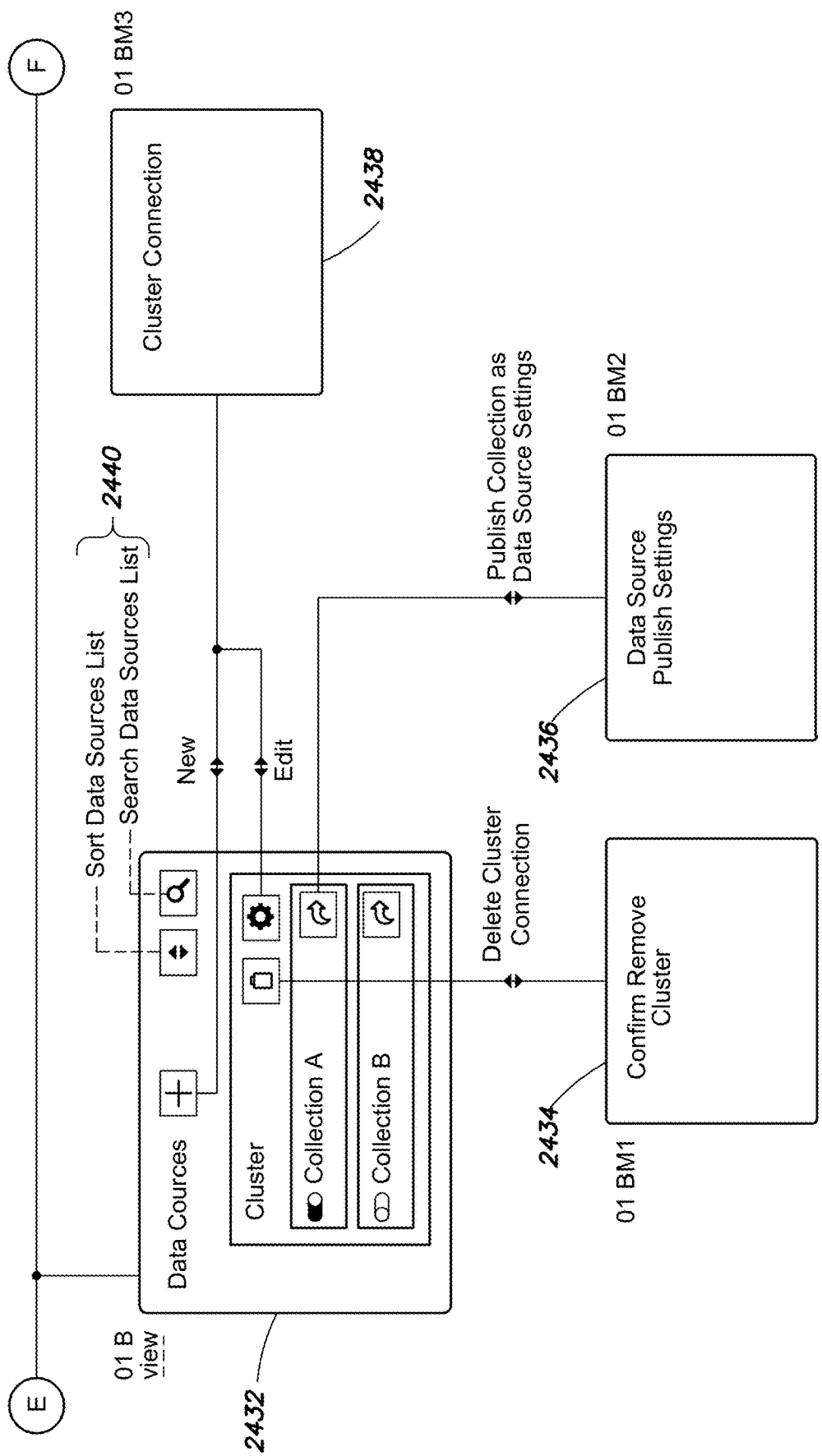

Shown in FIG. 24C is the dataflow portion of charts generation. According to one embodiment, a user can access a series of data sources at 2610 to define charts. According to one embodiment, a chart is linked to a data source and multiple charts can be created and grouped into a dashboard. In one example, a user can specify specific data clusters (e.g. logical grouping of data documents). The user responsible for the chart can add or remove data sources and/or specific clusters. Responsive to selection of removal of a cluster a confirmation screen can be displayed at 2612.

According to some embodiments, responsive to selection of a specific data source (e.g. cluster), the user can be taken to a data source publishing settings screen 2614. During creation, a user may access any settings associated with a given data source and its definition. For example, the user may be shown a specific connection string to access the cluster that they have identified. Users may identify data sources by entries in text boxes and/or via search functions displayed in the options 2616. As part of defining the data source the user may also define any limitations on the cluster connection at 2618.

Figure 24D:
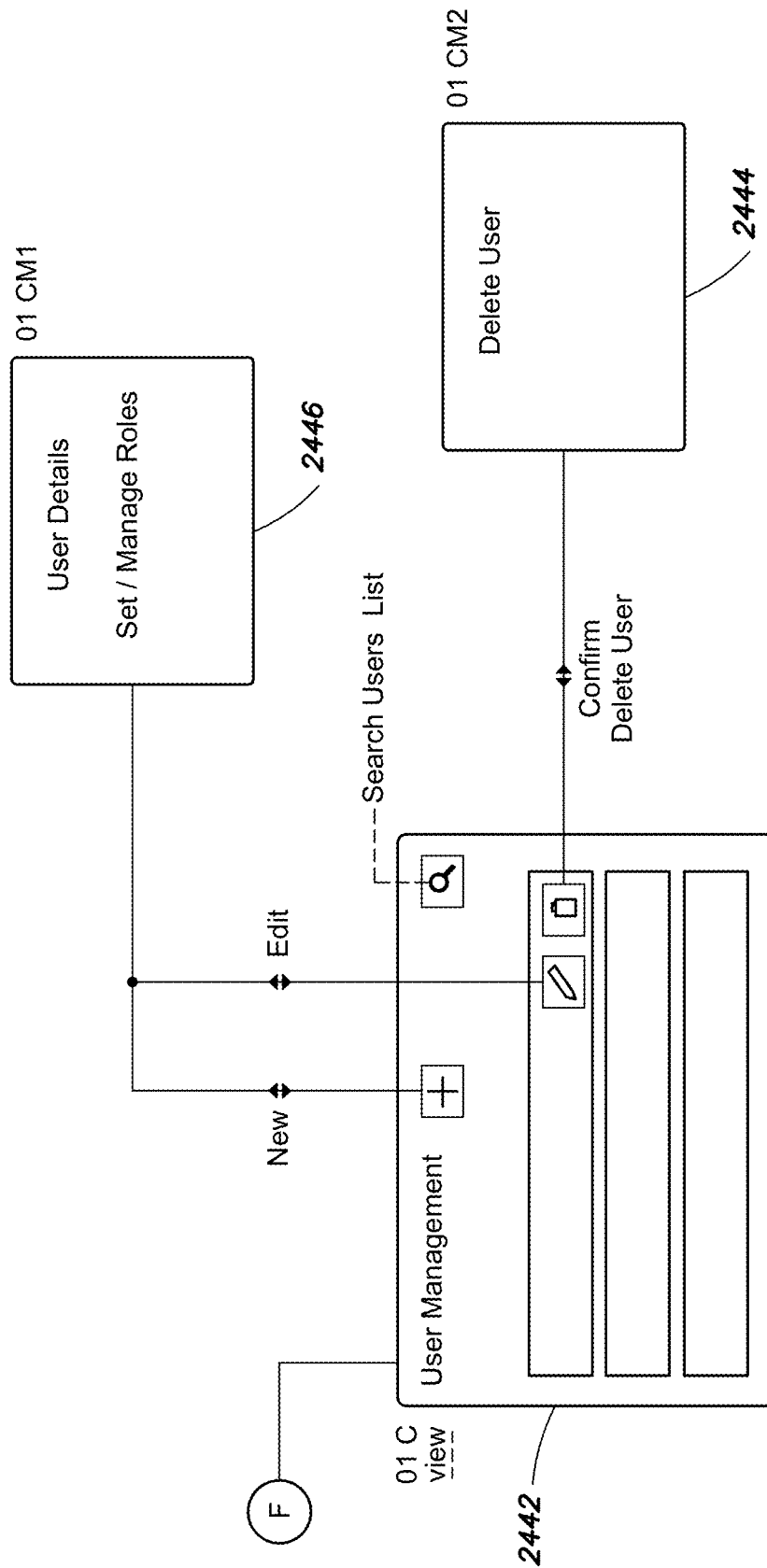

FIG. 24D shows the continuation of the UI flow and functions associated with User Management at 2710. For example, limitations on a data source can include specification of user roles, and screen 2710 enables a user to define and manage specific details and access roles for any user (e.g. at 2712). The user management screen can include functions for searching users in a given database, and/or associated with a data collection. Users may be added and/or removed in the User Management interface 2710. Responsive to selection of user deletion, the UI flow can include a confirmation screen 2714.

Various embodiments can invoke any one or more of the UI screens described above in FIGS. 24A-D. Further, various embodiments can enable any one or more of the functions described above. In yet other embodiments, different user interface screens in various combinations of the functionality described can be implemented.

Example User Access Model Considerations

The following examples and embodiments of a visualization system describe user model options and configurations to support access to private and public function sets, and to support instantiating the visualization system as a service callable by end-users. According to some embodiments, one or more of the following considerations can be addressed based on the user access model implemented, and can include the following one or more features:

- Example embodiments should limit any friction hindering people from using system to explore data that they are authorized to
- Data source owners (i.e., those who possess connection strings that grant read access to MongoDB collections) can be enabled to authorize access to data sources they add (e.g., to Charts)
- Dashboard authors are configured to retain control on who can view and modify any dashboards they create, subject to the permissions applied to the underlying data sources.

In further embodiments, the following use cases provide additional details and implementation examples that can be incorporated into various implementation. In one example, a use case includes Adithi as a developer. She has her own private MongoDB Atlas instance which she uses to load in application logs to assist in debugging. Without needing any explicitly assigned permissions, she uses Charts to set up a new data source pointing to the Atlas instance and is able to create a dashboard with some relevant charts. Later she decides to share the dashboard as read-only to one of her colleagues so he can help her explore the data.

In another use case example, XYZ Corp's Finance team wants to use the system to create dashboards tracking the company's key financial metrics. This information is sensitive, even internally. Dave, a DBA working with the finance team, creates some data sources pointing to key collections in a privately-hosted MongoDB database, and gives members of a finance team access to read data from these data sources to create some view charts that permits access to the visualization. In another use case, Isabella, who is a member of the finance team creates a really cool dashboard. She wants to share the dashboard with Greg who works in HR. While she is able to do this since she is the owner of the dashboard, the charts on the dashboard that use the sensitive data source do not render when Greg views the dashboard since he does not have any permissions on that data source (he sees an access denied message in place of the charts).

In a further use case, Bob, the CEO of XYZ Corp needs access to executive dashboards produced by multiple teams. He is granted read access to specific dashboards (and the underlying data sources) from the Finance, Sales and HR teams by respective admins in each team. In another use case, Sven the DBA has noticed that the performance of the production MongoDB cluster has deteriorated as more people in his organization use Charts to explore data. While Sven does not have access to any dashboards or charts created by others (unless the owners had explicitly granted access), as DBA the architecture is configured to support his access to modify the connection strings of the existing Charts data sources to reconfigure them to read from secondary instances in the replica set.

According to various embodiments, the use cases described are supported by the system based on layering accessing via function calls and service implementation. Various user roles can be implemented in different embodiments, as discussed herein. Additional user role examples and associated functionality are described below, and various ones or combinations of the roles can be used in conjunction with and/or in the alternative to the roles described.

According to some embodiments, the system can include the following permissions models. According to one embodiment, the data source and dashboard permissions are tied to a specific data source or dashboard. And in various examples, these permissions are not global permissions. However in other embodiments, the system can include a "break glass" account/role, and the role can be configured to include implicit owner rights across all data sources and dashboards. In the meantime, various embodiments can support such "break glass" functionality by directly augmenting the permissions fields on the charts metadata, for example, in a charts metadata document that would be stored in a MongoDB implementation.

In some embodiments, one or more of the following permissions can be implemented for each access classification (e.g. data source, dashboard, user, etc.):

Data Source

Data Source Reader: ability to view the data source metadata, and to read data from the data source, for the purposes of viewing or creating charts Data Source Editor: ability to modify an existing data source, e.g. change the connection string or delete it Data Source Owner: ability to set permissions on an existing data source (i.e. share) Dashboard Dashboard Viewer: ability to view an existing dashboard, including interacting within the limits defined by the author (drill-downs, etc.). In order to view a specific chart on the dashboard, "Data Source Reader" permission is needed on the underlying data sources Dashboard Author: ability to edit and save an existing dashboard. Requires "Data Source Reader" permissions on the underlying data sources Dashboard Owner: ability to set permissions on an existing dashboard (i.e. share) User User Admin: Ability to invite and remove users, and reset passwords According to one embodiment, when a user is exposed in the UI, the system is configured to control the data source and dashboard permissions as cumulative, i.e. a Dashboard Owner is implicitly a Dashboard Author, and a Dashboard Author is implicitly a Dashboard Reader.

Note in some embodiments, there may not be a need for a special role for creating a data source or a dashboard—and these functions can be performed by any authenticated user. In further embodiments, the ability to create a chart on a dashboard will be dependent on having access to existing data source(s).

In some implementations, when a user creates a new data source, they are automatically given the Data Source Owner permission. The UI is configured to provide a simple way to specify who should be given the Data Source Reader permissions, e.g. everybody, nobody or specific people. Further the UI is configured to enable a user to assign the Data Source Editor and Owner permissions to others.

Various implementation can combine at least the various actions shows for each user role and roles marked with an asterisk (*) in the table are assigned to users with the scope of a specific resource. Roles without the asterisk are global.

TABLE A

Data Sources, User Role and Function

| | User (all authenticated users) | Data Source Reader* | Data Source Editor* | Data Source Owner* |
|---|---|---|---|---|
| Create a data source | Y | | | |
| Access data from a data source (via a chart) | | Y | Y | Y |
| Modify properties (e.g. connection string or alias) of an existing data source | | | Y | Y |
| Delete an existing data source | | | Y | Y |
| Assign or remove permissions to an existing data source | | | | Y |

TABLE B

Dashboards, User Role and Function

| | User (all authenticated users) | Dashboard Viewer* | Dashboard Author* | Dashboard Owner* |
|---|---|---|---|---|
| Create a dashboard | Y | | | |
| View an existing dashboard† | | Y | Y | Y |
| Interact with charts on an existing dashboard† | | Y | Y | Y |
| Create new charts on an existing dashboard† | | | Y | Y |
| Edit charts on an existing dashboard† | | | Y | Y |
| Delete charts on an existing dashboard | | | Y | Y |
| Delete an existing dashboard | | | Y | Y |
| Assign or remove permissions to an existing dashboard | | | | Y |

†In various embodiments, users can only view or author charts when they have permission to access data from the Data Source used by the chart

TABLE C

Users

| | Anonymous (Unauthenticated users) | User (all authenticated users) | User Admin |
|---|---|---|---|
| Register to use Charts | Y | | |
| Log in to Charts (with valid credentials) | Y | | |
| Reset password | Y | | |
| Edit own profile | | Y | |
| Change own password | | Y | |
| Edit any profile | | | Y |
| Reset any password | | | Y |
| Delete user | | | Y |

TABLE D

Other Admin Roles

| | Server (Stitch) Admin | Metadata DB Admin |
|---|---|---|
| Manage or delete any data access service (e.g., Stitch service) | Y | |
| View, edit or delete any Charts metadata (including permissions and dashboard definitions) | | Y |

As discussed herein, various embodiments can include additional functionality and/or super-admin role. For example, some customers may require a super-admin role who is able to view/modify any data in the system without having permissions explicitly granted per entity. This system is configured to enable the capability if requested; in additional examples, similar functionality can be achieved by directly modifying the system metadata documents in the underlying database (e.g., MongoDB), e.g. by adding a new user as "owner" on desired entities.

According to some embodiments, the various models described use a single permission as an example—e.g., Data Source Reader—that allows both reading of charts that use that data source, and to create new charts using that data source. Various other embodiments split this into two different roles. This could be useful in cases where the fine-grained data in a data source is potentially sensitive, but the aggregated/filtered view provided through a dashboard can be shared more broadly. Thus, various elements of a chart that rely on the aggregated filtered data may be viewed where charts associated with the fine-grained data are present but the data may not be rendered.

In the examples above, permissions can be assigned to individual users. In additional embodiments, the same permissions could be applied to pre-defined groups of users (e.g. "Finance Team"). Such embodiments are configured to make it easier to manage permissions correctly.

In further embodiments, the system can be extended to support sharing of dashboards externally (i.e. outside of the organization). For example, a SaaS version of the system and/or application (possibly coupled with managed cloud database services) can be configured with a universal authentication mechanism, in which case permissions can be granted to users from any organization. Various embodiments are configured to provide a simple way for admins to disable this functionality for data sources or the entire charts if required.

For example, that the system is configured to allow developers to embed a chart or dashboard in their own websites can also be considered a case where external sharing is required. In this example, the users most likely would not be authenticated, so in one example, the dashboard would need to be shared to all anonymous users according to some examples.

The following examples and embodiments describe various implementation and examples of a visualization system. For example, described are various architecture options for handling metadata persistence of created visualization services (e.g., for re-use, updates, etc.). According to one embodiment, the visualization system is configured to store chart and dashboard metadata in MongoDB for later retrieval so that an author can:

Save and continue their dashboards at a later time
Duplicate and modify existing dashboards to avoid repeated work
Share their dashboards with other authors According to some embodiments, the system is configured to create the collection storing the charts as an "items" collection, and various versions may contain non-chart items, like counters, markdown, links, etc. In some examples, the items collection only contains charts. References to the term "chart" can also apply to non-chart items if not explicitly stated otherwise.

Various implementation examples are discussed to highlight various aspects of embodiments of the invention. For example, the description provides implementation detail on how data gets written to and loaded from the database, including the involved UI components, Reflux stores, and intermediate modules and services (data-service, stitch, . . . ).

According to various embodiments, the UI consists of at least three levels of hierarchy related to Dashboards and Charts:

1. Dashboard Overview (each dashboard shows as a panel with preview thumbnails of the last 3 modified charts)
2. Single Dashboard View (all charts are fully rendered on this view)
3. Chart Builder (a single chart can be modified in this view)

According to one embodiment, the entry point for the user is the Dashboard overview. Upon entering the view (e.g. clicking "Dashboards" in the top navigation bar, see e.g., FIGS. 24A-D), dashboards are presented as a "preview" panel, which includes dashboard metadata (name, description, last modified, . . . ) and thumbnails representing the last modified charts of the dashboard. As implemented in various embodiments, the dashboard interface provides tools for a single action that modifies a dashboard can be done in this view:

Favorite/Unfavorite a dashboard

Once selected the action takes effect and is persisted immediately, without further confirmation. In addition, the user can click any of the dashboard previews to drill into that particular single dashboard.

According to some embodiments, the single dashboard view is shown responsive to selection of a single chart. For example, in this view, the user sees all metadata related to the dashboard (name, description, etc.) as well as all charts rendered according to the dashboard layout. The user can make the at least the following modifications to a dashboard directly on this view:

Change the layout of the charts, by resizing or moving any of the charts
Change the title or description of the dashboard
Change the auto-refresh rate of a dashboard (not persisted to the database)
Favorite/Unfavorite the dashboard Responsive to selection any of these changes take effect and are persisted immediately, without further confirmation. In further embodiments, by clicking on the Edit icon of a Chart panel, the user drills into the chart builder view.

In the chart builder view, the system enables the user to make arbitrary modifications to the chart and see the changes in real time. Responsive to selection of Save in this view the system modifies the metadata in the database. For example, a user may select "Save chart changes" to trigger this operation. On failure, the user remains on the Chart Builder view and an error message is displayed. On success, this brings the user back to the Single Dashboard view. The chart changes are reflected in display there as well.

Alternative embodiments and/or additional implementation can include at least three different options for schema designs:

TABLE E

| A) One Collection Per Entity | |
|---|---|
| dashboards collection | items collection |
| {<br>  _id: <dashboard-id>,<br>  name: . . .,<br>  version: . . .<br>} | {<br>  _id: . . .,<br>  dashboard_id: <dashboard-id>,<br>  type: "chart",<br>  spec: . . .,<br>  version: . . .<br>} |

This example uses a foreign key in items to associate a chart with a dashboard. This implementation can provide any one or more of the following advantages:

Charts are accessible outside of a dashboard context, e.g. for future SDK where developers want to embed charts in their apps or websites Locking at the charts level during chart editing possible In this environment, the system can need to invoke $lookup or two requests when populating dashboard store and/or requires multiple updates when updating charts.

TABLE F

| B) Embedded Entities |
|---|
| dashboards collection |
| {<br>  _id: . . .<br>  name: . . .,<br>  description: . . .,<br>  items: [<br>    {<br>      _id: . . .,<br>      type: "Chart",<br>      spec: . . .,<br>      version: . . .<br>    }<br>  ],<br>  version: . . .<br>} |

This embodiment can eliminate the need for $lookup, with a single (atomic) update when modifying a chart. Some constraints in this example may include charts not existing outside the context of a dashboard, and locking during chart editing may be scoped to the dashboard level.

TABLE G

| C) Polymorphic | |
|---|---|
| items collection<br>(dashboard document) | items collection<br>(charts document) |
| {<br>  _id: . . .,<br>  dashboard_id: <dashboard-id>,<br>  type: "dashboard",<br>  version: . . .<br>} | {<br>  _id: . . .,<br>  dashboard_id: <dashboard-id>,<br>  type: "chart",<br>  spec: . . .,<br>  version: . . .<br>} |

This example eliminates any $lookup operation—based on using a find function (e.g., by dashboard_id) and provides an easier database service (e.g., stitch) configuration for role-based access control (RBAC). Some constraints can include additional challenges on indexing, schema divergence, and may require multiple updates when updating charts.

Additional design features of some embodiments are described below, and various embodiments can include any one or more of the following details:

TABLE H

| Dashboard Schema Example | | |
|---|---|---|
| Field | Data Type | Description |
| _id | ObjectId | Uniquely identifies the dashboard |
| title | String | Title of the dashboard |
| description | String | Description of the dashboard |
| createdAt | Date | Date when the dashboard was first created |
| lastModifedAt | Date | Date when the dashboard was last modified |
| layout | Object | Layout of items on the dashboard for react-grid-layout |
| schemaVersion | String | The schema version of the dashboards schema, in semver. |

Indexes for dashboards collection:

{title: 1} for sorting on dashboard title

{lastModifiedAt: 1} for sorting on last modified date

TABLE I

| Item Schema (version 0) | | |
|---|---|---|
| Field | Data Type | Description |
| _id | ObjectId | Uniquely identifies an item and the associated metadata combination listed here in this table |
| dashboardId | ObjectId | The _id of the dashboard this chart belongs to |
| dataSourceId | ObjectId | The _id of the data source associated with this chart |
| createdAt | Date | Date when the chart was first created |
| lastModifiedAt | Date | Date when the chart was last modified |
| itemType | String | Describes the type of item, e.g. "chart" |
| chartType | String | Describes the type of chart, e.g. "bar" |
| specType | String | Describes the type of spec, one of "vega", "vega-lite" |
| spec | Object | The vega or vega-lite spec for this chart |
| channels | Object | The encoded channels for this chart |
| reductions | Object | The array reductions definition for this chart |
| pipeline | Array | Aggregation pipeline to execute for this chart |
| schemaVersion | String | The schema version of the items schema, in semver. |

Indexes for items collection:

{dashboardId: 1} for retrieval of all charts belonging to a dashboard

TABLE J

| DataSource Schema | | |
|---|---|---|
| Field | Data Type | Description |
| _id | ObjectId | Uniquely identifies a data source and the associated metadata combination listed here in this table |

TABLE J-continued

DataSource Schema

| Field | Data Type | Description |
|---|---|---|
| stitchServiceName | String | The Stitch MongoDB Service identifier for accessing data in a customer deployment |
| ns | String | The MongoDB namespace string |
| createdAt | Date | Date when the chart was first created |
| lastModifiedAt | Date | Date when the chart was last modified |
| title | String | |
| description | String | |
| slug | String | Kebab case on title for presentation and debuggability. |
| schemaVersion | String | The schema version of the items schema, in semver. |

According to some examples, database read requests need to be done in the following situations:
 Initially loading the Dashboard Overview screen
 In one embodiment described with reference to a MongoDB implementation, the DashboardOverview store issues a request via data-service→stitch→MongoDB on the dashboards collection. Example query in shell syntax:
  db.dashboards.find( )sort({lastModified: −1}).limit(1000)
 where sort order depends on user selection of the sort criterion. The DashboardOverview can be rendered based on the returned documents.
 Entering the Single Dashboard view
 In one embodiment described with reference to a MongoDB implementation, the SingleDashboard store issues a request via data-service→stitch→MongoDB on the dashboards collection to match the dashboard with <dashboard-id>, joining the items collection with $lookup:
  db.dashboards.aggregate([{$match: {_id: <dashboard-id>}}, {$lookup: {from: "items", localField: "_id", foreignField: "dashboardId", as: "items"}}])
 In some alternatives and/or additional embodiments, two separate requests can be made to the dashboards and items collections and joined on the client. The approach can facilitate backwards compatibility for the metadata store with earlier versions of MongoDB that did not support $lookup.
  db.dashboards.find({_id: <dashboard-id>})
  db.items.find({dashboardId: <dashboard-id>})
 According to some embodiments, the requests should be done asynchronously (e.g. using async.parallel), and joined when both results have been returned to the client.
 Entering the Chart Builder view
 In one embodiment described with reference to a MongoDB implementation, when entering the Chart Builder view, the chart to be edited could be passed down from the single dashboard view, as it already contains all chart information due to the $lookup. To reduce the risk of a conflict when saving the document back due to optimistic locking, the chart builder store can be configured to refresh the chart document when mounting.
  db.items.find({id: <item-id>})
 According to some examples, database write requests need to be done in the following situations:
  Saving a chart in the Chart Builder view
 In one embodiment described with reference to a MongoDB implementation, when the user clicks "save" in the Chart Builder view, the updated chart needs to be written back to the items collection.
  db.items.update({id: <item-id>}, {$set: {<changed-fields>}})
 Saving changes to a dashboard in the Single Dashboard view
 In one embodiment described with reference to a MongoDB implementation, a dashboard document needs to be updated under the following circumstances:
  Change the layout of the charts, by resizing or moving any of the charts
  Change the title or description of the dashboard
  Favorite/Unfavorite the dashboard
  db.dashboards.update({id: <dashboard-id>}, {$set: {<changed-fields>}})

Co-pending U.S. patent application Ser. No. 15/223,654, filed on Jul. 29, 2016, titled SYSTEMS AND METHODS FOR MODELLING VIRTUAL SCHEMAS IN NON-RELATIONAL DATABASES, and describes various functions and operations that can be implemented as part or integral with a visualization system, which is incorporated herein by reference in its entirety.

Co-pending U.S. patent application Ser. No. 16/442,204, filed on Jun. 14, 2019, titled SYSTEMS AND METHODS FOR MANAGING TRANSACTIONAL OPERATION and which claims priority to US Provisional Application, filed on Jun. 20, 2018, titled SYSTEMS AND METHODS FOR MANAGING TRANSACTIONAL OPERATION, describes various functions and operations that can be implemented as part or integral with a visualization system, both of which are incorporated by reference herein in their entirety.

The following example embodiments for data model permission architecture and functions describe various implementation and architecture that can be used in some embodiments to provide access to database data (e.g., via public and private function calls) through and/or in conjunction with other database service layers/functions, while ensuring only permission access to the underlying data.

Embodiment Examples: Example Data Source Permissions Model

Various embodiments of the system implement data source sharing and permission models to provide more intuitive and flexible architecture. In various examples, the data source sharing and permission model is further configured to align with existing permission models for other services (e.g., back end services, examples and embodiments described in co-pending U.S. application Ser. No. 16/010,034, filed on Jun. 15, 2018, titled "SYSTEMS AND METHODS FOR MANAGING A DATABASE BACK END AS A SERVICE," incorporated herein by reference in its entirety—(also referred to as "Atlas,"), etc.). In some examples, the system is configured to leverage existing roles for certain permissions defined in database services and architecture, and may also include the definition of a new data source reader role granting access to view charts but not author new charts.

Example Behavioral Descriptions
 In various implementations, the visual changes of the proposed features can be confined in various databases as service architectures to a revision of the data source permissions dialog to improve conventional database as a service architectures. While other embodiments can use the three roles, Owner, Manager and Reader described herein, other embodiments are configured to implement new roles, Owner, Author and Viewer (e.g., new functions and descriptions below (although in other examples combinations of the defined roles may also be used)) to align them with the dashboard permissions categories. Various embodiments implement layered architectures and/or API calls to augment data access services and provide data visualization functionality across sets of users who do not have permission to access the original database data (e.g., stored in a data collection of documents as in the known MONGODB database). Further examples, provide user interface options for specifying an original source (e.g., a database collection) to define a source data that can then be accessed by a layer that enables sophisticated visualizations (e.g., charts) that can then be combined into custom dashboards (e.g., groups of charts) for improving interaction with database data. The data sources can be defined to integrate data aggregation services as part of the data source definition, and each such data source publishes for access to users—and underlying data access can be controlled independent of permission to access a given chart or display.

According to various embodiments, in an "on-premises" version of the system, a data source owner remains in control of which users are assigned which roles (e.g., Owners, Authors or Viewers), and can select an option displayed in the user interface set the Everyone field to any of those roles, or none, as described herein with respect to other embodiments. According to one embodiment, on-premises versions can include database implementation where the hardware or systems executing a database instance or supporting a database implementation are located at a client facility. General examples refer to "on-premise" to designate an architecture where the computing resources are maintained and/or present a client location.

In some examples, where other implementation is updated as described herein, an automatic migration can be executed by the system to incorporate and/or adjust user roles for improving data visualization functions. For example, in a MONGODB implementation, a migration to the new roles can include operations executed by the system to convert existing Manager and Reader roles into Authors, and operations to instantiate an empty list of Viewers (e.g., as the new Viewer role has less privileges than the Reader role of other and/or prior examples).

In embodiments implemented on cloud resources, the system derives an Owner role from the definitions of existing roles (e.g., of Project Owner, etc.), and the new Author role can be derived from any role that is Project Data Access Read Only, or above, which includes any user who can read from clusters in a project, and these users will be automatically assigned the Author role on the corresponding data source.

In some examples, the system is configured to limit UI access based on the role assignment. For example, with Owner and Author roles, the UI displays static labels for these roles instead of dropdown inputs that permit re-definition in the user interface. In further examples, the viewer role can be assigned to any user within the UI itself.

Accordingly, various embodiments implementing the new roles and architecture now provide a new tier at the low end of the role spectrum (e.g., reduce permission role) to allow users to view charts (and the output of the associated data aggregation pipeline) without giving them any further access to the underlying data source. For example, the user can see the data intended and required for visualizing the chart(s) using an assigned data source, but cannot create new charts based on this data source on their own, and in further embodiments, the user cannot execute any other data access methods (e.g., counts, finds, aggregations, etc.) against the data source itself. In various embodiments, the separation of visualizations and data access permits assignable visualization access, without requiring data access permission, which provide significant improvement over various conventional methodologies.

Example Design Implementation

According to some embodiments, to implement the proposed changes to the permissions model, the system provides alternatives to rules-based access models, and the system is configured to also invoke authorization checks based on access to charts object (e.g., listing chart metadata and/or optionally and in the alternative data source permission lists). The system based authorization checks enable a user to execute the specific pipelines associated with defined charts that are built on a defined data source (e.g., and shared with the user), but at the same time limits or prevents other data access to the data source and the data collection to which it refers. Various embodiments accomplish this sandboxing using system functions, which, for example, can bypass the rules (and resolve the lack thereof) on a MongoDB service and execute arbitrary data access methods.

According to some embodiments, various features of the Data Source Permission Model include at least one or more of the follow options:

1. Convert all existing data access Stitch functions to System functions
2. Move all data access methods (count, find, aggregate, . . . ) from the client code over to Stitch System functions, and call those from the client instead
   a. Various user interfaces provide options for visualizing data access methods, translating such methods, and integrating corresponding code into database as service operations
3. For Cloud implementation: Create new Stitch functions that query a user's existing (e.g., Atlas) permissions to determine whether they are Owners or Authors for a given data source (including via team membership, using the flattenRoles=true query parameter)
   a. Flatten roles functionality can be configured to translate existing permissions/roles into the Owner, Author, Viewer roles discussed above
4. Add authorization checks to all data access functions, which can include validating that only users authorized to read from a data source (i.e. Viewers, Authors or Owners, including those granted through "Everyone") can read from the service. The checks can be conditional on cloud/on-premises as described below.
5. Remove code that sets rules on user-added services and treats access based on
6. Remove the "locking mechanism" code where no longer necessary
7. Write data migrations to
   a. Remove all existing rules on user-added services
   b. Rename the managers and readers fields to authors and viewers
   c. For On-Prem: Move all viewers into the authors array, leaving viewers blank
   d. For On-Prem: Change all values in the "everyone" field from "manager" and "reader" to "author".
   e. For Cloud: remove all owners, authors and viewers.
   f. For Cloud: set the "everyone" field to false for all data sources.
8. Update the permissions model dialog to the new design and behavior Example Data Access Functions Implementation Examples According to various embodiments, the following database backend as a service functions (e.g., Stitch in MongoDB) are configured to be public and non-system. The examples functions are configured to call authorization checks, either accept or construct an aggregation pipeline, and then call executePipeline to retrieve the data:

fetchDataForViewingFromDataSource, requires Viewer, Author or Owner role on the data source (calls canUserReadDataSource). Needs to accept a chartId. Fetches the chart metadata document, confirm that the user is a viewer on the attached data source, and then uses the pipelineOptions from the chart document, construct the pipeline and executes it by calling executePipeline.

fetchDataForAuthoringFromDataSource, requires Author or Owner role on the data source (calls canUserAuthorDataSource). Accepts pipelineOptions as fetchDataFromDataSource before did. Used in the Chart Builder (new or existing chart) and for embedded charts. Constructs the pipeline and then calls executePipeline.

executePipelineOnDataSource, requires Author or Owner role on the data source (calls canUserAuthorDataSource). Called from sampleDataSourceSaga and fetchFilterValuesSaga. Accepts an aggregation pipeline array and dataSourceId as parameter and after authorization check calls executePipeline.

Various embodiments can also include private system functions. For example, a private system function is defined as:

executePipeline, private system function. Called from all data access functions. Takes a pipeline and dataSourceId, executes it and returns the documents.

Role Authorization Functions Implementation Examples

According to some embodiments, the following authorization functions can be called from the data access Stitch functions:

canUserReadDataSource (existing). Various examples can also include conditional logic for cloud/on-prem:
  For Cloud, the checks include at least one or more of the following:
    i. If the everyone flag is not false, the user can read the data source
    ii. If the user id is in the viewers array, the user can read the data source
    iii. If the user's Atlas role in the current project is Project Data Access
  Read Only or higher, the user can read the data source
    iv. Otherwise, the user cannot read the data source
  For On-Prem, the checks include at least one or more of the following:
    i. If the everyone flag is not false, the user can read the data source
    ii. If the user id is in the viewers, authors or owners array, the user can read the data source
    iii. Otherwise, the user cannot read the data source canUserAuthorDataSource (new). This check can be executed by the system with sampleDataSource and fetchFilterStrings data access functions. Various examples can include conditional logic for cloud/on-prem:
  For Cloud, the checks are at least one or more of the following:
    i. If the user's Atlas role in the current project is Project Data Access
  Read Only or higher, the user can read the data source
    ii. Otherwise, the user cannot read the data source
  For On-Prem, the checks are at least one or more of the following:
    i. If the everyone flag is "author" or "owner", the user can read the data source
    ii. If the user id is in the authors or owners array, the user can read the data source
    iii. Otherwise, the user cannot read the data source canUserModifyDataSource (new). This check is executed for the data source permissions dialog, to confirm that a user is the owner of a data source. Needs conditional logic for cloud/on-prem:
  For Cloud, the checks are at least one or more of the following:
    i. If the user's Atlas role in the current project is Project Owner, the user can modify the data source
    ii. Otherwise, the user cannot modify the data source
  For On-Prem, the checks are at least one or more of the following:
    i. If the everyone flag is "owner", the user can modify the data source
    ii. If the user id is in owners array, the user can modify the data source iii. Otherwise, the user cannot modify the data source Example Architecture and Process Flow illustrates an example architecture and flow for controlling data access for visualization in charts. According to one embodiment, a client browser 2002 can request data for visualization (e.g., a chart or dashboard). The client browser may include a middleware process (e.g., 2004) for resolving issues with a synchronous data retrieval (e.g., the known SAGA middleware). Any data access for display on the client browser 2002 will proceed via execution of stitch functions 2006 directed to a stitch server 2008. According to various embodiments the server 2008 will handle public/non-system functions and include authorization checks 2015 to ensure the functions are authorized for a given request. For example, the authorization checks 2015 can include role check functions at 2016 letter to determine if a given request is authorized.

According to some embodiments, the public/non-system functions can include a fetch request for viewing data from a data source (e.g., 2010), a factual request for authoring data from a data source (e.g. 2012—which can include defining a new data source, data filtering operations (e.g., aggregation functions, etc.)), and functions to execute data operations on the data source (e.g. 2014), among other options. The various public/non-system functions can include private functions as part of their execution (e.g., defined as part of the data source itself, among other options). In one example, a public function e.g. 2010 can include an operation to execute an aggregation pipeline (e.g. 2018) on a given data source 2019. As shown in the architecture, as long as the request/user has access for the public function the user is given the output of the private function executed against the data source.

According to various embodiments, the architecture enables visualizations of data without compromising the security of the underlying data and/or data source. Additionally, the end users are the beneficiaries of private functions and their output based on defined operations that would normally require write data access or enhanced permissions. As shown, access validation operations (e.g. 2016) can include requests to metadata information 2020 detailing authorized users/roles and can also determine access rights from APIs (e.g. 2022).

Charts Embedding Examples

According to some embodiments, the system can be configured to enable a customer to embed a chart in their web-application, web-site, etc., and dynamically adjust the settings of the chart being displayed. For example, the system can enable the client to add additional filters, change the styling/theme of the visualization, and/or to perform actions like refreshing the chart on demand. Example features that the system implements in various embodiments are shown in Table K:

TABLE K

| Category | Functionality |
| --- | --- |
| Rendering | Can render a Chart into a div |
|  | Can retrieve chart data that can be passed to a custom renderer |
| Authentication | Unauthenticated |
|  | Tied to external app's authentication |
| Data Source for Chart data | Defaults to Charts Stitch App |
|  | Can override to use own Stitch App |
| Customizations | Set theme |
|  | Set auto-refresh interval |
|  | Set filters |
| Commands | Refresh Chart on-demand |
|  | Change filters on-demand |
|  | Get the Chart data |

According to one embodiment, the system enables the developer to download the charts embed SDK and use it to integrate charts into their application and/or site. The system enables selection of at least one of:

Unauthenticated Charts
  similar to IFrame embedding, the system employs the tenantId and embedded-chart id to allow the user to customize the appearance of charts and manually trigger/configure commands (e.g., refresh, add filter, etc.).
  chart author can opt-in to specific fields to allow filtering on source data, Authenticated Charts
  System enables user embedding a chart to decide if a chart should render, and what filters should be applied to the embedded chart based on the claims defined in the JWT token (e.g., the system defines associated claim in the token, which is used for controlling permissions)
  For example, the system is configured to accept a token into the charts SDK to then pass through when rendering the chart to manage the permissions
  Enable the chart author opt-in to specific fields to allow filtering According to some embodiments, where an implementations already configured a data access application (e.g., a Stitch app) with users and custom rules to access to the database, the system enables "delegated data fetching". Delegated data fetching enables the customer to specify a database access service (e.g., Stitch service) to use to fetch data for a chart, instead of the a call to the chart's database access service (e.g., Charts Stitch Service). Such embodiments enable used of the data access service authentication (e.g., Stich authentication) for very granular permissions on the chart data. The system manages calls using an access token, which grants access to the chart and to the charts SDK.

Some additional enhancements can be architected under different approaches and include, at least one or more or any combination of the following examples, 1) Extend Iframe architecture—Improve the existing experience to take additional parameters for themes/access-filters, which enables: theming/auto-refresh on the visualization; anonymous+SSO; filters+scoping per user (e.g., with backend work); and reuses existing development without need to re-implement any existing charts;

2) JS SDK with IFrames—Create a new SDK, that is configured to employ window.postMessage and the existing embedded IFrame to support client apps interactively manipulating the charts. This architecture enables: theming/auto-refresh; anonymous, SSO Charts, data access service authentication (e.g., Stitch Authentication) functions; filters+scoping per user (with backend work); re-uses existing development; invoke methods to manipulate the charts; getting data from the charts; and, for example, isolates main charts code from the client application with chart rendering executing in another/separate thread happens in another thread;

3) JS SDK with Native DOM—to support client apps interactively manipulating the charts. This architecture enables: theming/auto-refresh; anonymous+SSO Charts+data service authentication (e.g., Stitch Authentication); filters+scoping per user (with backend work); invoking methods to manipulate the Charts; getting data from the charts.

According to some embodiments, the system implements a javascript SDK ("JS SDK") with iFrame support. IFrame (Inline Frame) refers to an HTML document embedded inside another HTML document on a website. According to one example, the iFrame HTML element is configured to insert content from another source into a displayed web page, and in particular a chart visualization to embed. Unauthenticated charts implementation can continue unaffected.

Various embodiments can include authentication augmentation that include at least one or more or any combination of the following options:

1) Signed-Token with mandatory filters—A signed token is configured to enable an application to embed a chart to provide an authentication endpoint (e.g., 'auth') that would return a signed-token. In one example, the token is generated to contain the privileges or access that a chart-viewing user is entitled, and the token is sent when fetching data for a Chart. In various embodiments, this approach enables: customers to restrict the viewing of data to only those they've specified that can see it, guardrails to ensure that users don't accidentally over-expose their data, and log user-id to ensure audit trail.

2) Signed-Token with "roles"/rules defined in charts—the customers' app-server communicates a signed-token, containing: the user-id of the authenticating user. a list of roles or groups this user has with context information. In one example, the customer configures in charts (e.g., metadata files and/or security definitions) the roles/groups that are allowed to access the charts—with corresponding rules to restrict the data that they can view based on their role (e.g., using the context/user-id provided). According to some embodiments, the system enables customers to restrict the viewing of data to only those they have specified that can see it, permission logic in the application where the client can change permissions without needing to update embedding code, while providing similar approach to existing implementation, and further enabling analysis/feedback based on generated rules.

3) ("bring your own" token) BYO-JWT with permissions defined in Charts—The customer passes a JWT to the SDK/Charts, which then validates against the JWT public key configured inside of charts. According to one embodiment, the customer configures embedding rules derived from the JWT and the claims specified. For example, if (some claim in the token), allow/disallow access to certain charts/data sources, and inject a specific filter (possibly containing data from the token). According to some embodiments, the system enables customers to restrict the viewing of data to only those they have specified that can see it, permission logic in the application where the client can change permissions without needing to update embedding code, can log user-id to ensure audit trail, system connects to the customer's existing JWT/auth infrastructure, and enables limitations on amount of custom code written by customers, with no need to implement extra secret handling.

According to some embodiments, the system can support multiple authentication options, including for example any two of 1, 2, and 3 above, as well as individual implementations or even all combinations. For example, a customers can either provide a JWT used for auth or a JWT that they've created and signed themselves to the charts SDK, which is then used to filter access based on the configured permissions in charts itself.

According to some embodiments, the system includes an embedding SDK that is configured to provide helper functions for rendering a chart inside an IFrame and perform actions on this chart. For example, the actions include changing the theme, setting additional filters, and accessing the raw data from the chart. According to one embodiment, the SDK is configured to embed an IFrame using an embed URL generated by the system and displayed for use by the client. In one embodiment, the system is configured to invokes window.postMessage and a browser API to securely communicate with the Iframe which permits customization for the users application.

An example process for setting up authentication can include initial configurations and at least one or more of the following:

1. Configure a JWT secret or public key
    a. Use data access service authentication (e.g., Stitch's Custom Authentication service), which in some examples can be tied to one authentication key per project—further embodiments provide options for multiple authentication key, expiring authentication keys, etc.
2. Enable the SDK—which can be done in an embedding dialog
3. Configure or create an endpoint to get a JWT for an authenticated user that is signed with the key (e.g., stored with charts)
4. Install the embedding SDK into the target application (e.g., @mongodb/charts-embed-sdk)

Figure 25:
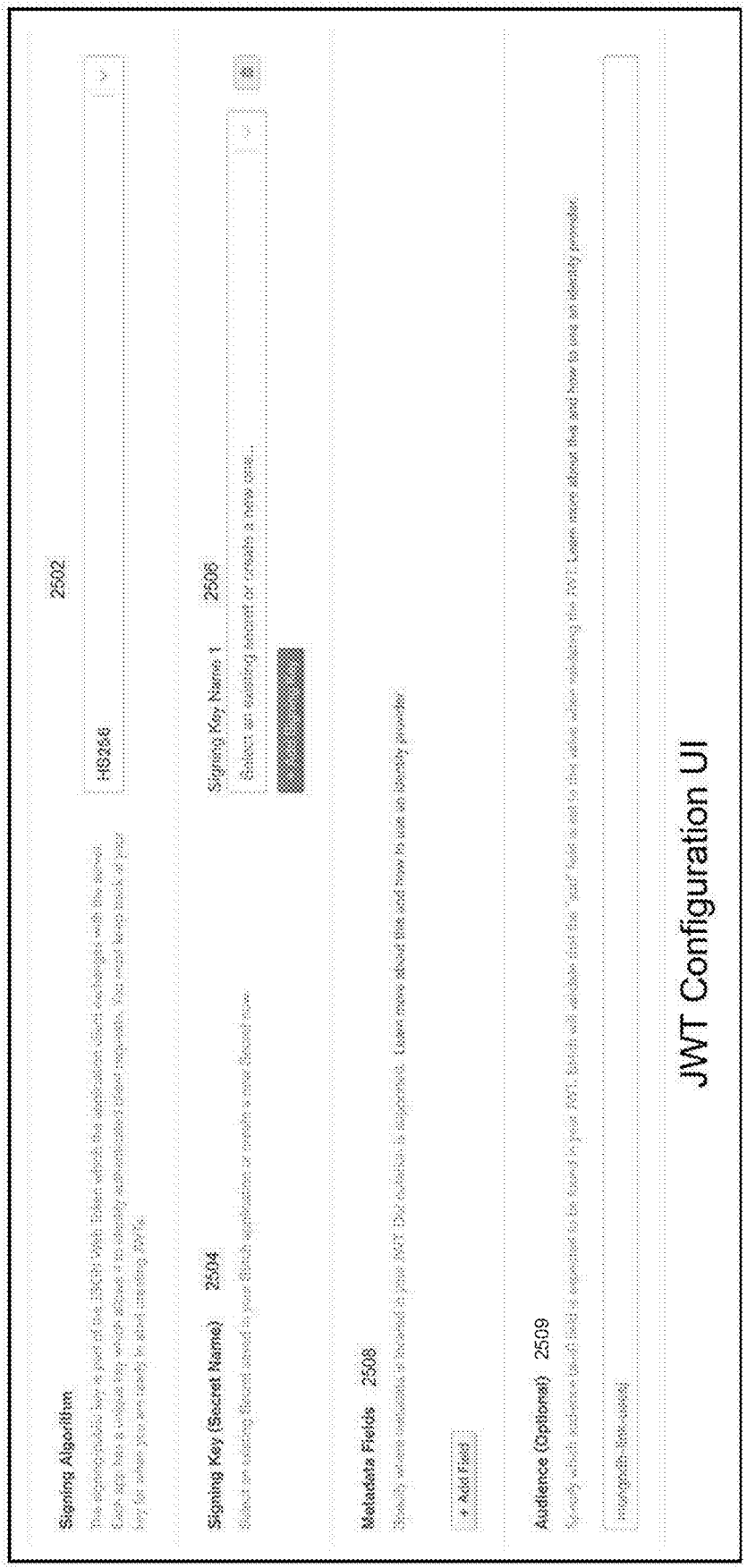
FIG. 25 is an example screen capture of a user interface, according to one embodiment.

In further embodiments, the client is shown a series of display that provide a walkthrough of configuring a JWT secret in charts. For example, in order for charts to be able to validate the claims in a given JWT, a customer configures charts to store the symmetric key or the corresponding public-key that was used to sign the JWT, and optionally an audience value that is used or expected in the token. FIG. 25 illustrates a user interface displayed to an end user. As shown the user interface is configured to receive a signing algorithm input from the end user at 2502. The user inputs and signing key/secret name which can be an existing secret or one that is newly created at 2504-2506. At 2508 the user interface enables the user to specify where metadata is located in the JWT token. Optionally, the user can specify audience at 2509. For example, in this screen, the user would also have the option of choosing between a list of predefined authentication providers like "Google", "Stitch" or "Azure AD" to reduce the friction in setting up authentication.

In further embodiments, the system is configured to allow users to enable the SDK in an embedding dialog. For example, the user opts-in to allowing their charts to support the embedding SDK. Some embodiments provide options to set up at least one or more of the following:

---

User-based filtering, aka "Inject this filter per user"
    The chart author can specify a function that returns a filter
    to apply based on which JWT user is trying to access a chart.
    The function/filter definition is configured to restrict access
    to the chart based on a claim in the JWT or a whitelist of user
    ids. e.g. '{ manager_id: jwt.claim.user_id }'
Opt-in filtering of fields
    The chart author can specify which fields they wish to allow
    the embedding user to filter on

---

In some embodiments, the system provides a walkthrough to configure a JWT secret in the SDK. Then either via an endpoint or another external source, the user can provide a JWT to the Charts SDK.

An example token payload

---

```
{
    "exp":1566362599,
    "aud": "mongodb-charts",
    ...claims
}
```

---

In some settings, if an expiry or 'exp' is not provided, then Charts would reject the JWT for security reasons.

Further embodiments, use the SDK to handle refreshing (e.g., by expecting the developers to provide a function that returns a valid (non-expired) token). Anytime the SDK needs to refresh this token, the system can call a refresh function to receive a new valid JWT. In some examples, the JWT is managed by the data access service client (e.g., Stitch Client), so the SDK can get and refresh the token using the data service API (e.g., Stitch's API) directly. In further embodiments, customers expose their JWT to charts and provide a way to refresh the token.

As discussed, if a customer doesn't already have a JWT through their authentication provider, they can create a signed JWT on their server and pass this token through to the frontend. Both HS256 and RS256 encryption schemes would be supported.

Example code is provided below to show an example of integrating the SDK inside an application. In various embodiments, the SDK is a framework-agnostic way to embed charts into a target application.

An Example SDK is shown in Table L.

TABLE L

```
interface ChartOptions {
  getUserScopeToken: ({ chartId, tenantId }) => Promise<string>
  baseUrl: string;
  chartId: string;
  tenantId: string;
  filters: string[ ] | string;
  options: {
    theme: string;
    refreshInterval: number;
  }
  // experimental
  fetchData: ({ collection, database, pipeline }) => Promise<any>
}
class ChartSDK {
  static embedChart(options: ChartOptions, appendTo: HTMLElement);
}
``` and to embed a chart, a user would do:

```
import ChartSDK from '@mongodb-js/charts-embed-sdk';
const chart = ChartSDK.embedChart(options, document.body);
/*
  The object returned by embedChart would have a set of functions on it to manipulate the chart:
  chart {
    _window: HTMLIFrameElement; // reference to iframe rendering this chart
    refresh( ): void; // refreshes the Chart's data against the server
    set(name: string, value: any): boolean; // sets an option key
    get(name: string): any; // sets an option key
    getFilters( ): string[ ]; // gets existing filters applied to the data
    setFilters( ): string[ ]; // sets the filters applied to the data
  }
*/
```

Some examples provide validation of the system version to ensure compatibility with the SDK and a version of charts.

Figure 26:
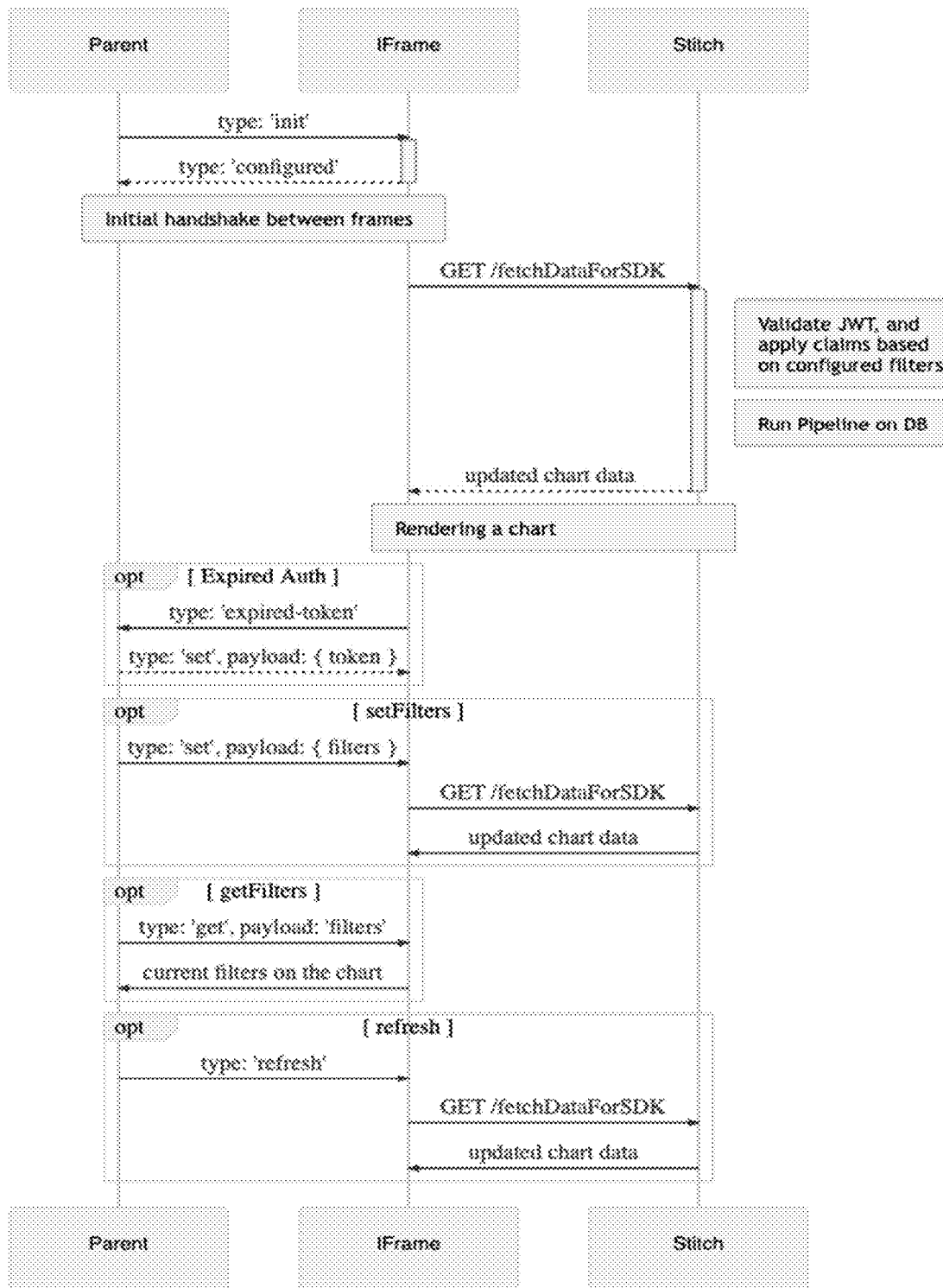
FIG. 26 is an example process flow and data exchange, according to one embodiment.

FIG. 26 illustrates an example process flow and data exchange based on a MonogoDB implementation and Stich data access service. For example, when creating the chart IFrame, the SDK employs the 'postMessage' and 'MessageChannel' API to establish a connection to the Iframe, and from this point on, the Parent and IFrame will exchange messages based on the actions they wish to perform.

Figure 27:
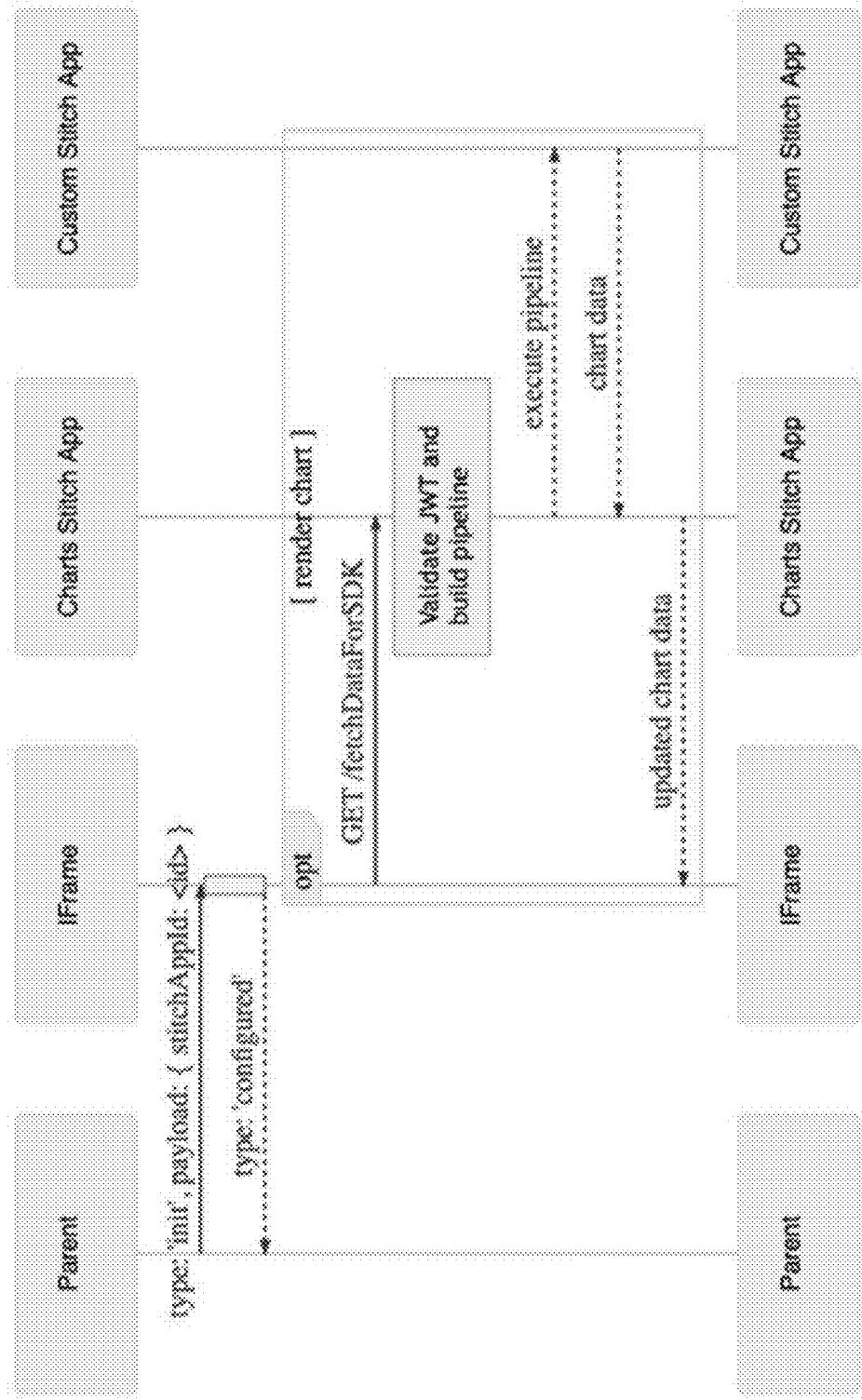
FIG. 27 is an example embodiment sowing a rendered charts when delegating data fetching to a custom data access service application.

Examples include FIG. 27 which illustrates an example of how the SDK renders charts when delegating data fetching to a custom data access service application (e.g., Stitch app). For example, when using Stitch Authentication, the SDK will pass to the IFrame the Stitch App ID to use for delegated data fetching. When the IFrame requests chart data, the Charts Stitch App will validate the Stitch JWT and attempt to execute the generated Chart pipeline using these credentials. Various embodiments are configured to handle the claims in the auth-token, and securely apply the filters configured in the charts (if they exist), and returning the chart data, and in some examples, while logging what users were accessing these charts, which may include logging under the a no-auth scenario. Further embodiments, update functionality in an embedding iframe to include support for taking a parameter (i.e. '&sdk=1') that causes the IFrame to wait for a postMessage request (e.g., this prevents flashing/loading irrelevant chart data), handling and sending messages between the parent IFrame and itself, and setting config options for the current chart: theme/refresh rate.

Figure 28:
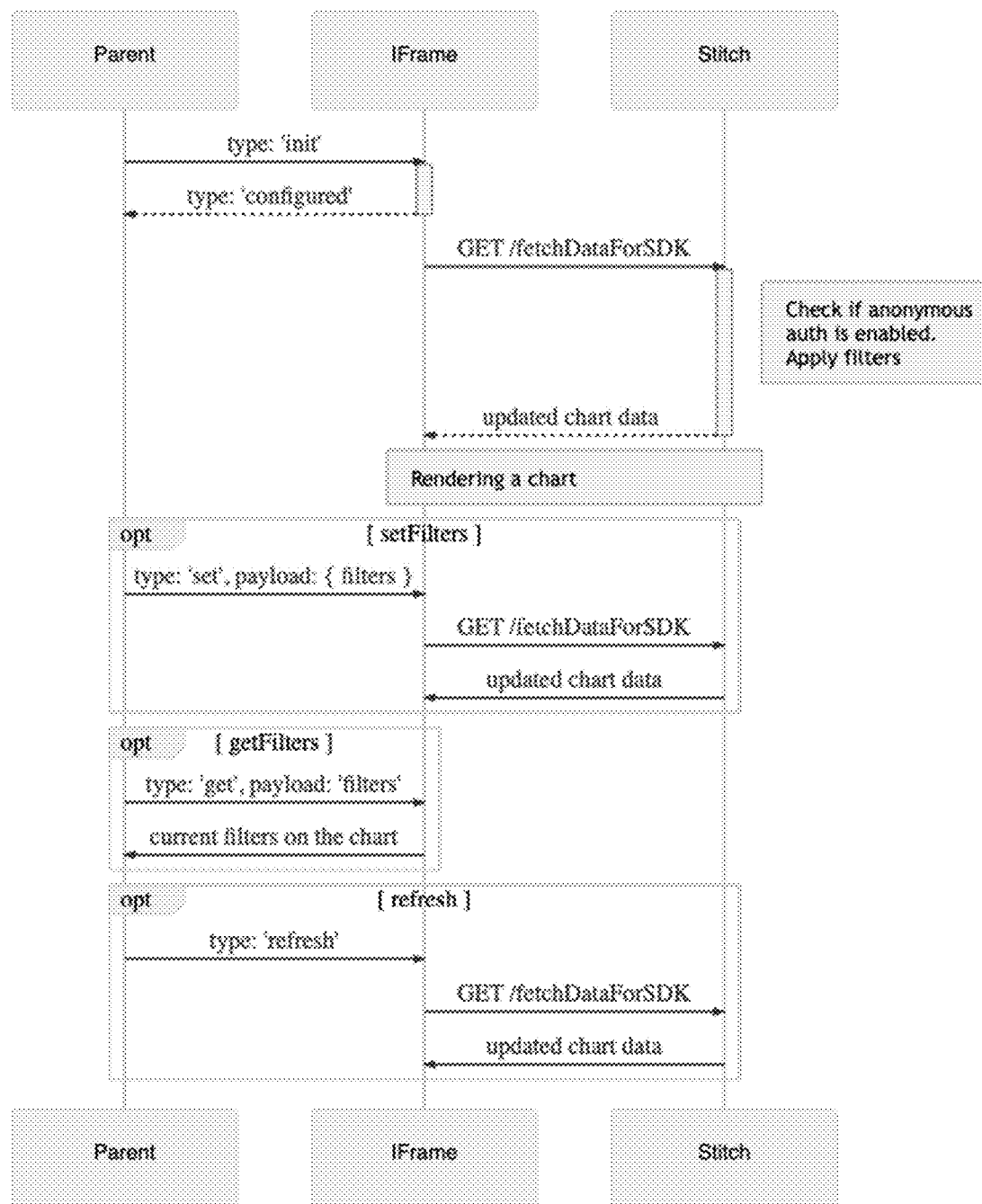
FIG. 28 is an example screen capture for configuring unauthenticated access to an embedded chart, according to one embodiment.

FIG. 28 illustrates an example of how the SDK operates under unauthenticated access. According to some embodiments, under the unauthenticated access approach, no token is configured by the SDK. The IFrame still attempts to fetch the data, but the data loads only if anonymous authentication is enabled for the chart.

Various embodiments of the system are configured to resolve potential security vulnerabilities, including for example one or more of the following:

a malicious IFrame on the user's page sends messages to the Chart's Iframe based on configuring a chart to listen for the initial connection message (from a parent), and then use a MessageChannel to ensure that only the Parent can dispatch messages to it.

an end-user is able to modify chart data using the endpoints exposed by the SDK based on endpoints configured to require authentication to run apply any filters, and any code-paths that end up touching the database to ensure that the aggregation-pipeline stages have been white-listed and to reject any pipelines that contain mutating actions (like $out).

an end-user is able to access chart data they're not authorized to see, based on configuring endpoints to check the signed access-token to ensure the user is entitled to see the chart-id & tenant-id pair. Additionally, access-tokens are required to have a short-lived expiry so in the event of a permission change, a user will only have access for as long as their previous token. In further example, the system enables customer to specify strict filters that apply to the access-tokens to restrict what documents an end-user spoofs an access-token to read data/see charts, based on configuring endpoints to check the signed access-token to ensure the user is entitled to see the chart-id & tenant-id pair. As discussed, access-tokens have an short-lived expiry so in the event of a permission change, a user will only have access for as long as their previous token.

an end-user in retrospect has performed actions that the system can trace, based on configuring access tokens that require a 'user-id' attribute, which refers to a unique ID of the application's authenticated user. In various examples, the ID gets logged when performing any requests to establish an audit trail to trace what Charts/filters a user has applied.

Example Chart Caching Implementation

Various embodiments can also include further architecture improvements. For example, the visualization system can include cache operations to improve execution speed. According to one embodiment, the system is architected to cache the result of aggregation queries in a dedicated cache cluster, where that data can be accessed by any user wanting the same chart in a similar timeframe. For example, the dedicated cache cluster and ability to serve aggregated data from the cache significantly improves the performance of communicating and/or rendering charts, and can also provide the additional benefit of avoiding repeated expensive queries.

In some embodiments, in order to render a chart, the system executes an aggregation query (e.g., derived from the chart definition) against a collection within the client's database (e.g., MongoDB database). The time that it will take to execute this query will depend on many factors, including the size of the collection, the complexity of the aggregation query, the collection's indexes and the cluster's configuration and hardware. In some implementations, the user must wait for this query to complete before they can view any chart.

In further embodiments, the result of this query is cached in local browser state for a period of time (e.g., to speed up future openings of the same dashboard within a user's session) but if several users are accessing the same dashboard within a similar time period, various embodiments execute identical queries for each and each user waits for the result for their chart to render. For embedded charts (where the number of users and chart render requests is often hard to predict) the problem can be exacerbated as embedded charts may require an aggregation triggered for each render, which can potentially create a large number of identical queries, and result in slow render times with a large amount of load on the a database cluster.

Accordingly, a cache architecture can be included in various embodiments to store the result of each aggregation query within a dedicated cache cluster (which can be separate from a client database and/or integrated) after the chart data is first requested. Subsequent requests by other users to render the same chart (e.g., within a defined time frame) would retrieve the cached data instead of executing the aggregation query again. Such embodiments, result in near-instant chart renders where the data is in the cache, and reduced load on the client database cluster (e.g., a customer's MongoDB cluster).

Some embodiments can be configured to implement asynchronously and background execution aggregate define in chart data. Various timeouts can be adjusted and/or eliminated to use the asynchronous aggregation.

Figure 29:
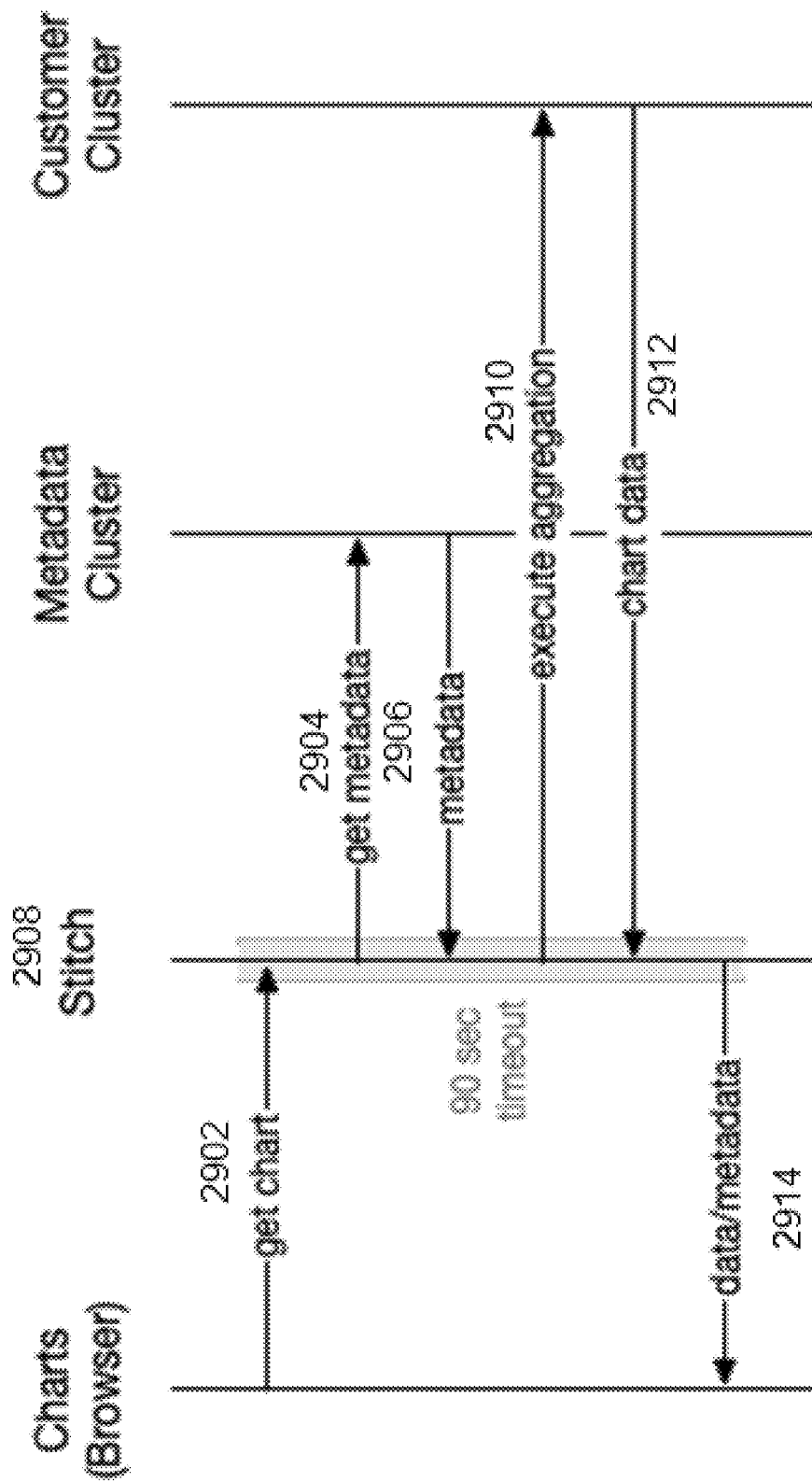
FIG. 29 is an example data flow according to one embodiment.

Various embodiments, implement the flow shown in FIG. 29. For example, in a MongoDB environment a chart request/reload (e.g., 2902) triggers an aggregation on the database itself. After fetching the metadata (2904-2906) for a chart, the Stitch function 2908 (or more generally a data access service function) then constructs and executes the right aggregation pipeline 2910 and waits for the results 2912, before returning the chart data and metadata (2914) back to the client. In some embodiments, the data returned to the client can be further processed there, and the system can be configured to cache the raw data returned from the database.

Figure 30:
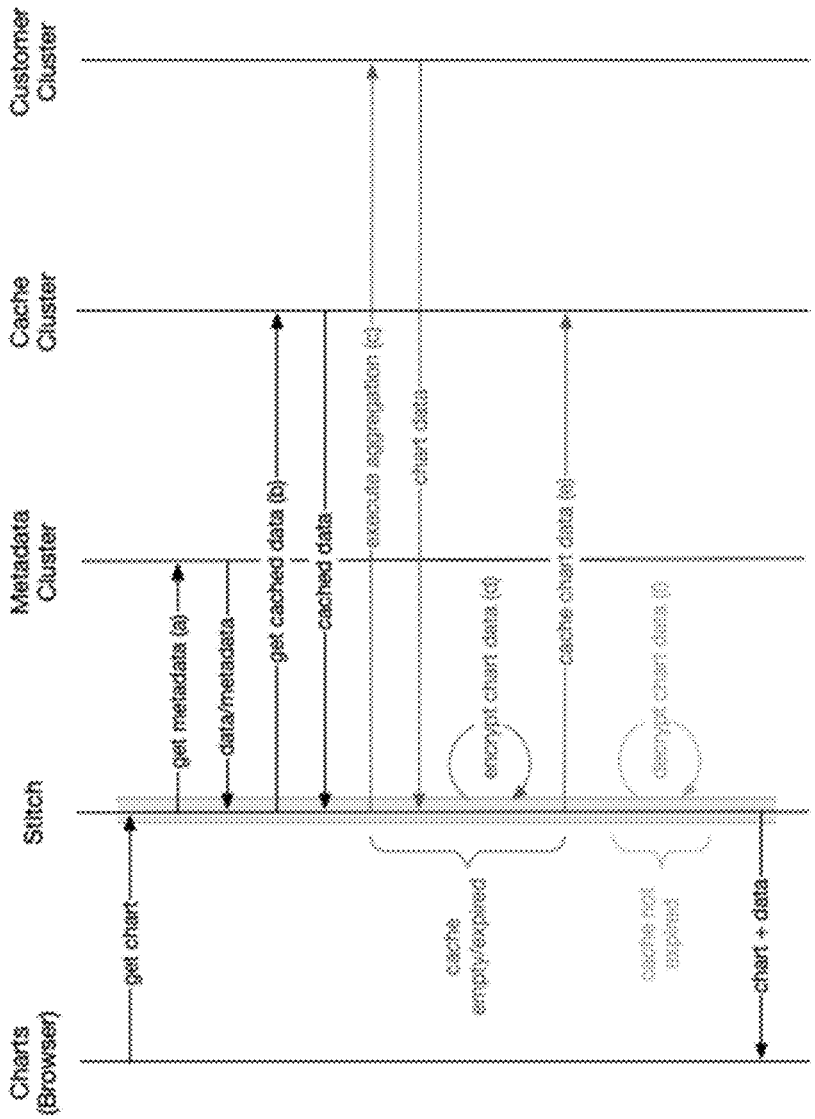
FIG. 30 is an example data flow according to one embodiment.

According to some embodiments, the system is configure with the following sequence of requests for viewing a dashboard shown in FIG. 30. For example, upon requesting a chart, the data access service (e.g., Stitch) function fetches the chart metadata (a) and subsequently the cached data for this chart (b) if available. If no cached data is available, or if the data is too stale for this request, it will then trigger an aggregation against the customer cluster as usual. Once the data is returned, the Stitch function encrypts the data with a tenant-specific symmetric key (d), adds some timestamp information (e.g., metadata like timestamp) and optionally a hash of the query that produced the data, and writes the cached data into the cache cluster, overwriting existing cache data for this query hash/datasource combination (e).

If cache data was present and not too stale for the request (e.g., passes a timeliness check), no aggregation takes place. The encrypted part of the data is decrypted with the same symmetric key (f) and returned to the client. In some embodiments and/or execution the process flow can be adjusting. For example, a chart authoring example, step (a) can be skipped, and a hash computed from the inputs of a data retrieval operation executed during chart authoring (e.g., fetchDataForAuthoringFromDatasource function inputs) directly.

Additional architectures can be used. For example, to support on-premises implementations a charts metadata cluster can be used to store the cache documents (e.g., in a metadata.cache collection). Cloud based architectures can include cache metadata clusters and/or include a second, separate cluster for cache data. An example cache document schema is described in Source Code Appendix A.

According to some embodiment, the result of the chart aggregation is an array of documents, which will be encrypted and stored (e.g., as BSON binary type in the data field). For example, the other fields track metadata information about the aggregation job itself and some statistics. In further example, the system is configured to include the tenantId in case of eventual cache cleanups for a given tenant. According to one embodiment, the system can also version the schema of these documents (e.g., with schemaVersion) for future extensions and changes.

In some embodiments, the cache data can use a symmetric encryption method (AES) with a 32-byte random key, unique to each tenant and not stored in the cache cluster itself. Other examples can use different keys and/or encryption systems. Key can be generated as part of a migration for each tenant. Generally speaking, the key to access cache data can be generated can be based on the data source and the aggregation pipeline (including any applied filters at the chart or dashboard level, or filters provided to an embedded chart). According to one embodiment, the system is configured to compute a hash of the inputs into the aggregation pipeline builder code (e.g., where any relative dates are still unexpanded).

Example

A chart may contain the following query filter, targeting all documents created at most 24 h prior: {created_at: {$gt: new Date( )−1000*60*60*24}}

Computing a hash of its unexpanded form (as above) would always lead to the same result. However when constructing the aggregation pipeline of this filter repeatedly in the space of a few minutes, it could lead to different outputs:

{created_at: {$gt: {$date: "2020-01-14T12:25:31.159Z"}}}

{created_at: {$gt: {$date: "2020-01-14T12:26:49.885Z"}}}

{created_at: {$gt: {$date: "2020-01-14T12:28:05.921Z"}}}

Which in turn results in different hashes for these pipelines. In some examples, the system can be configured to use parts of the chart definition as the system stores in the database as input into the hash function instead.

According to one embodiment, the inputs consist of at least one or more and/or any combination of the following fields from the metadata.items document: dataSourceId, channels, customizations, reductions, filters, queryCache, chartType, convertedFields, calculatedFields, meta. In further example, the system can pass in the currently active dashboard filters (if any), and the filter passed in for an embedded chart (if any). To compute the hash, the system is configured to create a combined object of those keys and their values (and may include e.g., JSON.stringify( )) the object and compute a SHA-1 hash of the resulting string or other transform.

Various embodiments exclude the dashboardId and chartId from the hash value as cache documents don't need to be tied to a specific dashboard or even chart for the purposes of retrieval, and the system can be configured to include the dashboard and embedding filters separately for the hash.

Stated broadly, there can exist a many-to-many relationship between charts and cache documents. If a chart moves to another dashboard, or gets duplicated without modifications, the two copies can share the same cache. Conversely, the same chart with different dashboard filters applied would access different cache documents. The two cases are illustrated in the FIG. 31. In alternatives and/or additional embodiments, the system allows a one-to-many relationship between charts and cache documents and further caching of data deriving from dashboard filtering or during chart building, where multiple queries of the same chart with different filters can be issued in short succession. In one example, efficient retrieval can be executed based on based on the hash, and can in conjunction/alternative use the _id field which already has a unique index by default.

As described in the previous section, it's possible that multiple concurrent requests target the same cache document based on the hash, for example when several users are looking at the same dashboard simultaneously. In those cases, embodiments of the system are configured to avoid running the same aggregation multiple times concurrently.

When fetching data for a chart the system can first fetch the cache document as described above. Various embodiments are configured to differentiate the following cases:

No document can be found: Execute the aggregation against the customer cluster.
A document was found but the data has expired: Execute the aggregation against the customer cluster.
A document was found with status COMPLETE or FAILED and the data has not expired: return the cache data back to the client.
A document was found with status PENDING: An aggregation against the customer cluster is ongoing. Repeatedly query the cache document in a 1-second interval:
If the document returns with status COMPLETE: return cache data to client.
If the document returns with status FAILED: return the last error to client.
If the document does not return within the 90-second timeout, Stitch will abort the function with an error.

Various embodiments implement a time to live ("TTL") index to keep the number of cache documents from growing without bounds. For example, the system can encode an expireAt field with a expireAfterSeconds value of 0. The setting operate so that a document is deleted whenever the expireAt value lies in the past, and gives the application control of the longevity of a document in this collection, by specifying the date and time at which the document should automatically get deleted. When a chart is saved from the chart builder, and when a dashboard filter is saved in authoring mode (and becomes the default for the affected charts), the system can use a longer caching duration (e.g. one week, TBD), setting the expireAt field to this date in the future from the calculated date, which means cache documents automatically expire after the chosen date.

For ad-hoc queries, which includes custom dashboard filters in viewer mode and filters constructed in the chart builder before saving the chart, and filters applied to embedded charts via the SDK or URI parameter, the system may implement a shorter expiry time (e.g. one hour), for example, to provide a fast response when toggling between different dashboard filters or toggling between different chart types in the chart builder in those situations, without bloating the cache collection with intermediate results for a long time.

Embodiments for Creating/Editing a Pipeline

Various embodiments are configured to display a button to add a new or edit an existing pipeline to a data source (e.g., by opening a modal view with a text box). The pipeline can be written inline or copy & pasted into the text box. In some alternatives and/or embodiments, the system is configured to link to visual aggregation pipeline builder. For example, the link opens in a new tab and leads directly to the aggregation view of the correct database/collection. For example, the user can copy the completed aggregation pipeline and paste it back into a displayed text box.

Example code for linking to visual aggregation pipeline builder in a MongoDB implementation follows. The URL to link to is of the following form:

{cloudBaseURL}/v2/{groupId}#metrics/replicaSet/{replicaSetId}/explorer/{database}/{collection}/aggregation According to some embodiments, the only value that's not already available in this context is the replicaSetId, which can be captured by the system through one or more a private cloud APIs.

Starting with a clusterName:
1. {cloudBaseURL}/nds/clusters/{groupId}/{clusterName}/instances will get the instance hardware. Generates a list of hostnames for the cluster. Cross-reference this with the following endpoint
2. {cloudBaseURL}/deployment/{groupId} which will have a list of processes each with a monitoringState. Examine the processes to find the one where the monitoringState contains a hostname from the instance hardware. Once you've found a process, use the parentClusterId if it exists, that will mean it's a sharded cluster. If it doesn't exist, use the clusterId which is the replica set it belongs to.

As these endpoints employ a cookie to authenticate (e.g., mmsa-prod/mmsa-dev), the system is configured to call these from the client, where the browser submits the cookies automatically. In some embodiments, the endpoints are also using a CORS policy.

According to some embodiments, the system is configured to limit aggregation operation to prevent any aggregation stage that can write data (e.g., back to the data source). The system employs a whitelisting approach and is configured to allow a list of approved aggregation stages for this feature. The whitelisted stages cab be displayed in a query generation bar, which can also display additional options and/or functions. For example the system additionally allows the $lookup stage for data preparation (e.g., the $lookup function and examples can be found in U.S. patent application Ser. Nos. 16/013,720, 15/604,879, 62/341,511, 62/341,490, and 15/042,297, 13/951,987, 13/794,710, 61/676,188, incorporated by reference in their entirety herein), as this feature can be commonly called, and, for example, would allow merging data from two different collections.

Adding Missing Fields/Calculated Field UI Example Functions

Various embodiments of the system provide user interfaces to design and build visualizations based on associated data sources. Additional embodiments and/or alternatives provide functions to enable authors to add missing and calculated fields within the chart builder, making it possible to build a wider variety of charts from a collection. In further example, the system and associated interfaces provide an easy to use functions to convert the type of a field, e.g., virtual or real.

For example, the chart builder UI contains a panel which lists all of the fields of a document discovered from a small sample. While this is often all that is needed to build a chart, users sometimes complain that fields are missing (e.g., because they were not captured by the sample), or existing fields are not suitable for charting (e.g., having incorrect data type, format or scale). Various embodiments are configured to resolve these type of issues, for example, via "data preparation" features or providing a custom aggregation pipeline in the query bar. Various embodiments provide additional functionality to enable an easy to use way to achieve these tasks "in place," and for example, at a chart level. In various examples, the UI implementation can eliminate any requirement for aggregation syntax. According to one embodiment, each field displayed in the field panel of the chart builder UI includes a contextual menu with an option to convert the type of the field. In one example, the system default option is "Auto detect" and upon access to the field, the system is configured to derive the field type from the sample of documents drawn to populate the field panel. If multiple types are detected for a single field, the most common type can be selected by the system. In further embodiments, the system can identify inconsistent data types within a sample, and present a visual notification to the end user in the interface, which can be in addition to selection of the most common type and/or as an alternative to system selection.

According to some embodiments, options to choose from are string, date, number and boolean, among other examples. All types except number convert to their respective BSON types. In one embodiment, number converts to BSON type Double, however for graphical charts the system can treat all numeric types the same (or as various number types), which is sufficient for most use cases. Conversions to other numeric types (e.g., Int, Long, Decimal) can be used in a table view, for example, and can also be used for extremely large or small values, where precision might play a factor. In some example, the system is also configure to allow the users to provide a custom pipeline in the query bar which can explicitly cast to a different numeric type.

According to one embodiments, missed and calculated fields are grouped together under the tag "Virtual Fields". For example, a new virtual field can be added in a field panel display, which is configured to open a dialog where the user can choose between a missed or a calculated field. For a missed field, the user can enter the field name of the field they would expect to see in the field panel. For example, this feature is used in situations where field sampling missed a rare field. Upon entering the field name and clicking save, the system is configured to send a targeted query for the specific field with {$exists: true} and a limit of 1 to the server to confirm the existence of the field. If no such field can be found, an error message is shown. Otherwise the field appears in the field panel and can be used like any other field (including for type conversions or as basis for calculated fields). If a real field is discovered during sampling with the same field path as a missed field, the real field is shown instead. If the user chooses the calculated field option, the user can enter a field name for the calculated field as well as an expression. The field name can be a new or existing field name. For the latter case, the original field would be overwritten. Example options for supporting a calculated field expression include at least the following:

1. All Aggregation Framework expressions that are supported in the projection language are supported, including field references (using dot notation) and nested expressions. Example:
   {$ceil: {$multiply: ["$purchase.price", 1.1] }}
2. A simplified language that includes the 4 basic arithmetic operations (addition +, subtraction −, multiplication *, division /) as well as parenthesis, whitespace, numbers and references to fields using dot notation for nested fields. Example:
   (purchase.price*1.1)+shippingCost In various embodiments, calculated fields can refer to real, missed, type-converted and other calculated fields, as long as a dependency graph of the operation does not introduce any cycles. The system can detect cyclic operations when a user tries to save a calculated field that introduces a cyclic dependency and disallow it with an error message. In some examples, missed and calculated fields can be edited and deleted from the same contextual menu introduced by converted fields.

In some embodiments, the system is configured to store additional information in the metadata.items collection, using a top-level key missedFields with the following shape:

```
missedFields: [
    {
        fieldPath: <string>,
        detectedType: <string>
    },
    . . .
]
```

In this example, the fieldPath value is the user-entered field reference in dot notation, and the detectedType is the type retrieved from the aggregation query to confirm the missed field. At the time of adding a missed field, before the dialog is closed, the system is configured to run the following aggregation against the collection:

```
[
    {$match: {"<fieldPath>": {$exists: true}}},
    {$limit: 20},
    {$group: {"_id": null, "values": {$push: "$<fieldPath>"}}},
    {$project: {values: 1, id: 0}}
]
```

This example aggregation matches the documents that contain the missed field, and can collect up to 20 values in an array and return a document of this shape:
   {"values": [<value1>, <value2>, . . . ]}

Various embodiments are configured to manage calculated fields by storing additional information in the metadata.items collection, using a top-level key calculatedFields with the following shape:

```
calculatedFields: [
    {
        fieldPath: <string>,
```

```
    rawExpression: <string>, // needed to show in the UI
    derivedMQL: <string> // don't want to repeat parsing the expression
  },
  ...
]
```

In the example above, fieldPath is the field path in dot notation to the field the user entered. rawExpression stores the expression the user entered (stripped of leading or trailing whitespace), for example, in query language form (e.g., MQL) or basic arithmetic language. The input can be validated at the time of saving, and valid expressions that do not contain cyclic dependencies can be stored. At the time of parsing, the system can also translate any basic arithmetic expressions to query language form (e.g., MQL) and store. If the expression was already in query language form (e.g., MQL), the system is configured to store a copy.

According to some embodiments, calculated fields generate an $addFields stage in the

```
pipeline. An example code implementation of this stage follows:{
  $addFields: {
    "<fieldPath>": <derivedMQL>
  }
}
```

If a field is both a calculated field and a converted field, the system is configured to apply the type conversion after the expression, in which case the $addFields stage looks like this instead:

```
$addFields: {
  "<fieldPath>": {    // from calculatedFields/convertedFields (same)
    $convert: {
      input: <derivedMQL>, // calculatedFields
      to: <convertTo>,    // from convertedFields
      onError: null
    }
  }
}
```

In the example above, the $addFields stage as part of the type conversion is not present in the pipeline, and both calculation and conversion happen in a single stage as part of the calculated fields segment.

Dashboard Filter Generation Examples

According to some embodiments, the system enables users to define and execute dashboard filters. For example, the system can be configured to key an array of filters by a dashboardId. The system can persist a filterId that is associated with the settings of each filter, using an array to maintain the order.

Various embodiment can employ indexing to support the dashboard filter functionality. For example, the user_settings collection can include the following indexes:
{"tenantId": 1, "stitchUserId": 1} (unique)
{"tenantId": 1, "dashboards.dashboardId": 1}

In one embodiment, the system uses the first index when a dashboard viewer makes any changes that need to be persisted in the user's user_settings document. Because a user can be a member of multiple tenants, multiple documents with the same UserId (e.g., stitchUserId) are possible. In one example, the second index is used when a dashboard author deletes a filter or an entire dashboard. In these settings, the system is configured to find all user_settings documents who have user-specific filters for this dashboardId.

In some embodiments, each filter will be assigned a uuid when added by a dashboard author. The system can leverage the uuid to keep the default filters and user specified filters in sync. For example, when a viewer applies their own settings to a dashboard filter, the system can track this uuid along with the settings defined by the user and persist them to a metadata collection (e.g., metadata.user_settings).

According to some embodiments, dashboard filters are executed after data source transformations and before chart-specific aggregations. The system can execute a dashboard filter pipeline in conjunction with data source transformations, other filters (e.g., query filters), embedding filters, UI filters, encodings, etc. In one example, a data access function can take the dashboard filters as parameter and build the filter pipeline for execution.

In various embodiments, a dashboard author controls which fields are available for querying on the dashboard, and can further specify which fields from different data sources are linked to a filter card. The system is configured to ensure that the filter keys selected by a user (client-side) are all enabled for filtering when crafting the aggregation segment. Further embodiments, can be configured to limit specific values, for example, where a given field is more sensitive than others. In other examples, the system enables the dashboard author to disallow filtering on the field altogether or use a combination of data preparation pipelines and calculated fields to protect the sensitive data.

CODE Examples

In various embodiment discussed above, the visualization system enables execution of functions within a container layer or data service application (e.g., referred to as "stitch"). Examples of the function and code that implement them follow. The examples and code are provided to illustrates how many functions can be accessed and executed within the described environment and architecture.
addDataSource (Public Function)//Triggered within UI (See e.g., FIG. 4)
According to one embodiment, the system defines a separate public function for each user-facing operation requiring admin APIs. This is effectively an orchestration function that calls multiple user and admin services/APIs.

```
exports = function(serviceName, databaseUri, databaseName, collectionName){
  console.log("Requesting token");
  var tokenResponse = context.functions.execute("getAdminToken");
  var accessToken = tokenResponse.access_token;
  console.log(accessToken);
  console.log("Creating Stitch Service");
  //Stitch covert name for container layer and/or functions
  var stitchServiceResponse = context.functions.execute("createStitchService", serviceName, mongoUri, accessToken);
  console.log(stitchServiceResponse._id);
  console.log("Creating Stitch Service Rules");
  var stitchServiceRulesResponse = context.functions.execute("createStitchServiceRules", stitchServiceResponse._id, serviceName, databaseName, collectionName, accessToken);
  console.log("Adding metadata doc");
  var mongodb = context.services.get("metadata");
  mongodb.db("authDemo").collection("datasources").insertOne(
    {
```

```
    "stitchServiceName": serviceName,
    "database": databaseName,
    "collection": collectionName,
    "owners": [ context.user.id ],
    "readers": [ context.user.id ],
    "writers": [ context.user.id ]
    }
  );
  return true;
};
``` getAdminToken (Private Function)
According to one embodiment, this function retrieves the admin credentials from a Value repository and calls the Admin Authentication endpoint to get a token (e.g., JWT token) which can be used in other calls.
In some examples, in order to post to localhost from the HTTP service, the server (e.g., Stitch Server) operations with localhost whitelisted, for example, by adding the following under the "api" config document:

```
    "clientHostWhitelist": ["localhost"]
exports = function( ){
re var httpService = context.services.get("http");
    var apiDetails = context.values.get("apiDetails");
    var requestUrl = apiDetails.baseUrl +
"/api/admin/v3.0/auth/providers/local-userpass/login";
    console.log(requestUrl);
    var authRequest = {
      "url": requestUrl,
      "headers" : {
          "content-type": ["application/json"],
          "accept": ["application/json"]
      },
      "body": JSON.stringify(context.values.get("adminUser")),
    };
    var authResponse = httpService.post(authRequest);
    decodedBody = authResponse.body.text( );
    return JSON.parse(decodedBody);
};
``` createContainerService (Private Function)
According to one embodiment, this is an example of a function that calls a container layer (e.g., Stitch) Admin API. It uses the previously acquired token, and then calls the generic postServiceWithToken function to make the actual HTTP request.

```
exports = function(serviceName, databaseUri, accessToken){
    var apiDetails = context.values.get("apiDetails");
    var serviceUri = apiDetails.baseUrl + "/api/admin/v3.0/groups/" +
apiDetails.groupId + "/apps/" + apiDetails.appId + "/services";
    var payload =
{"name":serviceName,"type":"mongodb","config":{"uri":mongoUri}};
    var response = context.functions.execute("postServiceWithToken",
serviceUri, payload, accessToken);
    return response;
};
``` postServiceWithToken (Private Function)
According to one embodiment, this generic function sends a POST request to an arbitrary endpoint with the requested payload and access token and returns the result.

```
exports = function(requestUrl, requestPayload, accessToken) {
    var httpService = context.services.get("http");
    var authRequest = {
    "url": requestUrl,
    "headers" : {
        "content-type": ["application/json"],
        "accept": ["application/json"],
        "authorization": ["Bearer " + accessToken]
    },
    "body": JSON.stringify(requestPayload),
  };
    var authResponse = httpService.post(authRequest);
    if (authResponse.statusCode >= 200 && authResponse.
statusCode < 300)
{
    return JSON.parse(authResponse.body.text( ));
}
  console.log(JSON.stringify(authResponse));
  throw JSON.stringify(authResponse);
};
```

It should be appreciated that various examples above each describe functions that can be and have been incorporated in different system embodiments together. The examples and described functions are not exclusive and can be used together.

Figure 19:
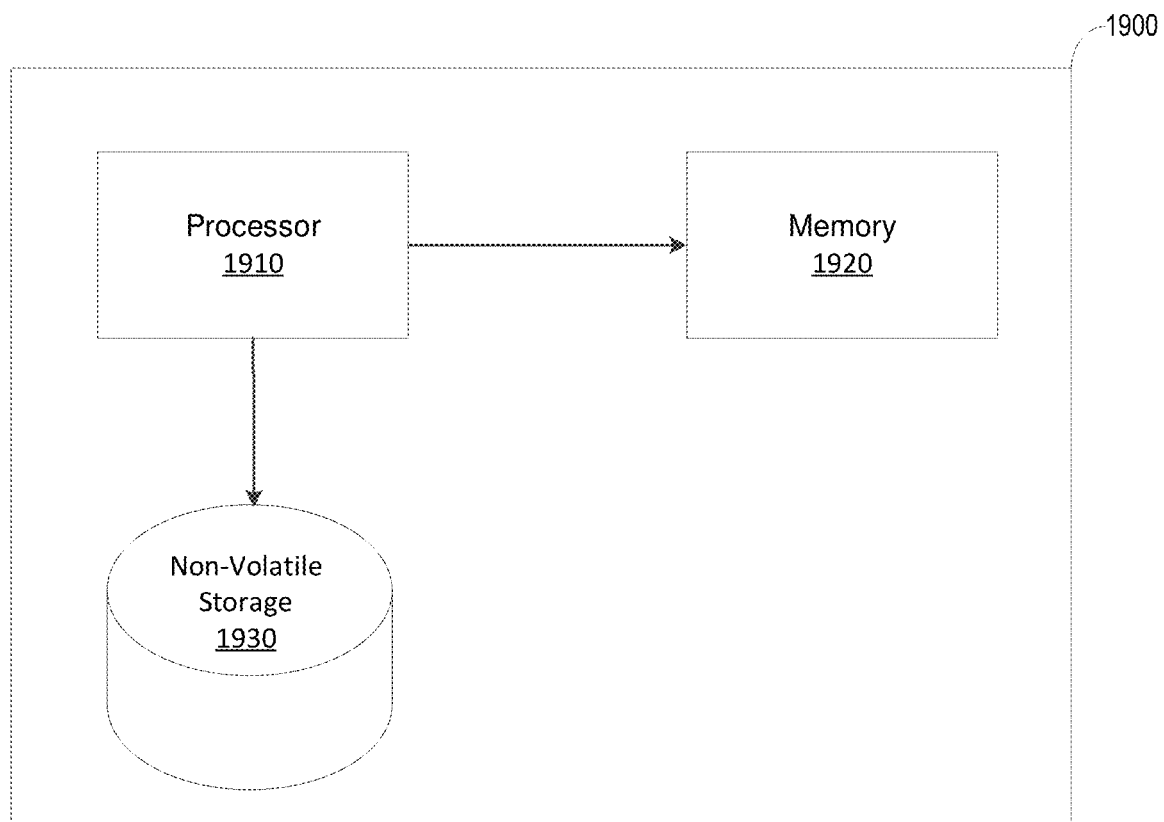
FIG. 19 is a specially configured system on which aspects and embodiments may be practiced.
Figure 20:
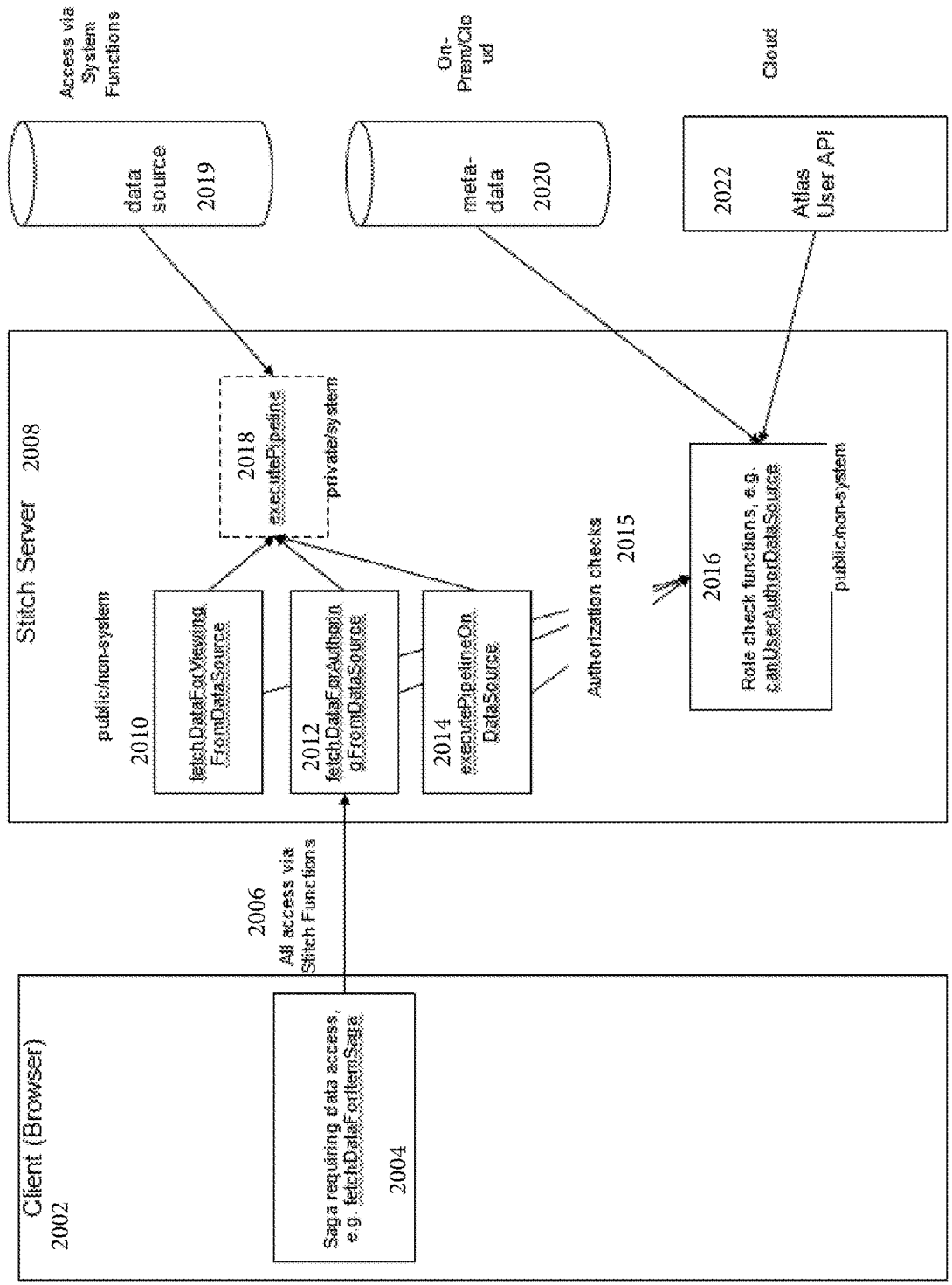
FIG. 20 is an example architecture and flow for controlling data access for visualization in charts, according to one embodiment.

Modifications and variations of the discussed embodiments will be apparent to those of ordinary skill in the art and all such modifications and variations are included within the scope of the appended claims. An illustrative implementation of a computer system 1900 that may be used in connection with any of the embodiments of the disclosure provided herein is shown in FIG. 19. The computer system 1900 may include one or more processors 1910 and one or more articles of manufacture that comprise non-transitory computer-readable storage media (e.g., memory 1920 and one or more non-volatile storage media 1930). The processor 1910 may control writing data to and reading data from the memory 1920 and the non-volatile storage device 1930 in any suitable manner. To perform any of the functionality described herein, the processor 1910 may execute one or more processor-executable instructions stored in one or more non-transitory computer-readable storage media (e.g., the memory 1920), which may serve as non-transitory computer-readable storage media storing processor-executable instructions for execution by the processor 1910.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A visualization system comprising:
at least one processor operatively connected to a memory, the at least one processor configured to:
instantiate a visualization application as an on demand service configured to integrate with a dynamic schema database;
manage user access roles for visualization of the data within the database or collection based on defined public and private access functions;
generate a user interface comprising displays for the visualization application according to the user access roles, the displays comprising:
a first display configured to accept specification of a database or database collection of the dynamic schema database to access, the database or database collection storing data as values of a plurality of data fields; and
a second display for visualization of a dashboard builder interface, the second display including a visualization of data fields of the plurality of data fields within the database or database collection;
accept drag and drop operations in the user interface indicating one or more data fields of the plurality of data fields for which to generate visualizations; and
in response to the drag and drop operation in the user interface indicating the one or more fields, generate the visualizations, the generating comprising:
perform one or more operations using values of the one or more data fields stored in the database or database collection to obtain information about the one or more data fields; and
generate the visualizations using the information about the one or more data fields obtained from performing the one or more operations wherein the at least ono processor is configure to dynamically select visualization operations responsive to data selected via the drag and drop operations.

2. The system of claim 1, wherein the at least one processor is further configured to:
sample the database or database collection;
identify nested database data; and
include functions associated with nested database data for selection in the user interface.

3. The system of claim 2, wherein the at least one processor is further configured to:
identify that the one or more data fields have different data types; and
select a representative data type and associated functions for visualization.

4. The system of claim 3, wherein the at least one processor is configured to select the representative data type based on a most commonly occurring data type in the sample.

5. The system of claim 2, wherein the at least one processor is configured to display a set of missed fields, wherein the missed fields are in the database or database collection and not within the sample of the database or database collection.

6. The system of claim 1, wherein the at least one processor is configured to:
   display inputs for definition of calculated fields; and
   associate the calculated field with a data source and data visualization.

7. The system of claim 6, wherein the at least one processor is configured to:
   maintain a global identifier for the calculated filed; and
   enable user selection of the calculated field based on determining valid permission to access the visualization.

8. The system of claim 1, wherein management of the user access roles includes defining public and private access functions, wherein private access functions require privileged access in order to execute.

9. The system of claim 8, wherein the at least one processor is configured to limit end user access to private functions through access tokens and association between private functions and individual databases or database collections.

10. The system of claim 9, wherein the at least one processor is configured to permit access to public functions to any authorized user, and control access to the visualization system based on a first set of authorization information.

11. The system of claim 10, wherein the at least one processor is configured to validate proper access to the private function using a second set of authorization information.

12. A computer implemented method for generating visualizations, the method comprising:
   instantiating, by at least one processor, a visualization application as an on demand service configured to integrate with a dynamic schema database;
   managing user access roles for visualization of the data within the database or collection based on defined public and private access functions;
   generating, by the at least one processor, user interface displays for the visualization application according to the user access roles, the displays comprising a first display and a second display;
   accepting through the first display specification of a database or database collection of the dynamic schema database to access, the database or database collection storing data as values of a plurality of data fields;
   generating, in the second display, a dashboard builder interface and a visualization of data fields of the plurality of data fields within the database or database collection;
   accepting, by the at least one processor, drag and drop operations in the user interface indicating one or more data fields of the plurality of data fields for which to generate visualizations; and
   responsive to the drag and drop operation, generating the visualizations, the generating comprising:
      performing one or more operations using values of the one or more data fields stored in the database or database collection to obtain information about the one or more data fields; and
      generating the visualizations using the information about the one or more data fields obtained from performing the one or more operations.

13. The method of claim 12, wherein the method comprises:
   sampling the database or database collection;
   identifying nested database data; and
   including functions associated with nested database data for selection in the user interface.

14. The method of claim 13, wherein the method comprises:
   identifying that the one or more data fields have different data types; and
   selecting a representative data type and associated functions for visualization.

15. The method of claim 14, wherein the method further comprises selecting the representative data type based on a most commonly occurring data type in the sample for a respective database field.

16. The method of claim 12, wherein the method further comprises displaying a set of missed fields, wherein the missed data fields are in the database or database collection and not within the sample of the database or database collection.

17. The method of claim 12, wherein the method further comprises:
   displaying inputs for definition of calculated fields; and
   associating the calculated field with a data source and data visualization.

18. The method of claim 17, wherein the method further comprises:
   maintaining a global identifier for the calculated filed; and
   enabling user selection of the calculated field based on determining valid permission to access the visualization.

19. The method of claim 12, wherein the managing of the user access roles includes defining public and private access functions, wherein private access functions require privileged access in order to execute.

20. The method of claim 19, wherein the method further comprises limiting end user access to private functions through access tokens and association between private functions and individual databases or database collections.

* * * * *

UNITED STATES PATENT AND TRADEMARK OFFICE
CERTIFICATE OF CORRECTION

| | | |
|---|---|---|
| PATENT NO. | : 11,526,530 B2 | Page 1 of 3 |
| APPLICATION NO. | : 16/895101 | |
| DATED | : December 13, 2022 | |
| INVENTOR(S) | : Tom Hollander et al. | |

It is certified that error appears in the above-identified patent and that said Letters Patent is hereby corrected as shown below:

In the Specification

Starting at Column 1 Line 7 through Column 3 Line 2, please delete the paragraph and replace with the paragraph shown below:
--This application claims priority under 35 U.S.C. § 119(e) to U.S. Provisional Application Serial No. 62/861,808 filed on June 14, 2019, and entitled "SYSTEMS AND METHODS FOR DATA VISUALIZATION, DASHBOARD CREATION AND MANAGEMENT." This application claims priority under 35 U.S.C. § 119(e) to U.S. Provisional Application Serial No. 62/862,979, filed on June 18, 2019, and entitled "SYSTEMS AND METHODS FOR MANAGING DISTRIBUTED DATABASES WITH DYNAMIC SCHEMA." This application is a continuation-in-part of U.S. Patent Application No. 16/010,034, filed on June 15, 2018, entitled "SYSTEMS AND METHODS FOR MANAGING A DATABASE BACK END AS A SERVICE," which claims priority under 35 U.S.C. § 119(e) to U.S. Provisional Application No. 62/521,303, filed on June 16, 2017, and entitled "SYSTEM AND METHOD FOR MANAGING A DATABASE BACK END AS A SERVICE." This application is a continuation-in-part of U.S. Patent Application No. 15/223,654, filed on July 29, 2016, entitled "SYSTEMS AND METHODS FOR MODELLING VIRTUAL SCHEMAS IN NON-RELATIONAL DATABASES," which claims priority under 35 U.S.C. § 119(e) to U.S. Provisional Application Serial No. 62/355,470, filed on June 28, 2016, entitled "SYSTEMS AND METHODS FOR MODELLING VIRTUAL SCHEMAS IN NON-RELATIONAL DATABASES," and U.S. Provisional Application Serial No. 62/262,942, filed on December 4, 2015, entitled "SYSTEMS AND METHODS FOR MODELLING VIRTUAL SCHEMAS IN NON-RELATIONAL DATABASES." This application is a continuation-in-part of U.S. Patent Application No. 16/013,720, filed on June 20, 2018 and entitled "AGGREGATION FRAMEWORK SYSTEM ARCHITECTURE AND METHOD," which claims priority under 35 U.S.C. § 119(e) to U.S. Provisional Application No. 62/522,540 entitled "SYSTEM, METHODS, AND INTERFACES FOR A NOSQL DATABASE SYSTEM," filed June 20, 2017, and claims priority under 35 U.S.C. § 119(e) to U.S. Provisional Application No. 62/522,150 entitled "SYSTEMS AND METHODS FOR OPTIMIZING DISTRIBUTED DATABASE DEPLOYMENTS" and filed June 20, 2017. Application Serial No. 16/013,720 is a Continuation-in-part of U.S. Application Serial No. 15/605,391, filed May 25, 2017, entitled "AGGREGATION FRAMEWORK SYSTEM Signed and Sealed this
Sixteenth Day of April, 2024

*Katherine Kelly Vidal*

Katherine Kelly Vidal
*Director of the United States Patent and Trademark Office*

CERTIFICATE OF CORRECTION (continued)
U.S. Pat. No. 11,526,530 B2

ARCHITECTURE AND METHOD", which is a Non-Provisional of Provisional (35 USC 119(e)) of U.S. Application Serial No. 62/341,511, filed May 25, 2016, entitled "AGGREGATION FRAMEWORK SYSTEM ARCHITECTURE AND METHOD". Application 15/605,391 is a Non-Provisional of Provisional (35 USC 119(e)) of U.S. Application Serial No. 62/341,490, filed May 25, 2016, entitled "AGGREGATION FRAMEWORK SYSTEM ARCHITECTURE AND METHOD". Application 15/605,391 is a Continuation-in-part of U.S. Application Serial No. 15/042,297, filed February 12, 2016, entitled "AGGREGATION FRAMEWORK SYSTEM ARCHITECTURE AND METHOD", which is a Continuation of U.S. Application Serial No. 13/951,987, filed July 26, 2013, entitled "AGGREGATION FRAMEWORK SYSTEM ARCHITECTURE AND METHOD", which is a Continuation-in-part of U.S. Application Serial No. 13/794,710, filed March 11, 2013, entitled "AGGREGATION FRAMEWORK SYSTEM ARCHITECTURE AND METHOD", which is a Non-Provisional of Provisional (35 USC 119(e)) of U.S. Application Serial No. 61/676,188, filed July 26, 2012, entitled "AGGREGATION FRAMEWORK SYSTEM ARCHITECTURE AND METHOD". Application 13/951,987 claims priority under 35 U.S.C. § 119(e) to U.S. Provisional Application Serial No. 61/676,188, entitled "AGGREGATION FRAMEWORK SYSTEM ARCHITECTURE AND METHOD" filed on July 26, 2012. Application 15/605,391 is a Continuation-in-part of U.S. Application Serial No. 14/672,901, filed March 30, 2015, and entitled "AGGREGATION FRAMEWORK SYSTEM ARCHITECTURE AND METHOD", which is a Continuation of U.S. Application Serial No. 13/794,710, filed March 11, 2013, and entitled "AGGREGATION FRAMEWORK SYSTEM ARCHITECTURE AND METHOD". Application Serial No. 16/013,720 is a continuation-in-part of U.S. Application Serial No. 15/604,879, filed on May 25, 2017, and entitled "AGGREGATION FRAMEWORK SYSTEM ARCHITECTURE AND METHOD". Application Serial No. 15/604,879 claims priority under 35 U.S.C. § 119(e) to U.S. Provisional Application Serial No. 62/341,511, entitled "AGGREGATION FRAMEWORK SYSTEM ARCHITECTURE AND METHOD" filed on May 25, 2016. Application Serial No. 15/604,879 claims priority under 35 U.S.C. § 119(e) to U.S. Provisional Application Serial No. 62/341,490, entitled "AGGREGATION FRAMEWORK SYSTEM ARCHITECTURE AND METHOD" filed on May 25, 2016. Application Serial No. 15/604,879 is a continuation-in-part and claims the benefit under 35 U.S.C. § 120 to U.S. Application Serial No. 15/042,297, entitled "AGGREGATION FRAMEWORK SYSTEM ARCHITECTURE AND METHOD" filed on February 12, 2016. Application 15/042,297 is a continuation of and claims the benefit under 35 U.S.C. § 120 of U.S. Application Serial No. 13/951,987, entitled "AGGREGATION FRAMEWORK SYSTEM ARCHITECTURE AND METHOD" filed on July 26, 2013. Application 13/951,987 is a continuation-in-part of and claims the benefit under 35 U.S.C. § 120 to U.S. Application Serial No. 13/794,710, entitled "AGGREGATION FRAMEWORK SYSTEM ARCHITECTURE AND METHOD" filed on March 11, 2013. Application 13/794,710 claims priority under 35 U.S.C. § 119(e) to U.S. Provisional Application Serial No. 61/676,188, entitled "AGGREGATION FRAMEWORK SYSTEM ARCHITECTURE AND METHOD" filed on July 26, 2012. Application 13/951,987 claims priority under 35 U.S.C. § 119(e) to U.S. Provisional Application Serial No. 61/676,188, entitled "AGGREGATION FRAMEWORK SYSTEM ARCHITECTURE AND METHOD" filed on July 26, 2012. Application Serial No. 15/604,879 is a continuation-in-part of and claims the benefit under 35 U.S.C. § 120 to U.S. Application Serial No. 14/672,901, entitled "AGGREGATION FRAMEWORK SYSTEM ARCHITECTURE AND METHOD" filed on March 30, 2015, which is a continuation of and claims the benefit under 35 U.S.C. § 120 to U.S. Application Serial No. 13/794,710, entitled "AGGREGATION FRAMEWORK SYSTEM ARCHITECTURE AND METHOD" filed on March 11, 2013. This application is a continuation-in-part of U.S. Patent Application No. 16/442,204, filed June 14, 2019, entitled "SYSTEMS AND METHODS FOR MANAGING TRANSACTIONAL OPERATION," which claims priority under 35 U.S.C. § 119(e) to U.S. Provisional Application Serial No. 62/687,611, filed on June 20, 2018, entitled "SYSTEMS AND METHODS FOR MANAGING TRANSACTIONAL OPERATION," and U.S. Provisional Application Serial No. 62/690,213, filed on June 26, 2018, entitled "SYSTEMS AND METHODS FOR MANAGING TRANSACTIONAL OPERATION WITH DYNAMIC SCHEMA," and U.S. Provisional Application Serial No. 62/690,853, filed on June 27, 2018 entitled "SYSTEMS AND METHODS FOR MANAGING TRANSACTIONAL OPERATION WITH DYNAMIC SCHEMA," each of which applications are incorporated by reference herein.--